US011926685B2

(12) United States Patent
Kashyap et al.

(10) Patent No.: US 11,926,685 B2
(45) Date of Patent: Mar. 12, 2024

(54) TETRA-FUNCTIONAL LONG-CHAIN BRANCHED ETHYLENE-BASED POLYMERS

(71) Applicant: Dow Global Technologies LLC, Midland, MI (US)

(72) Inventors: Teresita Kashyap, Lake Jackson, TX (US); Robert D. J. Froese, Midland, MI (US); Daniel J. Arriola, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 275 days.

(21) Appl. No.: 17/280,300

(22) PCT Filed: Sep. 27, 2019

(86) PCT No.: PCT/US2019/053527
§ 371 (c)(1),
(2) Date: Mar. 26, 2021

(87) PCT Pub. No.: WO2020/069364
PCT Pub. Date: Apr. 2, 2020

(65) Prior Publication Data
US 2022/0033547 A1 Feb. 3, 2022

Related U.S. Application Data

(60) Provisional application No. 62/738,612, filed on Sep. 28, 2018.

(51) Int. Cl.
*C08F 210/18* (2006.01)

(52) U.S. Cl.
CPC .................................. *C08F 210/18* (2013.01)

(58) Field of Classification Search
CPC ..................................................... C08F 210/18
See application file for complete search history.

(56) References Cited

U.S. PATENT DOCUMENTS

| | | | | |
|---|---|---|---|---|
| 5,965,756 | A | 10/1999 | McAdon et al. | |
| 7,553,917 | B2 | 6/2009 | Beigzadeh et al. | |
| 11,098,144 | B2* | 8/2021 | Tuberquia | G01N 33/442 |
| 11,261,319 | B2* | 3/2022 | LiPiShan | C08L 91/00 |
| 2015/0125645 | A1 | 5/2015 | Cheng et al. | |
| 2016/0122370 | A1 | 5/2016 | Berthoud et al. | |
| 2021/0079129 | A1 | 3/2021 | Chen et al. | |
| 2021/0388131 | A1* | 12/2021 | Froese | C08F 210/02 |
| 2022/0033546 | A1* | 2/2022 | Arriola | C08F 210/18 |
| 2022/0033547 | A1 | 2/2022 | Kashyap et al. | |

FOREIGN PATENT DOCUMENTS

| | | | |
|---|---|---|---|
| CN | 101802150 | A | 8/2010 |
| CN | 105324388 | A | 2/2016 |
| WO | 2009012216 | A1 | 1/2009 |
| WO | 2018064546 | A1 | 4/2018 |
| WO | 2018155982 | A1 | 8/2018 |

OTHER PUBLICATIONS

Office Action dated Dec. 5, 2022, pertaining to CN Patent Application No. 201980070072.4, 7 pgs.
Bond "C-H . . . p interactions in the low-temperature crystal structures of a,w-unsaturated linear hydrocarbons", Chem. Commun., 2002, 1664-1665.
Strate et al. "Branching by Copolymerization of Monovinyl and Divinyl Monomers in Continuous-Flow Stirred Reactors", Journal of Applied Polymer Science, vol. 25, 59-62, 1980.
Guzman et al. "Simple Model to Predict Gel Formation in Olefin-Diene Copolymerizations Catalyzed by Constrained- Geometry Complexes", AIChE Journal, May 2010, 56, 1325-1333.
Cozewith et al. "Polymer Crosslinking in Continuous Flow Stirred Reactors", Chemical Engineering Science vol. 34 pp. 245-248, 1979.
Tobita "Molecular Weight Distribution in Random Crosslinking of Polymer Chains", Journal of Polymer Science: Part B: Polymer Physics, vol. 33, 1191-1202, 1995.
Figueroa et al. "Synthesis of Imino-Enamido Hafnium and Zirconium Complexes: A New Family of Olefin Polymerization Catalysts with Ultrahigh-Molecular-Weight Capabilities", Organometallics 2011, 30, 1695-1709.
Froese et al. "Imino-Amido Hf and Zr Complexes: Synthesis, Isomerization, and Olefin Polymerization", Organometallics 2011, 30, 251-262.
International Search Report and Written Opinion pertaining to PCT/US2019/053537, dated Dec. 13, 2019.
International Search Report and Written Opinion pertaining to PCT/US2019/053527, dated Dec. 13, 2019.
International Search Report and Written Opinion pertaining to PCT/US2019/053524, dated Dec. 12, 2019.
International Search Report and Written Opinion pertaining to PCT/US2019/053529, dated Dec. 13, 2019.
Written Opinion of the International Preliminary Examination Authority pertaining to PCT/US2019/053529, dated Sep. 2, 2020.
Written Opinion of the International Preliminary Examination Authority pertaining to PCT/US2019/053524, dated Sep. 2, 2020.
Written Opinion of the International Preliminary Examination Authority pertaining to PCT/US2019/053527, dated Sep. 2, 2020.
Written Opinion of the International Preliminary Examination Authority pertaining to PCT/US2019/053537, dated Sep. 2, 2020.
Williams, "The Construction of a Polyethylene Calibration Curve for Gel Permeation Chromatography using Polystyrene Fractions",J. Poly. Sci., 1968, 621.
Mourey, "A strategy for interpreting multidector size-exculsion chromatography data. I. Development of a systematic approach.", Chromatography Polym., Chapter 12, 1992.
Balke, "A Strategy for Interpreting Multidetector Size-Exclusion Chromatography Data II", Chromatography Polym., Chapter 13, 1992.

(Continued)

*Primary Examiner* — Rip A Lee
(74) *Attorney, Agent, or Firm* — Dinsmore & Shohl LLP

(57) ABSTRACT

Ethylene-based polymers of this disclosure include a melt viscosity ratio ($V_{0.1}/V_{100}$) at 190° C. of at least 10, where $V_{0.1}$ is the viscosity of the ethylene-based polymer at 190° C. at a shear rate of 0.1 radians/second, and $V_{100}$ is the viscosity of the ethylene-based polymer at 190° C. at a shear rate of 100 radians/second; and a molecular weight tail quantified by an MWD area metric, $A_{TAIL}$, and $A_{TAIL}$ is less than or equal to 0.04 as determined by gel permeation chromatography using a triple detector.

16 Claims, 22 Drawing Sheets

(56) References Cited

OTHER PUBLICATIONS

Zimm, "Apparatus and Methods for Meaturement and Interpretation of the Angular Variation of Light Scattering; Preliminary Results on Polystyrene Solutions" J. Chem. Phys., 1948, 1099.
Kratochvil, "Fundamental Light-Scattering Methods", Classical Light Scattering from Polymer Solutions, 1987, Chapter 3.
Yau, "Examples of Using 3D-GPC-TREF for Polyolefin Characterization", Macromol. Symp., 2007, 29-45.
161/162 Communication pertaining to European Application No. 19789834.9 dated May 6, 2021.
161/162 Communication pertaining to European Application No. 19789830.7 dated May 6, 2021.
161/162 Communication pertaining to European Application No. 19789829.9 dated May 7, 2021.
161/162 Communication pertaining to European Application No. 19789831.5 dated May 20, 2021.
International Preliminary Report on Patentability pertaining to Int'l Application No. PCT/US2019/053537 filed Sep. 27, 2019.
International Preliminary Report on Patentability pertaining to Int'l Application No. PCT/US2019/053527 filed Sep. 27, 2019.
International Preliminary Report on Patentability pertaining to Int'l Application No. PCT/US2019/053524 filed Sep. 27, 2019.
International Preliminary Report on Patentability pertaining to Int'l Application No. PCT/US2019/053529 filed Sep. 27, 2019.
Examination Report dated Oct. 20, 2022, pertaining to IN Patent Application No. 202117016237, 7 pgs.
Office Action dated Nov. 8, 2022, pertaining to CN Patent Application No. 201980069802.9, 12 pgs.
European Examination Report issued for related European Patent Application No. 19789831.5 dated Feb. 8, 2023 (6 pages).
European Examination Report dated Feb. 8, 2023, pertaining to EP Patent Application No. 19789829.9, 7 pgs.
European Examination Report dated Feb. 8, 2023 pertaining to European Patent Application No. 19789830.7 6 pages.
Chinese Office Action dated Jul. 26, 2023, pertaining to Chinese Patent Application No. 201980070499.4, 6 pages.
Non-Final Office Action dated May 12, 2023, pertaining to U.S. Appl. No. 17/280,303.
Japanese Office Action dated Nov. 7, 2023, pertaining to JP Patent Application No. 2021-516591, 8 pgs.
Japanese Office Action dated Nov. 1, 2023, pertaining to JP Patent Application No. 2021-515200, 6 pgs.
Japanese Office Action dated Nov. 14, 2023, pertaining to JP Patent Application No. 2021-515201, 12 pgs.
Japanese Office Action dated Nov. 14, 2023, pertaining to JP Patent Application No. 2021-515217, 10 pgs.
U.S. Notice of Allowance dated Oct. 25, 2023, pertaining to U.S. Appl. No. 17/280,303, 8 pages
U.S. Notice of Allowance dated Nov. 15, 2023, pertaining to U.S. Appl. No. 17/280,293, 5 pgs.
U.S. Office Action dated Jan. 25, 2024, pertaining to U.S. Appl. No. 17/280,301, 8 pgs.
Chinese Office Action dated Nov. 29, 2023, pertaining to CN Patent Application No. 201980069379.2, 6 pgs.
Chinese Office Action dated Dec. 5, 2023, pertaining to CN Patent Application No. 201980069802.9, 8 pgs.
Chinese Office Action dated Dec. 14, 2023, pertaining to CN Patent Application No. 201980070072.4, 6 pages.

* cited by examiner

TETRA-FUNCTIONAL LONG-CHAIN BRANCHED ETHYLENE-BASED POLYMERS

CROSS-REFERENCE TO RELATED APPLICATION

This application is a National Stage Entry under 35 U.S.C. § 371 of International Patent Applicaiton No. PCT/US2019/053527, filed Sep. 27, 2019, which claims priority to U.S. Provisional Patent Application No. 62/738,612 filed on Sep. 28, 2018, the entire disclosure of which are hereby incorporated by reference.

TECHNICAL FIELD

Embodiments of the present disclosure generally relate to polymer compositions having long-chain branches and the process by which the polymer compositions are synthesized.

BACKGROUND

Olefin based polymers, such as polyethylene and polypropylene, are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The amount of short-chain branching in a polyolefin affects the physical properties of that polyolefin. The effect of branching on properties of polyethylene depends on the length and the amount of branches. Short branches mainly influence the mechanical and thermal properties. As the short-chain branching frequency increases, the polymer is less able to form lamellar crystals, and the mechanical and thermal properties diminish. Small amounts of long-chain branching can alter the polymer processing properties significantly.

To form long-chain branching, a vinyl or terminal double bond of a polymer chain is incorporated into a new polymer chain. Reincorporation of vinyl terminated polymers and introducing a diene comonomer are two mechanisms by which a vinyl group on a polymer strand is incorporated into a second polymer strand. Additionally, long-chain branching is induced via radicals. It is difficult to control the amount of branching in all three mechanisms. When using radicals or dienes to initiate long-chain branching, the branching may become too numerous, thereby causing gelling and reactor fouling. The reincorporation mechanism does not produce much branching, and branching can only occur after the polymer strand is produced, thereby further limiting the amount of branching that can occur.

SUMMARY

Embodiments of this disclosure are directed to ethylene-based polymers having increased branching. One or more embodiments of the ethylene-based polymers includes a melt viscosity ratio ($V_{0.1}/V_{100}$) at 190° C. of at least 10, where $V_{0.1}$ is the viscosity of the ethylene-based polymer at 190° C. at a shear rate of 0.1 radians/second, and $V_{100}$ is the viscosity of the ethylene-based polymer at 190° C. at a shear rate of 100 radians/second; and a molecular weight tail quantified by an MWD area metric, $A_{TAIL}$, and $A_{TAIL}$ is less than or equal to 0.04 as determined by gel permeation chromatography using a triple detector.

In various embodiments, the ethylene-based polymer comprises a melt viscosity ratio ($V_{0.1}/V_{100}$) at 190° C. of at least 20, where $V_{0.1}$ is the viscosity of the ethylene-based polymer at 190° C. at a shear rate of 0.1 radians/second, and $V_{100}$ is the viscosity of the ethylene-based polymer at 190° C. at a shear rate of 100 radians/second; and an average g' is from 0.64 to 0.86, where the average g' is an intrinsic viscosity ratio determined by gel permeation chromatography using a triple detector.

DETAILED DESCRIPTION

Figure 1:
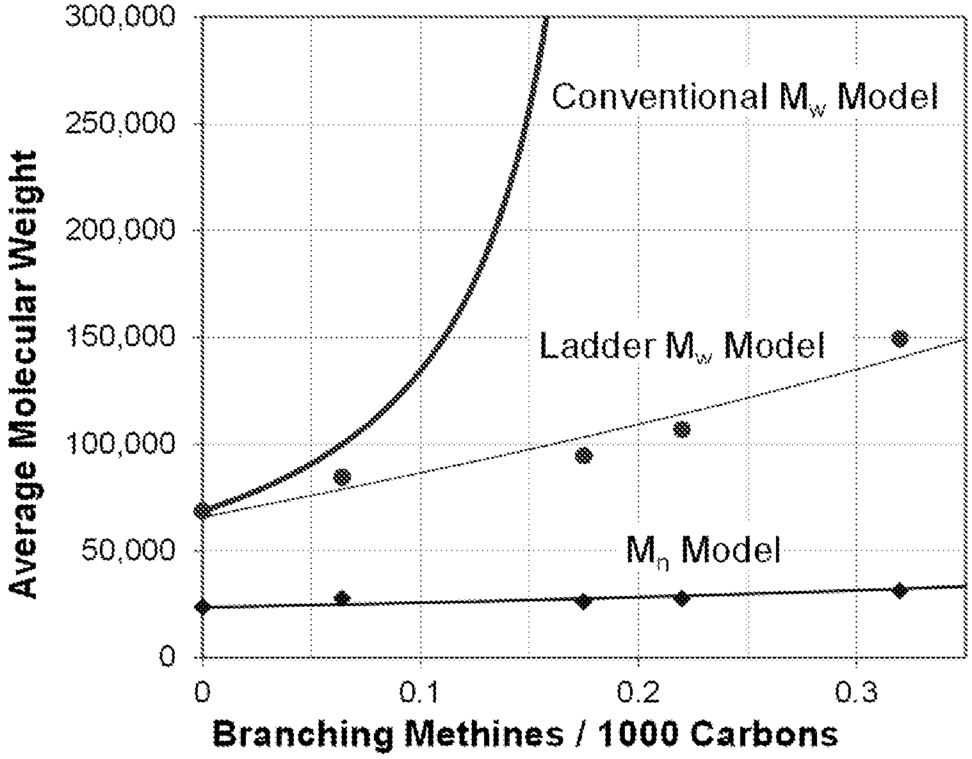
FIG. 1 is a graphical depiction of the molecular weight of a polymer as the number of branching methines per 1000 carbons increase.

Specific embodiments of a process for synthesizing polymer and polymers synthesized by the process of this disclosure will now be described. It should be understood that the process for synthesizing polymers of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

Embodiments of this disclosure include a process of synthesizing long-chain branched polymers by adding a $C_2$ monomer, at least one $C_3$-$C_{12}$ α-olefin comonomer, at least one diene, a multi-chain catalyst, and optionally, a solvent, in which the multi-chain catalyst includes a molecule having a plurality of polymerization sites, producing at least two copolymer strands, each copolymer strand copolymerizing at one of the polymerization sites; and synthesizing the long-chain branched polymers by connecting the two copolymer strands with the diene, the connection of the two copolymer strands being performed concertedly with the copolymerization.

The process of synthesizing polymers according to this disclosure is different from the conventional long-chain branching. The term "long-chain branching" refers to branches having greater than 100 carbon atoms. A "branch" refers to a portion of polymer that extends from a tertiary or quaternary carbon atom. When the branch extends from a tertiary carbon atom, there are two other branches, which collectively could be the polymer strand from which the branch extends. Conventionally, long-chain branching (LCB) may occur naturally in the polymerization process, as shown in Scheme 1. This can occur through vinyl termination of the polymer chain and reinsertion of the macromolecular vinyl creating a tri-functional long-chain branch. Depending on the degree of branching, a variety of methods can either determine LCB, such as nuclear magnetic resonance (NMR), or distinguish the effect of LCB in the polymer. For example, the effect of LCB is observed in shear flow in the van Gurp-Palmen analysis, also an increase of the shear viscosity at low angular frequencies and strength of the shear thinning behavior can be attributed to LCB. In extensional flow, the influence of LCB is usually identified in the degree of hardening or the strength of the melt and the maximum deformation achieved. A high level of natural LCB in a polymer is difficult to achieve due to the limited concentration of vinyl terminated polymers (maximum one per polymer chain) and the need to run to high ethylene conversion to ensure LCB formation. To ensure high conversion, there is a low ethylene concentration in the reactor, thus enabling a great amount of vinyl terminated polymers to be reinserted in a second polymer chain.

Scheme 1: Naturally occurring long-chained branching: Chain transfer event leading to vinyl terminated polymers

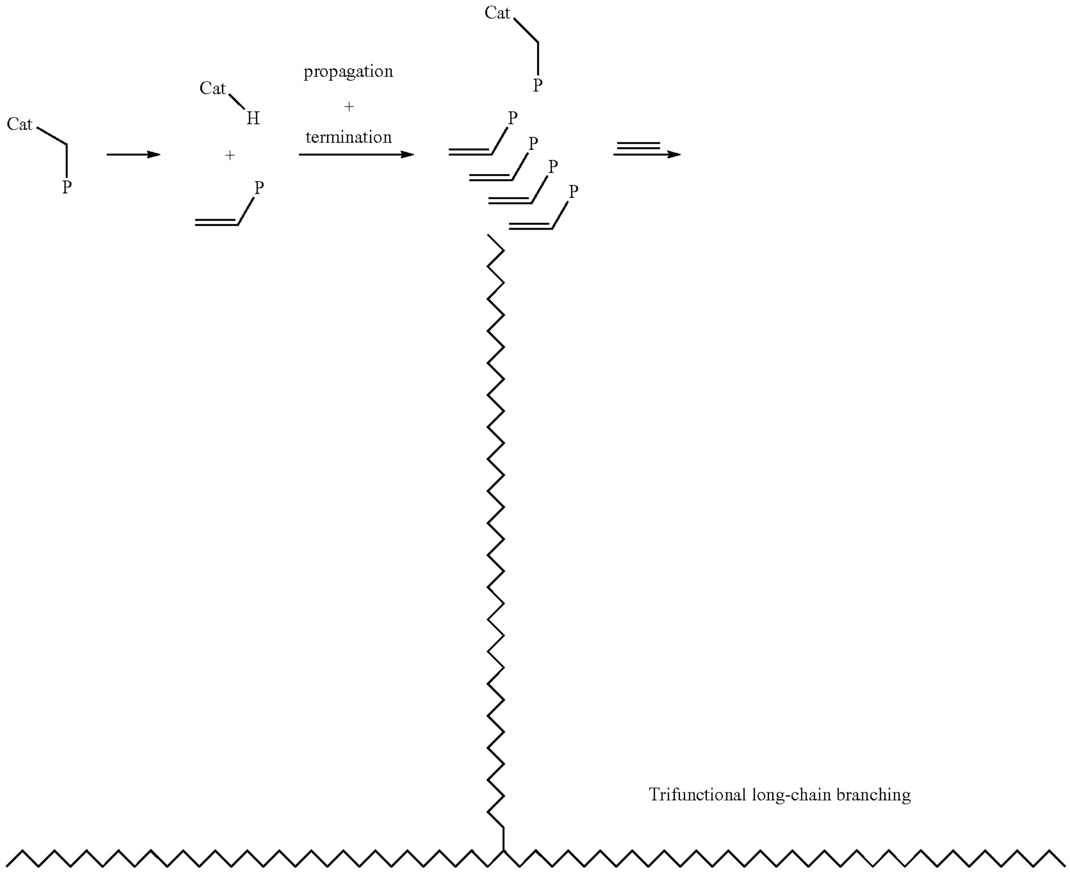

In Scheme 1, "Cat" is the catalyst and "P" is the polymer chain.

There is minimal long-chain branching that forms through the naturally occurring branching process. One way to enhance LCB is through the addition of $\alpha,\omega$-dienes to the polymerization system, whether it be in a radical, heterogeneous, or homogeneous process. In general, dienes add to the polymer chain in a similar manner to $\alpha$-olefins, but leave a pendant vinyl group which can insert into a polymer chain a second time to create the LCB, as illustrated by Scheme 2. In general, the diene length does not matter, only that it can link two polymer chains together. In principle, the concentration of pendant vinyls can be controlled through the amount of diene added to the reactor. Thus, the degree of LCB can be controlled by the concentration of pendant vinyls.

Scheme 2: Long-Chain Branching via Diene Incorporation
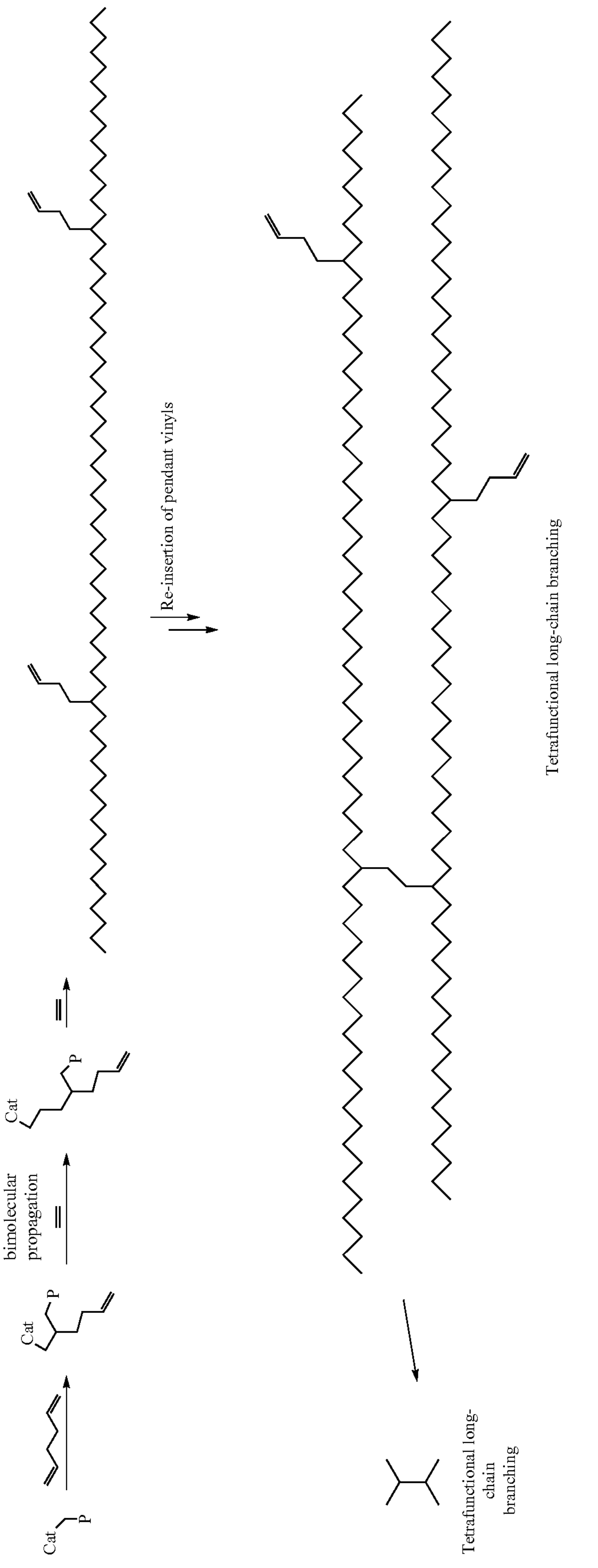

In Scheme 2, "Cat" is the catalyst; "P" is the polymer chain; and the diene in this example is 1,5-hexadiene.

The conventional process of incorporating dienes into a polymer synthesis system suffers from the fundamental flaw of gel formation or reactor fouling. The kinetic modeling, discussed in later paragraphs, may provide good predictive results that enable a better understanding into gel formation. For example, longer polymer chains have more inserted olefins, thus more inserted dienes, thus more pendant vinyls, implying that longer polymer chains will be more likely to re-insert into the catalyst to form a LCB. Thus, the longer polymer chains preferentially re-insert forming tetra-functional branches, which are even larger polymer molecules, and a gel problem results. As indicated in Scheme 2, a tetra-functional LCB has a short segment (number of carbons between the two double bonds of the diene), which bridges two long chains on each side of the short segment. A simulation of the weight average molecular weight ($M_w$) and number average molecular weight ($M_n$) as a function of branching is shown in FIG. 1 for polyethylene in a semi-batch reactor at constant pressure. In FIG. 1, $M_n$ only marginally increases as $M_w$ becomes infinite. As the $M_w$ increases to a number greater than 200,000 grams per mole (g/mol), the polymer gels, gelling occurs, or reactor fouling is present.

The term "gel" or "gelling" refers to a solid composed of at least two components: the first is a three dimensional cross-linked polymer and the second is a medium in which the polymer does not fully dissolve. When the polymer gels and does not fully dissolve, the reactor may become fouled with polymer gel.

The term "Ladder Branched" polymer refers to the tetra-functional long chain branched polymer as disclosed in this application, and the term or "Ladder Branching mechanism" refers to how the "Ladder Branched" polymers are formed.

In one or more embodiments of this disclosure, the process to synthesize the long-chain branched polymer achieves long-chain branching and avoids gel formation or reactor fouling. Without intending to be bound by theory, it is believed that reactor fouling is avoided by reacting the two alkenes of the diene in a concerted fashion across two proximal polymer chains. For example and illustrated by Scheme 3, one alkene of the diene reacts before the second alkene, and the second alkene reacts before too many ethylene molecules are added to the polymer strand, thereby removing the close proximity the second alkene has to the reactive site. The reaction of the first alkene of the diene into one polymer and second alkene of the diene into an adjacent polymer chain before many ethylene monomers are inserted is referred to as a concerted addition of the diene into proximal polymer chains.

Scheme 3: Depiction of incorporating the diene in a concerted fashion (p is a polymer chain), also called the "Ladder Branching" mechanism.

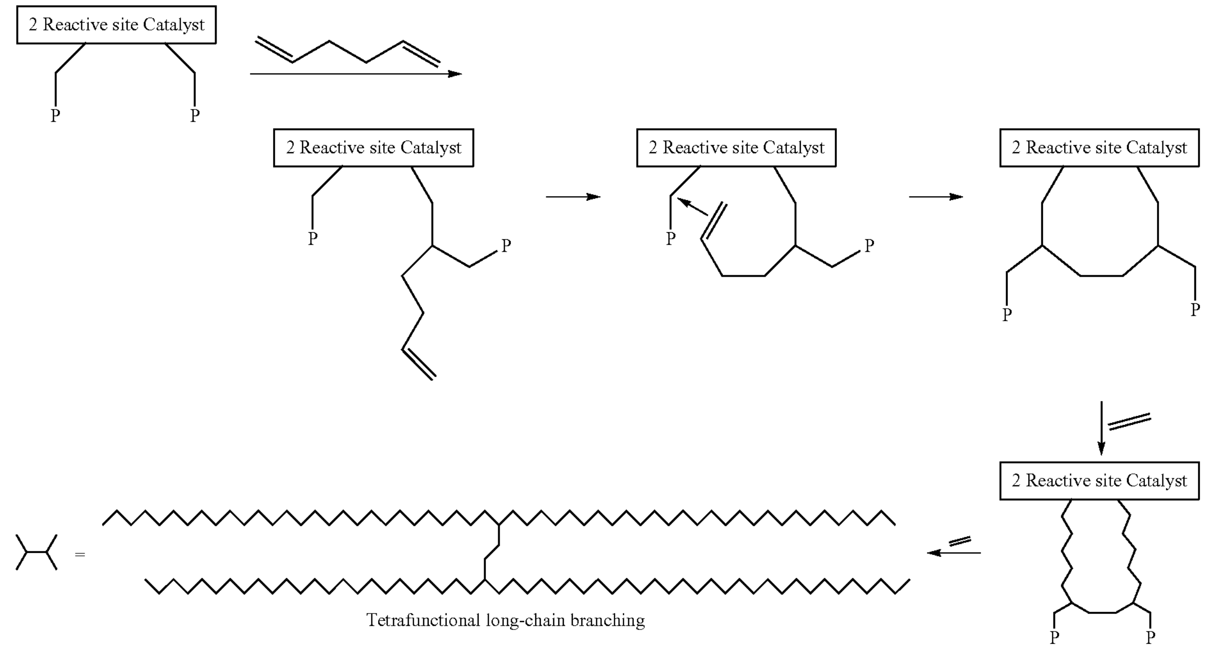

Polymer strands are linear segments of a polymer, or more specifically a copolymer, which are optionally joined at the end(s) by branching junctures. For example, a tetra-functional branch juncture joins the ends of four polymer strands, as opposed to a tri-functional branch juncture, which joins the ends of three polymer strands as shown in Scheme 1.

The combination of a multi-chain catalyst and diene influences the amount and type of branching. Embodiments of the present disclosure are directed to controlling polymer properties such as: 1) the use of multiple diene species, 2) the use of multiple multi-chain catalyst species, or 3) the combination of polymerization environments including multiple reactors zones or a gradient of zones.

Although, using multiple catalysts, including single-chain catalysts, may allow conventional branching. The use of multiple dienes species also includes those dienes which do not create branches or tend to result in "conventional" LCB. The process of synthesizing polymers according to this disclosure is different from the conventional long-chain branching. The term "long-chain branching" refers to branches having greater than 100 carbon atoms. The term "branch" refers to a portion of polymer that extends from a tertiary or quaternary carbon atom. When the branch extends from a tertiary carbon atom, there are two other branches, which collectively could be the polymer chain from which the branch extends. Long-chain branching (LCB) may occur naturally in the polymerization process, as shown in Scheme 1. This may occur through termination of the polymer chain and reinsertion of the macromolecular vinyl creating a tri-functional long-chain branch.

In one or more embodiments, the process for polymerizing the long-chain branched polymer includes a catalyst with at least two active sites in close proximity (multi-chain catalysts). In order for the two active sites to be in close proximity, the two active sites may be less than 18.5 angstroms (Å) apart. In some embodiments, the two active sites include a distance of from 2.5 angstroms (Å) to 18.5 Å, from 9 Å to 14 Å, or approximately 11 Å. In various embodiments, the process for polymerizing the long-chain branched polymer includes a multi-chain catalyst. In one or more embodiments, the multi-chain catalyst may include at least one metal center, in which the two active site are on the same metal center. In some embodiments, the multi-chain catalyst may include a metal-ligand complex, in which the two active sites (two polymer chains) are on the same metal center.

According to an X-ray crystal structure (A. D. Bond, *Chem. Comm.* 2002, 1664), 1,9-decadiene has a distance between terminal carbons of 10.8 Å. While there is data that the 1,9-decadiene form rungs between two polymer chains via the "Ladder Branching" mechanism, one may believe that α,ω-dienes having more than 10 carbon atoms may also form rungs via the "Ladder Branching" mechanism. Without intent to be bound by theory, the issue of whether α,ω-dienes having more than 10 carbon atoms may form rungs may be determined by the distance between the two polymer chains. For example, when the two polymer chains reside on different metal atoms of a catalyst (e.g., bimetallic, heterogeneous), the α,ω-dienes may include additional methylene units (same C—C bond lengths and angles) to extend this structure to 1,15-hexadecadiene. Without intent to be bound by theory, it is presumed this 16-carbon analog still has the potential to form a rung via the "Ladder Branching" mechanism. In this manner, one can consider dienes, 1,11-dodecadiene (13.3 Å distance between terminal carbons), 1,13-tetradecadiene (15.9 Å distance between terminal carbons), 1,15-hexadecadiene (18.5 Å distance between terminal carbons). In some embodiments, when the dual chain catalyst in the "Ladder Branching" mechanism is a bimetallic catalysts, the diene is less than or equal to 18.5 Å.

It is well-known that modem computational techniques can reproduce known experimental crystal structures to high accuracy as a way to estimate distances between chains for a catalyst. For a heterogeneous system, one may estimate surface concentration of metals which are often measured in metal atoms per nanometer squared ($M/nm^2$). This surface coverage provides an estimate of accessible metals on the surface which if evenly dispersed may be converted to an M-M distance, which reflects the distance between the polymer chains. For an extended surface, 1 $metal/nm^2$ leads to a distance of 10 Å between the metal atoms, well within the desired cut-off. At 18.5 Å, one can determine the coverage at 0.3 $metal/nm^2$ Examples of catalysts having at least two active sites, wherein the active sites are in close proximity include, but are not limited to, bimetallic transition metal catalysts; heterogeneous catalysts; dianionic activators with two associated active catalysts; a ligated transition metal catalyst with more than one propagating polymer chain; a group IV olefin polymerization catalyst including monoanionic groups, bidentate monoanionic groups, tridentate monoanionic groups, or a monodentate, bidentate, or tridentate monoanionic groups with external donors.

The catalysts in Table 1 are illustrative embodiments of the classes of catalysts previously described and specific catalysts contemplated. The examples in Table 1 are not intended to be limiting; rather they are merely illustrative and specific examples for the classes of catalyst previously mentioned.

TABLE 1

Catalysts with more than one active site in close proximity

| Class | Illustrative | Specific |
|---|---|---|
| Bimetallic Catalysts | 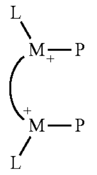 | 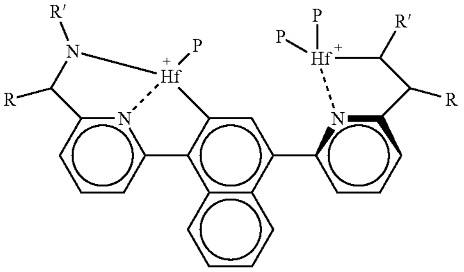 |

TABLE 1-continued

| Catalysts with more than one active site in close proximity | | |
|---|---|---|
| Class | Illustrative | Specific |
| | 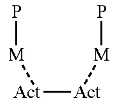 Dianionic Activator associated with two active catalyst | 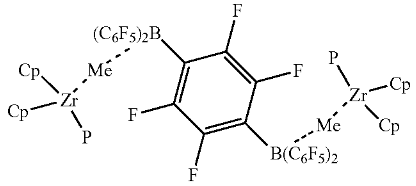 |
| Heterogeneous and Supported Catalysts | 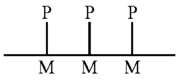 and 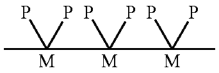 Heterogeneous Catalyst | |
| Group IV Olefin Polymerization Catalyst | 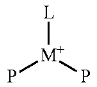 M = Ti, Zr, Hf Monoanionic groups | 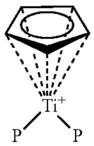 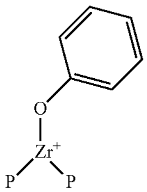 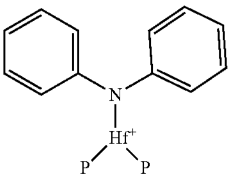 |
| | 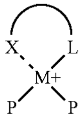 Bidentate monoanionic groups | 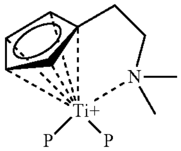 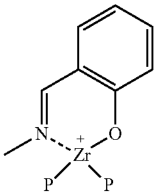 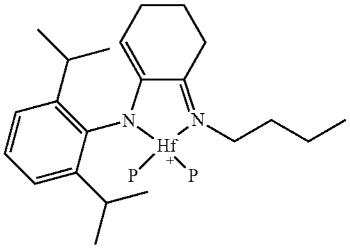 |

While not intending to be bound by theory, a mechanism, as explained in this section, describes how a dual chain catalyst can create a unique bridged molecular architecture when polymerizing diene co-monomers under desired conditions. The term "diene" refers to a monomer or molecule having two alkenes. A pictorial description of the kinetics is shown in Scheme 4, in which the catalyst center produces two polyolefin chains. Scheme 4 shows how a combination of diene bridging and chain transfer may create a diene "Ladder Branched" polymer structure. The term diene "Ladder Branched" polymer refers to the long-chain branching, in which a short chain or rung that includes one to twelve carbon atoms links two long-chains together. As shown, the metal-ligand catalyst having at least two polymer chain sites propagates two separate polymer chains. One alkene of the diene is incorporated into one of the sites of the catalyst, and it is believed that due to the close proximity of the propagation sites, the second alkene of the diene is then quickly incorporated into the second polymer chain, thereby forming a bridge or rung. This successive addition of diene is referred to as a "concerted" addition of the diene, distinguishing it from catalysts without two proximal chains where diene addition leads to a concentration of vinyl containing polymers in the reactor, which react at a later time. The term "rung" refers to the diene once it is incorporated into two separate polymer strands, thereby linking the strands together. The first and second polymer strands continue to propagate until the polymer transfers to another catalyst, the polymer is released from the catalyst, the catalyst dies, or another diene is added.

Kinetics

Scheme 4. Illustration of "Ladder Branching" kineticsincluding the resulting molecular architecture. The metal-ligand catalyst are represented together by L—M+.

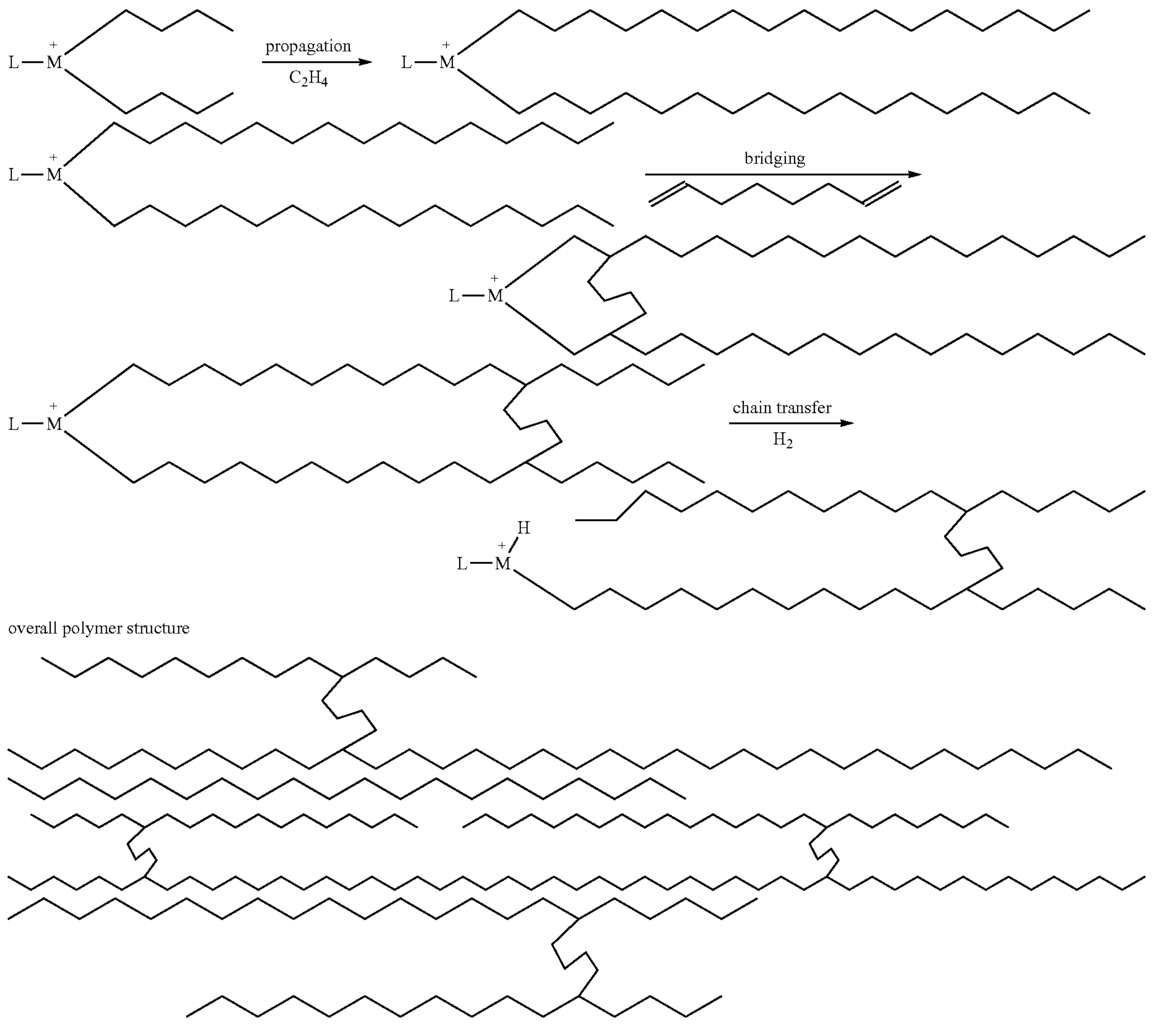

Without intending to be bound by theory, it is believed that the molecular weight distribution associated with these proposed kinetics is inherently stable at high branching levels when the diene bridging reaction is the sole source of branching. The molecular weight distribution (MWD) is defined by the weight average molecular weight divided by the number average molecular weight ($M_w/M_n$). The inherent stability of the MWD means that the weight average molecular weight ($M_w$) increases only moderately even at high branching levels, which is in contrast to conventional diene comonomer branching technology wherein $M_w$ and $M_w/M_n$ become infinite at moderate tetra-functional branching levels.

A mathematical model is derived for the purpose of demonstrating how the process for synthesizing polyethylene creates a long-chain branched polymer having a diene "Ladder Branched" molecular architecture. The mathematical model will also be used to establish claims metrics and ranges. The mathematical model of the branched architecture as described in this disclosure may be derived from a kinetics description of the proposed mechanism of branching. This model is based upon several assumptions to facilitate mathematical simplicity, but these assumptions are not intended to limit the scope of this disclosure. The assumptions follow common industrial applications of non-living addition of copolymers as well as additional assumptions specific to the assumed diene branching mechanism. The common assumptions made include: (1) propagation is much faster than chain transfer, therefore average chain length is much greater than one monomer; (2) only a single pure catalyst species is active; (3) the catalyst center makes many chains during its lifetime, and therefore the chain lifetime is a small fraction of the reaction or residence time; (4) co-polymerization may be approximated by a homopolymerization model when there is negligible composition drift.

Kinetics for Diene "Ladder Branching" Theory

In addition to the four commonly made assumptions, there are four assumptions, on which the kinetics for diene "Ladder Branching" theory is based. The first assumption is that the catalyst center simultaneously produces two kinetic chains with identical kinetics and statistics. Secondly, the rung is formed when a diene bridges two polymer chains increasing in length. Third, the branch point is formed whenever two un-bridged chains are bridged by a diene. Finally, the diene reactions not forming bridges are ignored since the MWD is not affected.

The kinetic description of a proposed diene "Ladder Branching" mechanism requires the deployment of a nomenclature that describes how each reaction affects the molecular architecture. Some nomenclature elements below represent small molecules (M, A, D) while the other nomenclature elements represent the molecular architecture ($P_{n,m}$, $S_n$, $D_n$). The kinetics will show how the nomenclature elements interact to form the molecular architecture.

Kinetic Nomenclature

M: monomer or co-monomers; A: chain transfer agent species; D: diene branching species; n, m: indices reflecting the number of monomeric repeat units on a subspecies; $P_{n,m}$: catalyst with two un-bridged propagating polymers having n and m monomeric repeat units; $D_n$; dead polymer molecular with n monomeric repeat units; $S_n$: catalyst producing a bridged polymer molecule with n monomeric repeat units; Kc: kinetic chains are defined as linear segments created by chain transfer; Rg: rungs are defined as bridges between chain segments; Br: branches are created when two previously un-bridged molecules become bridged.

The equations for branching kinetics are written below using the nomenclature and assumptions introduced above. A brief description will be given for each reaction, and anyone skilled in the art of polymerization kinetics should be capable of comprehending the kinetic scheme and rate laws.

TABLE 2

Kinetics for Diene "Ladder Branching" Theory, (n ≥ 1, m ≥ 1)

| | Chain position | Reaction | Reaction Constant |
|---|---|---|---|
| Propagation | (left) | $P_{n,m} + M \rightarrow P_{n+1,m}$ | $k_p$, (L/mole/sec) |
| | (right) | $P_{n,m} + M \rightarrow P_{n,m+1}$ | $k_p$, (L/mole/sec) |
| | | $S_n + M \rightarrow S_{n+1}$ | 2 $k_p$, (L/mole/sec) |
| Chain Transfer | (left) | $P_{n,m} + A \rightarrow P_{0,m} + D_n$ + kc | $k_{tra}$, (L/mole/sec) |
| | (right) | $P_{n,m} + A \rightarrow P_{n,0} + D_m$ + kc | $k_{tra}$, (L/mole/sec) |
| | (right) | $P_{n,m} + A \rightarrow P_{n,0} + D_m$ + kc | $k_{tra}$, (L/mole/sec) |
| | (left) | $S_n + A \rightarrow P_{0,n}$ + kc | $k_{tra}$, (L/mole/sec) |
| | (right) | $S_n + A \rightarrow P_{n,0}$ + kc | $k_{tra}$, (L/mole/sec) |
| Diene Bridging | | $P_{n,m} + D \rightarrow S_{n+m}$ + br + rg | 4 $k_d$, (L/mole/sec) |
| | | $S_n + D \rightarrow S_n$ + rg | 4 $k_d$, (L/mole/sec) |
| Re-initiation | | $P_{n,0} + M \rightarrow P_{n,1}$ | fast reaction |
| | | $P_{0,m} + M \rightarrow P_{1,m}$ | fast reaction |

The outcome of propagation is the incremental increase in chain size by one repeat unit. Propagation is written separately for each of the two molecules increasing in length from a catalyst center. For example, the first index on $P_{n,m}$ is for the left chain on the catalyst and the second index is for the right chain on the catalyst. When propagation is modeled for an increase in length bridged molecule ($S_n$), a factor of 2 appears in the rate, because there are two chain positions, the left and the right, on each center equally available for reaction.

Chain transfer, like propagation, is written separately for the left and right positions on the catalyst. Chain transfer of an un-bridged species ($P_{n,m}$) produces a dead polymer molecule ($D_n$ or $D_m$) and a vacant position ($P_{0,m}$ or $P_{n,0}$). When a propagating bridged molecule ($S_n$) engages in chain transfer, an un-bridged species ($P_{n,0}$ or $P_{0,n}$) is produced and no dead polymer is produced since all n repeat units are still bonded to the catalyst. The vacant positions ($P_{0,m}$ and $P_{n,0}$) resulting from chain transfer are assumed to very quickly re-initiate and engage in propagation. The rate expressions for diene bridging include a factor of 4 because each diene has two polymerizable groups and each catalyst center has two positions (left and right) for diene incorporation.

Diene bridging results in the formation of a tetra-functional branch (br) only when un-bridged ($P_{n,m}$) species react productively with a diene. A tetra-functional branch refers to a short segment where four polymer chains can emanate from, two from each side of the short segment. With dienes, tetra-functional branches are the expected type of LCB. A rung is produced (rg) when any catalyst center productively incorporates a diene regardless of whether it has bridged ($S_n$) or un-bridged ($P_{n,m}$) molecules. Diene reactions that do not result in bridging, such as intra-chain cyclization and pendant vinyl formation, are ignored and are considered non-productive for these kinetics.

The creation of a model from the kinetics requires that a series of population balances be derived for each type of polymer species involved. These population balances are derived as a function of chain length (n, m) and represent kinetic rates of change of the various polymeric subspecies. The population balances are given below assuming mass action rate laws with $P_{n,m}$, $S_n$, and $D_n$ symbols representing the molar concentration of subspecies for n≥1 and m≥1. The kinetics model can be extended to include other chain transfer reactions, such as with hydrogen ($k_{trh}$) and beta hydride elimination ($k_b$) merely by expanding the definition of the transfer term, $\Omega=k_{tra}A+k_{trh}H2+k_b$.

$$R_{S_n} = 2\Psi\sum_{m=1}^{n-1}(P_{m,n-m} + P_{n-m,m}) + 2\Phi(S_{n-1} - S_n) - 2\Omega S_n \quad (1)$$

$$R_{P_{n,m}} = \Phi(P_{n-1,m} + P_{n,m-1} - 2P_{n,m}) - (2\Omega + 4\Psi)P_{n,m} + \delta_{m-1}\Omega(S_n + L_n) + \delta_{n-1}\Omega(S_m + R_m) \quad (2)$$

$$R_{D_n} = \Omega\sum_{s=1}^{\infty}(P_{s,n} + P_{n,s}) = \Omega(R_n + L_n) \quad (3)$$

In equations (1), (2), and (3):

$$\Omega = k_{tra}A \quad (4)$$

$$\Psi = k_d D \quad (5)$$

$$\Phi = k_p M \quad (6)$$

$$L_n = \sum_{s=1}^{\infty} P_{n,s} \quad (7)$$

$$R_n = \sum_{s=1}^{\infty} P_{s,n} \quad \delta_i = \begin{cases} 0, & i \neq 0 \\ 1, & i = 0 \end{cases} \quad (8)$$

Other important population balances may be derived from equations (1) to (8), such as the propagating polymer subspecies distributions for the left side ($L_n$) and right side ($R_n$). The left and right side distributions of the propagating polymer subspecies are equal, due to symmetry imposed in defining the kinetics scheme.

$$R_{L_n}=\Phi(L_{n-1}-L_n)-(\Omega+4\Psi)L_n+\Omega S_n+\delta_{n-1}\Omega(\xi_{0,0}+\mu_0) \quad (9)$$

$$R_{R_n}=\Phi(R_{n-1}-R_n)-(\Omega+4\Psi)R_n+\Omega S_n+\delta_{n-1}\Omega(\xi_{0,0}+\mu_0) \quad (10)$$

The rates of formation of molecular attributes such as kinetic chains (kc), branches (br), and rungs (rg) are expressed below using mass action rate laws derived from the kinetics scheme. A shorthand notation is used to define the concentration of catalyst with un-bridged molecules ($\xi_{0,0}$) and the concentration of catalyst with bridged polymer molecules ($\mu_0$). Therefore the total catalyst concentration is $\xi_{0,0}+\mu_0$.

$$R_{kc}=2\Omega\sum_{n=1}^{\infty}\sum_{m=1}^{\infty}P_{n,m}+2\Omega\sum_{n=1}^{\infty}S_n=2\Omega(\xi_{0,0}+\mu_0) \quad (11)$$

$$R_{br}=4\Psi\sum_{n=1}^{\infty}\sum_{m=1}^{\infty}P_{n,m}=4\Psi\xi_{0,0} \quad (12)$$

$$R_{rg}=4\Psi\sum_{n=1}^{\infty}\sum_{m=1}^{\infty}Pn,m+4\Psi\sum_{n=1}^{\infty}Sn=4\Psi(\xi_{0,0}+\mu_0) \quad (13)$$

$$\xi_{0,0}=\sum_{n=1}^{\infty}\sum_{m=1}^{\infty}P_{n,m}=\sum_{n=1}^{\infty}R_n=\sum_{n=1}^{\infty}L_n \quad (14)$$

$$\mu_0=\sum_{n=1}^{\infty}Sn \quad (15)$$

The first step in rendering a usable model is to implement the "steady-state assumption" on the distributions of the propagating polymer species by setting the relevant polymer subspecies rates ($R_{P_{n,m}}$, $R_{S_n}$, $R_{L_n}$, $R_{R_n}$) to zero. This is a very common assumption in addition polymerization modeling when the lifetime of propagating chain is a very small fraction of the time period of interest. In most non-living commercial polymerizations of this type, the chain lifetime is typically much less than a second while a reactor residence time is at least several minutes. The following relation is derived after implementing the "steady-state" assumption and summing the live rates over all indices.

$$2\Psi\xi_{0,0}=\Omega\mu_0, \quad (16)$$

$$\text{therefore } \xi_{0,0}=\frac{\Omega}{\Omega+2\Psi}(\xi_{0,0}+\mu_0)$$

The "steady-state assumption" results in relations for simple branching metrics ($B_c$, $B_n$, $R_c$) that will be useful in the molecular architecture model. In this particular case, instantaneous properties are convenient and relevant because they apply to a variety of reactors such as a steady state, well-mixed reactor or a batch reactor with negligible drift in temperature or composition. The instantaneous branching metrics ($B_c$, $B_n$, $R_c$) are equivalent to their cumulative average values when there is no spatial or temporal variation in chain transfer ($\Omega$) and diene bridging rate (W) parameters.

Instantaneous Tetra – Functional Branches per Kinetic Chain, (17)

$$B_c=\frac{R_{br}}{R_{kc}}=\frac{2\Psi}{\Omega+2\Psi}$$

Instantaneous Tetra – Functional Branches per Polymer Molecule, (18)

$$B_n=\frac{R_{br}}{R_{\lambda_0}}=\frac{2\Psi}{\Omega}$$

Instantaneous Rungs per Kinetic Chain, (19)

$$R_c=\frac{R_{rg}}{R_{kc}}=\frac{2\Psi}{\Omega}$$

Moments for Prediction of MWD Averages

A model describing the moments of the polymer species chain length distributions can often be derived from population balances resulting from a kinetics scheme. A moment based model is useful in predicting molecular weight averages and polydispersity index but in general does not describe smaller nuances in MWD such as bimodality, peak MW, and tailing. The method of moments entails the definition of various polymeric subspecies chain length distribution moments such as those below. The bulk polymer moments ($\lambda_i$) reflect bulk polymer properties and solution of a model of bulk moments generally requires solution of various living polymer moments.

$$\text{Living Polymer } MWD \text{ Moments: } \mu_i=\sum_{n=1}^{\infty}n^iS_n \quad \xi_{i,j}=\sum_{n=1}^{\infty}\sum_{m=1}^{\infty}n^im^jP_{n,m} \quad (20)$$

$$\text{Bulk Polymer } MWD \text{ Moments: } \lambda_i=\sum_{n=1}^{\infty}n^i(D_n+S_n+L_n+R_n)=\sum_{n=1}^{\infty}n^iD_n \quad (21)$$

Any skilled polymer reaction engineer would understand the derivations of a Moments Model (Equations (20) and (21)) from a series of population balances. Rates of change of the leading bulk polymer moments ($\lambda_0$, $\lambda_1$, $\lambda_2$) are given below with negligible terms removed after imposing the assumption that kinetic chains are long, and therefore $\Phi>>\Omega$.

$$R_{\lambda_0}=2\Omega(\mu_0+\xi_{0,0})-4\Psi\xi_{0,0} \quad R_{\lambda_1}=2\Phi(\mu_0+\xi_{0,0}) \quad R_{\lambda_2}=2\Phi(\xi_{1,0}+\xi_{0,1}+2\mu_1)+8\Psi\xi_{1,1} \quad (22)$$

Evaluation of the rates of change of these bulk moments requires a number of living polymer subspecies moments. These live polymer moments are algebraic quantities because of the "steady-state assumption" and are given below. Additional live moments are required when higher bulk moments such as $\lambda_3$ are predicted.

$$\xi_{0,0}=\frac{\Omega\mu_0}{2\Psi} \quad (23)$$

$$\xi_{1,0}=\xi_{0,1}=\frac{\Phi\xi_{0,0}+\Omega\mu_1}{\Omega+4\Psi}$$

$$\xi_{1,1}=\frac{\Phi(\xi_{1,0}+\xi_{0,1})}{2\Omega+4\Psi}$$

$$\mu_1=\frac{\Phi\mu_0+2\Psi(\xi_{1,0}+\xi_{0,1})}{\Omega}$$

The instantaneous number and weight average chain lengths (DPn, DPw) are provided below, after algebraic simplification of the moment rates. Of course, the average molecular weights ($M_n$, $M_w$) are equal to the average chain lengths multiplied by the apparent monomeric repeat unit weight in g/mole.

$$DP_n=\frac{R_{\lambda_1}}{R_{\lambda_0}}=\frac{\Phi(2\Psi+\Omega)}{\Omega^2} \quad (24)$$

$$Z_p=\frac{DP_w}{DP_n}=\frac{R_{\lambda_2}R_{\lambda_0}}{(R_{\lambda_1})^2}=\frac{2(8\Psi^2+10\Psi\Omega+\Omega^2)}{(2\Psi+\Omega)^2}$$

The expression of the model is further simplified by a few substitutions, such as the average linear kinetic chain length $DP_{no}$ being equal to Φ/Ω. Also, the model can be expressed as a function of any of the instantaneous branching metrics $B_c$, $B_n$, and $R_c$. The model is written below in terms of diene "Ladder Branches" per kinetic chain ($B_c$) and branches per polymer molecule ($B_n$). It was previously shown that branches per polymer molecule equals rungs per kinetic chain ($B_n$=$R_c$) for this system.

$$DP_n = \frac{DP_{no}}{1 - B_c} = DP_{no}(1 + B_n) \tag{25}$$

$$Z_p = \frac{DP_w}{DP_n} = \frac{M_w}{M_n} = 2 + 6B_c - 4B_c^2 = \frac{2 + 10B_n + 4B_n^2}{(1 + B_n)^2} \tag{26}$$

The number and weight average molecular weights ($M_1$, $M_w$) can also be predicted as functions of diene "Ladder Branches" per kinetic chain ($B_c$) or branches per polymer molecule ($B_n$) after defining the number and weight average linear kinetic chain weight as $M_{no}$ and $M_{wo}$.

$$M_n = \frac{M_{no}}{1 - B_c} = M_{no}(1 + B_n) \tag{27}$$

$$M_w = M_{wo}\frac{2 + 6B_c - 4B_c^2}{1 - B_c} = M_{wo}\frac{2 + 10B_n + 4B_n^2}{(1 + B_n)^2} \tag{28}$$

where $$M_{wo} = 2M_{no}$$

An unexpected prediction arising from the Moments Model (Equations (20) and (21)) is that at high dienes branching levels, the maximum polydispersity is about 4. Of course, this prediction is for an ideal co-polymerization and a single symmetric catalyst system and any non-idealities are likely to give an increased polydispersity.

Model of the Complete MWD Curve

At times, it is possible to solve population balances for a molecular weight distribution curve. Explicit algebraic solutions are normally only available for instances of no spatial or temporal variations in reaction rates, such as assumed in this case. The solution begins with the definition of yet another distributional quantity Vn derived from Pn,m. The population balance for Vn is derived by summing over the population balance for Pn,m, with simplification due to symmetry.

$$V_n = \sum_{m=1}^{n-1} P_{m,n-m} = \sum_{m=1}^{n-1} P_{n-m,m} \tag{29}$$

$$R_{V_n} = 0 = 2\Phi(V_{n-1} - V_n) - (2\Omega + 4\Psi)V_n + 2\Omega(S_n + L_n) \tag{30}$$

Due to the assumption of long chains, it is possible to treat all subspecies distributions as if they were continuous rather than discrete functions. The discrete steady-state polymer species population balances can be closely approximated by differential equations in the continuous variable n when difference terms are replaced by derivatives. For example, the steady-state population balance for Sn contains the difference term Sn−Sn−1 which is replaced by the derivative as shown in equation (31).

$$\Phi(S_n - S_{n-1}) \sim \Phi\frac{dS(n)}{dn} \tag{31}$$

Similar replacements result in the following series of ordinary differential equations (ODEs) which can be integrated to yield the chain length distributions of the various defined live subspecies distributions L(n), S(n), and V(n). The model is summarized below as an initial value problem, where the chain length distribution functions are assumed to start at n=0. The lower limit of n=0 for the distribution functions is chosen for mathematical simplicity alone and ultimately makes no significant impact on model predictions when high polymers are formed.

$$\Phi\frac{dL(n)}{dn} = -(\Omega + 4\Psi)L(n) + \Omega S(n)\quad L(0) = \xi_{0,0}(\Omega + 2\Psi)/\Phi \tag{32}$$

$$2\Phi\frac{dS(n)}{dn} = -2\Omega S(n) + 4\Psi V(n)\quad S(0) = 0 \tag{32}$$

$$2\Psi\frac{dV(n)}{dn} = -(2\Omega + 4\Psi)V(n) + 2\Omega S(n) + 2\Omega L(n)\quad V(0) = 0 \tag{33}$$

The instantaneous dead polymer chain length distribution is proportional to $L_n$, as evident from the species rate ($R_{D_n}$). Therefore through $L_n$ the solution of the above system of differential equations gives the instantaneous dead polymer distribution $X_n$ and the continuous distribution X(n) is similarly proportional to L(n).

Instantaneous Dead Polymer Distribution $$X_n = R_{D_n}\Big/\sum_{m=1}^{\infty} R_{D_m} = L_n\Big/\sum_{m=1}^{\infty} L_m = L_n/\xi_{0,0} \tag{34}$$

Solution for the Complete MWD Curve

The distribution functions of the increasing polymer chain length can be solved either numerically or analytically by persons familiar with the integration of ordinary differential equations. The analytical solution, although algebraically complicated, is given here because it agrees completely with the Moments Model (Equations (20) and (21)) while also predicting nuances in MWD such as peak location multimodality, and tailing.

The software package known as Mathematica™ was used to develop an analytical solution to the system of ordinary differential equations that describe the propagating polymer distribution functions L(n), S(n), and V(n). The analytical solution for L(n) was used to describe the instantaneous dead polymer distribution X(n), by normalizing L(n) over its integral.

$$X(n) = L(n)\Big/\int_0^{\infty} L(m)\mathrm{dm} \tag{35}$$

An explicit analytical solution for X(n) may be obtained using Mathematica™. The analytical solution for X(n) is described below as a function of parameters $B_n$ and $DP_{no}$, and the solution may be restated in terms of $R_c$ or $B_n$ through the substitution $$R_c = B_n = B_c/(1 - B_c). \tag{36}$$

The chain length distribution function X(n) is evaluated as follows from the definition of RootSum given by Mathematica™. The polynomial below has three roots which will be called $x_1$, $x_2$, and $x_3$. Two of the three roots of the polynomial are complex over the range of possible values of $B_n$.

$$0=1+B_n+(3+5B_n+2B_n^2)x+3(1+B_n)x^2+x^3 \tag{37}$$

The roots $x_1$, $x_2$, and $x_3$ are used in the instantaneous dead chain length distribution function X(n).

$$X(n)=\left(\frac{1+B_n}{DP_{no}}\right)\sum_{i=1}^{3}\frac{(1+2x_i+B_nx_i+x_i^2)}{3+5B_n+2B_n^2+6(1+B_n)x_i+3x_i^2}e^{x_in/DP_{no}}\quad(0\le n\le\infty) \tag{38}$$

Various moments of X(n) are evaluated to give instantaneous number and weight average chain lengths ($DP_n$, $DP_w$) or molecular weights ($M_n$, $M_w$). The average chain lengths and weights resulting from the continuous distribution X(n) are equal to the moment model predictions given previously for long chain polymerization and a discrete distribution and are expressed below in terms of both $B_c$ and $B_n$, where $R_c=B_n$.

$$DP_n=\frac{\int_0^\infty nX(n)dn}{\int_0^\infty X(n)dn}=\frac{DP_{no}}{1-B_c}=DP_{no}(1+B_n)\quad M_n=\frac{M_{no}}{1-B_c}=M_{no}(1+B_n) \tag{39}$$

$$Z_p=\frac{DP_w}{DP_n}=\frac{M_w}{M_n}=\frac{\left(\int_0^\infty n^2X(n)dn\right)\left(\int_0^\infty X(n)dn\right)}{\left(\int_0^\infty nX(n)dn\right)^2}=2+6B_c-4B_c^2=\frac{2+10B_n+4B_n^2}{(1+B_n)^2} \tag{40}$$

Those skilled in the art of polymer reaction engineering are familiar with the use of predicted bulk polymer MWD models to create simulated Size Exclusion Chromatography (SEC) curves. Such a simulation is useful in relating how kinetics and recipes are expected to impact SEC measurements. The primary calibrated result of an SEC measurement is a table or plot of dw/d Log(M) versus Log(M), where M is species molecular weight or size and dw/d Log(M) is an indication of the relative amount of polymer corresponding to M. It is commonly accepted that this SEC result can be simulated by a table or plot of $n^2$ X(n) versus Log(M), where $n^2$ X(n) is expected to be proportional to dw/d Log(M).

Figure 2:
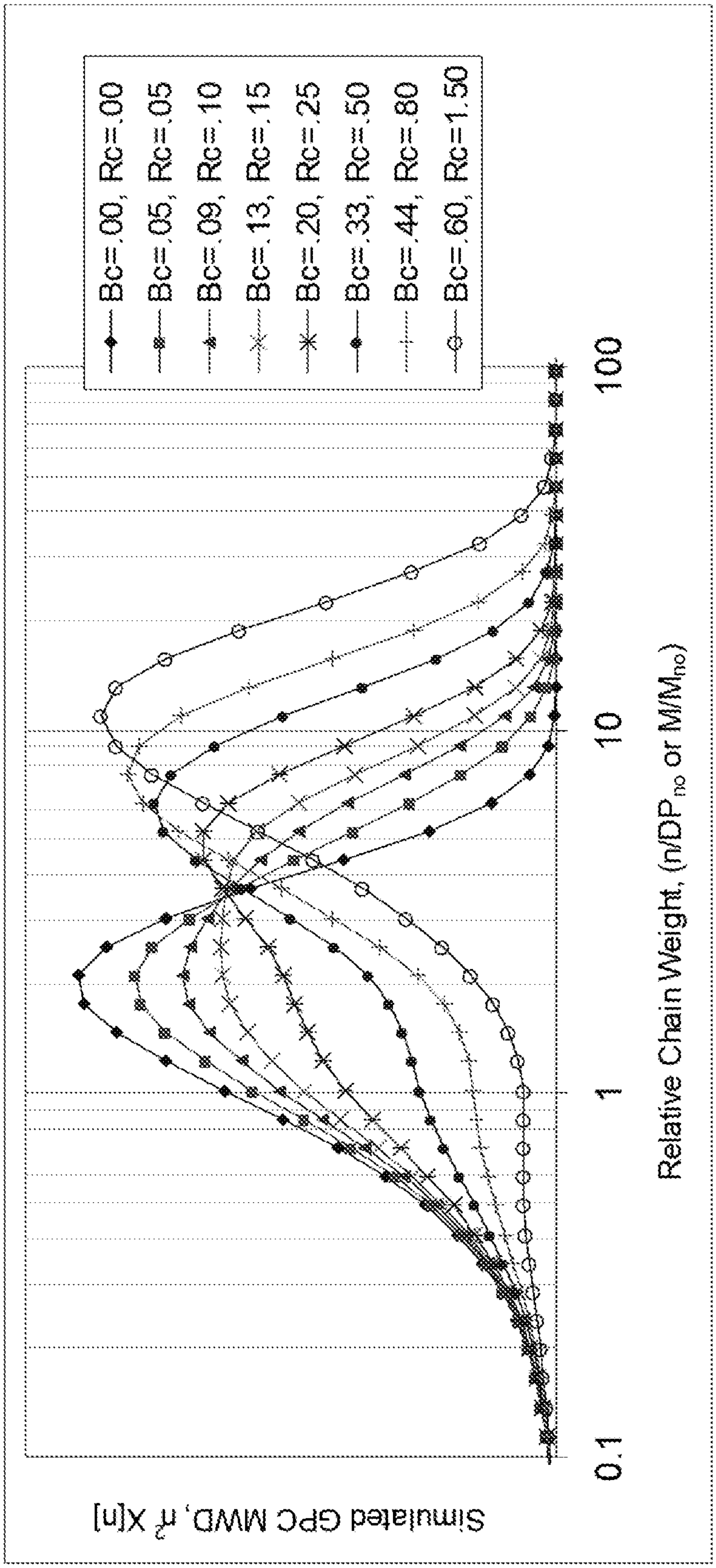
FIG. 2 is a graphical model predicted dependence of molecular weight distribution (MWD) curve on branching level.

FIG. 2 shows a series of simulated SEC curves wherein the level of diene "Ladder Branching" ($B_c$, $B_n$, $R_c$) is varied. The independent variable in FIG. 2 is scaled by linear molecular weight or chain length such that the plotting is universal and independent of starting molecular weight. The zero-branching case in FIG. 2 is the well-known "most probable" MWD (P. J. Flory, *J. Am. Chem. Soc.* 1936, 58, 1877) and is the expected MWD for linear addition copolymerization performed under ideal homogeneous conditions.

Figure 3:
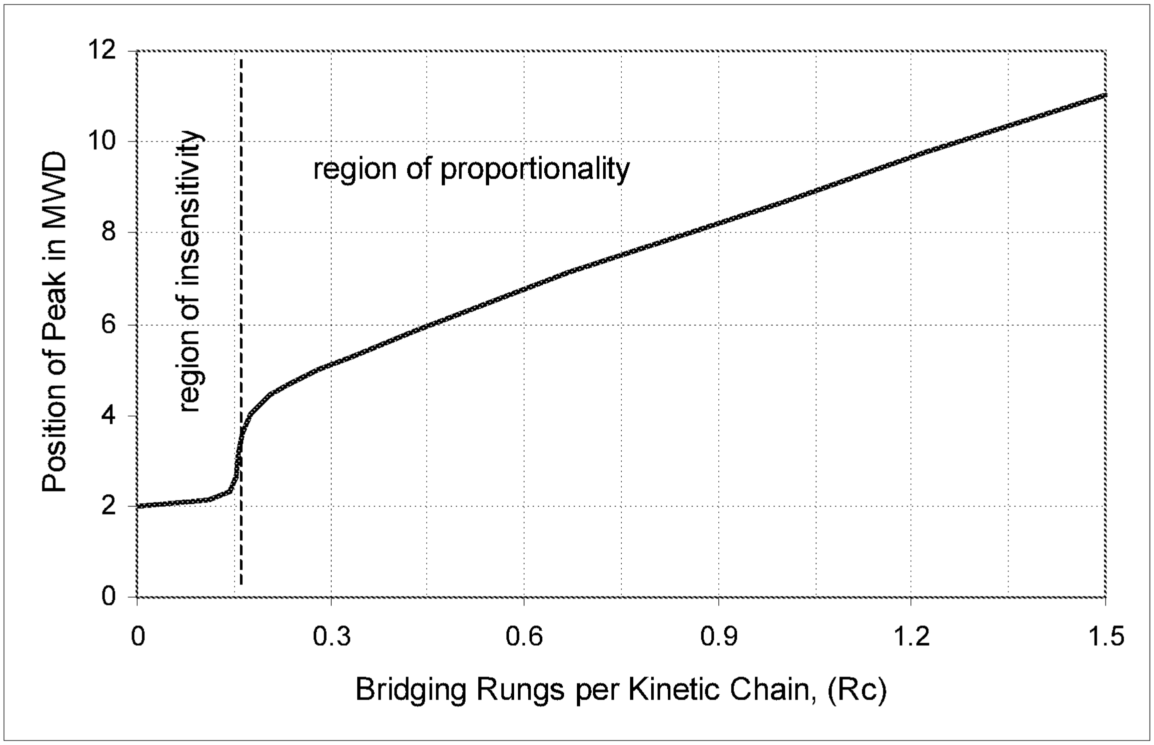
FIG. 3 is a graphical model predicted dependence of relative peak molecular weight on branching level.

A more detailed analysis of the peak MW values has been performed using a large series of branching levels applied to the MWD model. FIG. 3 shows a universal plot of relative peak MW as a function branching level. FIG. 3 demonstrates the low branching region of peak MW insensitivity ($0<R_c<0.15$) as well as the higher branching regime ($R_c\ge0.15$) wherein the peak MW increases steadily with branching level.

Alternate Tri-Functional Dienes "Ladder Branching" Mechanism and Model

There are alternate mechanisms that can explain branching and MWD trends observed when dual chain catalysts incorporate dienes under desired conditions. While $M_n$ is often observed to increase with dienes addition, some catalyst-diene combinations have been found to result in $M_w$ increases while demonstrating little or no measurable $M_n$ increase as diene levels are raised. One explanation for constant $M_n$ is that a single beta-hydride elimination (or chain-transfer to hydrogen) might tend to occur immediately after the diene has inserted on both propagating chains. This scenario would result in the creation of tri-functional branches by the dienes insertion and, in pure form, would eliminate bridged propagating species ($S_n$) from the kinetics.

The kinetics scheme is modified to consider this alternative mechanism by substituting the following reactions for "Dienes Bridging".

| | Reaction | Rate Constant |
|---|---|---|
| Tri-functional Diene Branching | $P_{n,m}+D\rightarrow P_{0,n+m}+br+kc$<br>$P_{n,m}+D\rightarrow P_{n+m,0}+br+kc$ | $2\ k_d$, (L/mole/sec)<br>$2\ k_d$, (L/mole/sec) |

Any polymer reaction engineer skilled in the art of modeling and kinetics could re-derive the moments and MWD function model for these alternative kinetics using the same sequence of assumptions as before. The resulting instantaneous dead chain length distribution function X(n) is given below for this tri-functional branching mechanism $$X(n)=\left(\frac{\operatorname{Cosh}\left[\frac{n\sqrt{B_c}}{DP_{no}(1-B_c)}\right]-\sqrt{B_c}\operatorname{Sinh}\left[\frac{n\sqrt{B_c}}{DP_{no}(1-B_c)}\right]}{DP_{no}(1-B_c)}\right)e^{-n/(DP_{no}(1-B_c))}\quad(0\le n\le\infty) \tag{41}$$

In equation (41), $B_c$ is defined as branch points per kinetic chain and $DP_{no}$ is defined as the diene-free average linear chain length. The kinetic scheme assumes that the linear (kinetic) chain length actually decreases with dienes incorporation due to diene induced beta hydride elimination. Therefore, a good alternate indication of branching is $B_n$, which is defined as branch points per number average polymer molecule, where $B_c=B_n/(1+B_n)$. The function X(n) is easily rewritten in terms of $B_n$.

Integrations of X(n) gives results for instantaneous number and weight average chain lengths ($DP_n$, $DP_w$) or molecular weights ($M_n$, $M_w$). The average chain lengths and weights resulting from the continuous distribution X(n) are equal to a moment model predictions when long chain polymerization is assumed. Integration of X(n) confirms that $DP_n$ and $M_n$ are constant with respect to branching level ($B_c$ or $B_n$). Integration of X(n) also shows how polydispersity is expected to vary with branching level when dienes are assumed to create tri-functional branches.

$$DP_n = \frac{\int_0^\infty nX(n)dn}{\int_0^\infty X(n)dn} = DP_{no} \text{ therefore: } M_n = M_{no} \tag{42}$$

$$Z_p = \frac{DP_w}{DP_n} = \frac{M_w}{M_n} = \frac{\left(\int_0^\infty n^2 X(n)dn\right)\left(\int_0^\infty X(n)dn\right)}{\left(\int_0^\infty nX(n)dn\right)^2} = 2(1+B_c) = \frac{2(1+2B_n)}{1+B_n} \tag{43}$$

The above relationship of polydispersity ($M_w/M_n$) to tri-functional branching level shows no instability or divergence at any branching level. Most surprising is that at high branching levels the polydispersity is predicted to level off at 4. Of course, this prediction is for an ideal co-polymerization and symmetric catalyst system with any non-idealities expected to give an increased polydispersity.

Figure 4:
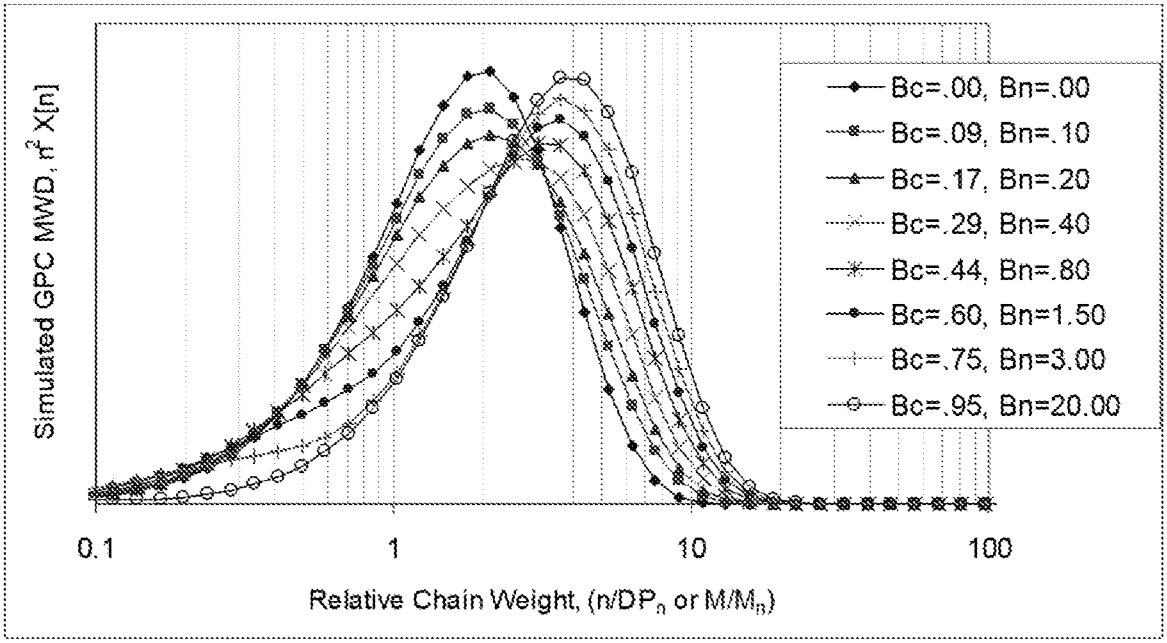
FIG. 4 is a graphical depiction of a predicted dependence of the molecular weight distribution (MWD) curve on tri-functional dienes branching level.
Figure 5:
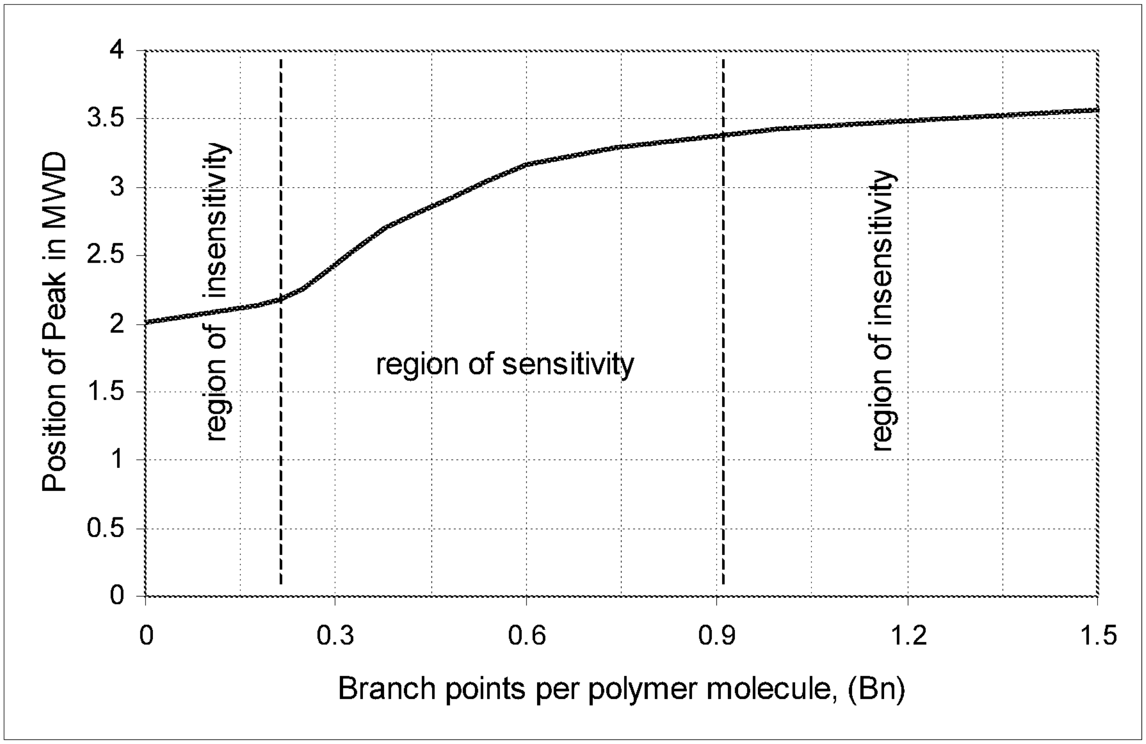
FIG. 5 is a graphical depiction of a predicted dependence of relative peak of the molecular weight (MW) on tri-functional dienes branching level.
Figure 6:
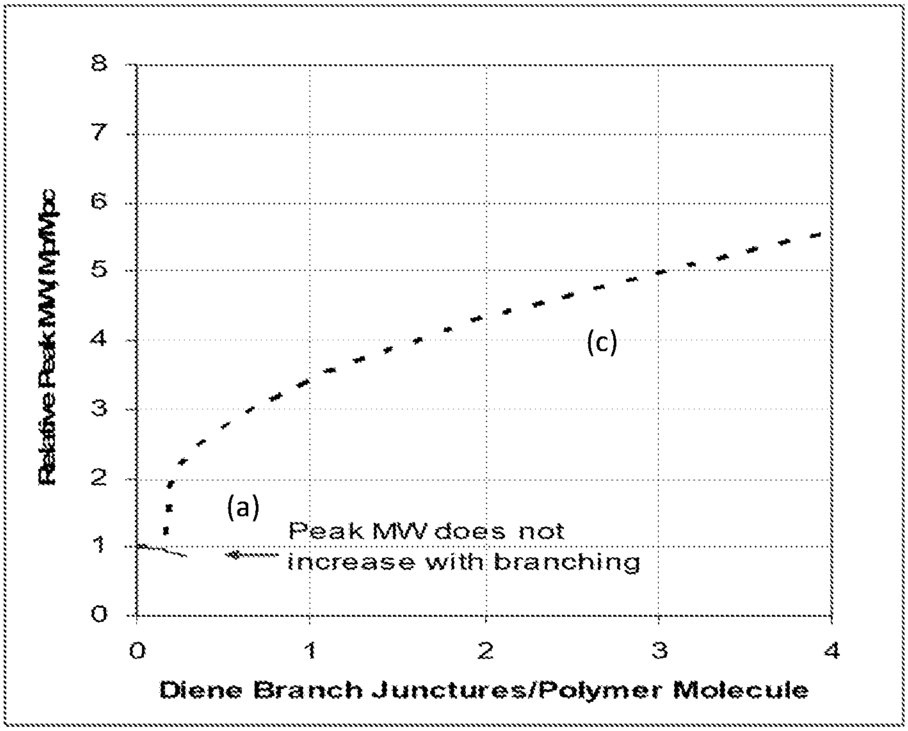
FIG. 6 is a graphical depiction of a model-predicted effect of branching on peak molecular weight ($M_p$) versus branches per polymer molecule of conventional diene branching (solid line) and “Ladder branching” (dashed line).

The chain length distribution function can again be used to construct predicted MWD curves. FIG. 4 is a series of simulated SEC curves wherein the level of tri-functional branching ($B_c$ or $B_n$) is varied. The independent variable in FIG. 4 is scaled by linear molecular weight or chain length such that the plotting is universal and independent of starting molecular weight. The zero-branching case in FIG. 4 is the well-known "most probable" MWD and is expected for linear addition co-polymerization performed under ideal homogeneous conditions. FIG. 5 is a plot of relative peak MW for tri-functional dienes branching which demonstrates that the MWD peak is most sensitive to branching level at intermediate branching levels in the approximate range of $0.2<B_n<0.9$ or $0.17<B_c<0.5$.

Conventional Branching Models

The purpose of this section is to compare a variety of conventional dienes branching and random polymer coupling to the "Ladder Branching" models. The comparison demonstrates the inherent instability of conventional dienes branching and random polymer coupling in contrast to "Ladder Branching". The molecular architecture resulting from the dienes "Ladder Branching" is different from (a) the conventional Dienes Continuous Stirred Tank Reactor (CSTR) Branching Model, (b) conventional Dienes Semi-Batch Branching Model; (c) Polymer CSTR Coupling Model; and (d) Polymer Batch Coupling Model.

a) Conventional Dienes CSTR Branching Model Ver Strate-1980 (G. Ver Strate, C. Cozewith, W. W. Graessley, *J. App. Polym. Sci.* 1980, 25, 59), Guzman-2010 (J. D. Guzman, D. J. Arriola, T. Karjala, J. Gaubert, B. W. S. Kolthammer, *AIChE* 2010, 56, 1325):

$$Z_p = \frac{DP_w}{DP_n} = \frac{M_w}{M_n} = (1-B_c)\left(\frac{1-4B_c-\sqrt{1-8B_c}}{(2B_c)^2}\right) = \frac{1-3B_n-\sqrt{(1-7B_n)(1+B_n)}}{(2B_n)^2} \tag{44}$$

b) Conventional Dienes Semi-Batch Branching Model, Cozewith-1979 (C. Cozewith, W. W. Graessley, G. Ver Strate, *Chem. Eng. Sci.* 1979, 34, 245), and d) Polymer Batch Coupling Model, Cozewith-1979, Flory-1953 (P. J. Flory, *Principles of Polymer Chemistry*, Cornell University Press, 1953), Tobita-1995 (H. Tobita, *J. Polym. Sci. B* 1995, 33, 1191):

$$Z_p = \frac{DP_w}{DP_n} = \frac{M_w}{M_n} = \frac{2-2B_c}{1-4B_c} = \frac{2}{1-3B_n} \tag{45}$$

$$X(n) = e^{-n(1+2B_c)/DP_{no}}\left(\frac{1}{DP_{no}}\right)\sum_{b=0}^{\infty}\left(\frac{n}{DP_{no}}\right)^{3b}\frac{(2B_c)^b}{(1+b)!(1+2b)!} \tag{46}$$

c) Polymer CSTR Coupling Model:

$$Z_p = \frac{DP_w}{DP_n} = \frac{M_w}{M_n} = (1-B_c)\left(\frac{1-\sqrt{1-16B_c}}{4B_c}\right) = \frac{1-\sqrt{(1-15B_n)/(1+B_n)}}{4B_n} \tag{47}$$

Characterizing Tetra-functional Long-Chain Branched Polyolefin

Depending on the degree of branching, a variety of methods can either determine LCB, such as nuclear magnetic resonance (NMR), or distinguish the effect of LCB in the polymer. For example, the effect of LCB is observed in shear flow in the van Gurp-Palmen analysis, also an increase of the shear viscosity at low angular frequencies and strength of the shear thinning behavior can be attributed to LCB. In extensional flow, the influence of LCB is usually identified in the degree of hardening or the strength of the melt and the maximum deformation achieved. Other plots such as Mark-Houwink plots, broadening molecular weight distributions (MWD), and $g'_{vis}$ plots provide additional information about LCB. A high level of natural LCB in a polymer is difficult to achieve due to the limited concentration of vinyl terminated polymers (maximum one per polymer chain) and the need to run to high conversion to ensure LCB formation. To ensure high conversion, there is a low ethylene concentration in the reactor, thus enabling a great amount of vinyl terminated polymers to be reinserted in a second polymer chain.

The conventional process of incorporating dienes into a polymer synthesis system suffers from the fundamental flaw of gel formation or reactor fouling at high branching levels. The kinetic modeling, discussed in previous paragraphs, may provide good predictive results that enable a better understanding of gel formation. For example, longer polymer chains have proportionally more pendant vinyls and polymer chains containing more pendant vinyls will more likely re-insert into the catalyst to form a LCB. Thus, the larger polymer chains preferentially re-insert forming tetra-functional branches, which are even larger polymer molecules, and a gel problem or instability results when the LCB level reaches a threshold value. A simulation of the weight average molecular weight ($M_w$) and number average molecular weight ($M_n$) as a function of conventional tetra-functional branching is shown in FIG. 1 for ethylene-based polymer in a semi-batch reactor at constant pressure. In FIG. 1, $M_n$ only marginally increases as $M_w$ becomes infinite. In this example, as the $M_w$ increases to a number greater than 200,000 grams per mole (g/mol), the polymer molecular weight distribution (MWD) becomes unstable and gels begin to form. The MWD is defined by the weight average molecular weight, $M_w$, divided by the number average molecular weight, $M_n$, ($M_w/M_n$).

Polymer gels are narrowly defined for the purpose of this disclosure to be a polymer fraction that is phase separated due to its high branching level and/or high molecular weight. Polymer gels can be observed in solution or in the melt and tend to interfere with properties such as optical clarity and film and fiber performance. Polyethylene interpolymer gels can be measured by degree of polymer insolubility in hot xylene. Gels content is often correlated to and therefore estimated from GPC polymer recovery percentage. When polymer gels form, they may deposit within the reactor and result in fouling.

Figure 7:
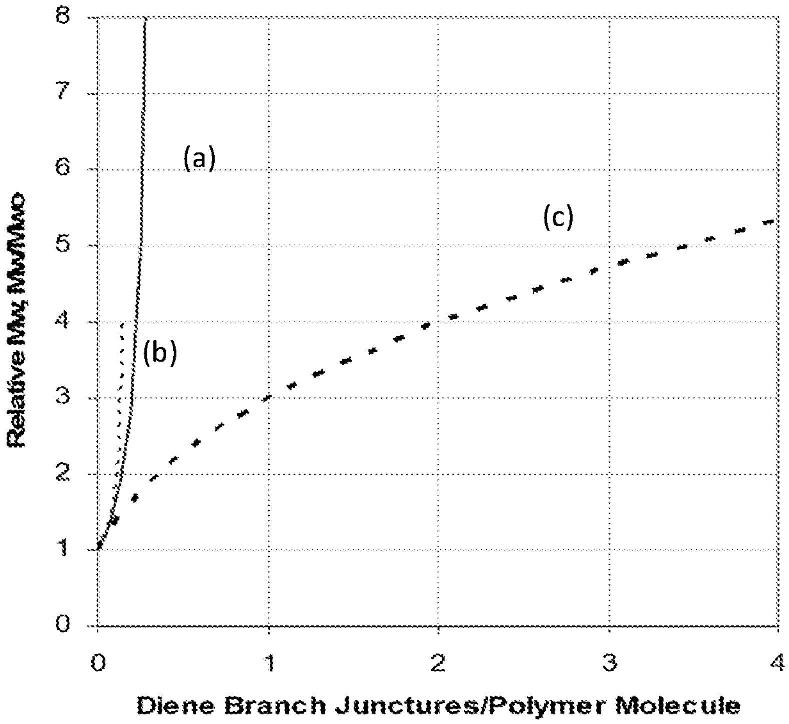
FIG. 7 is a graphical depiction of a model-predicted effect of branching on weight average molecular weight ($M_w$) versus branches per polymer molecule of conventional diene branching (solid line) and “Ladder Branching” (dashed line).
Figure 8:
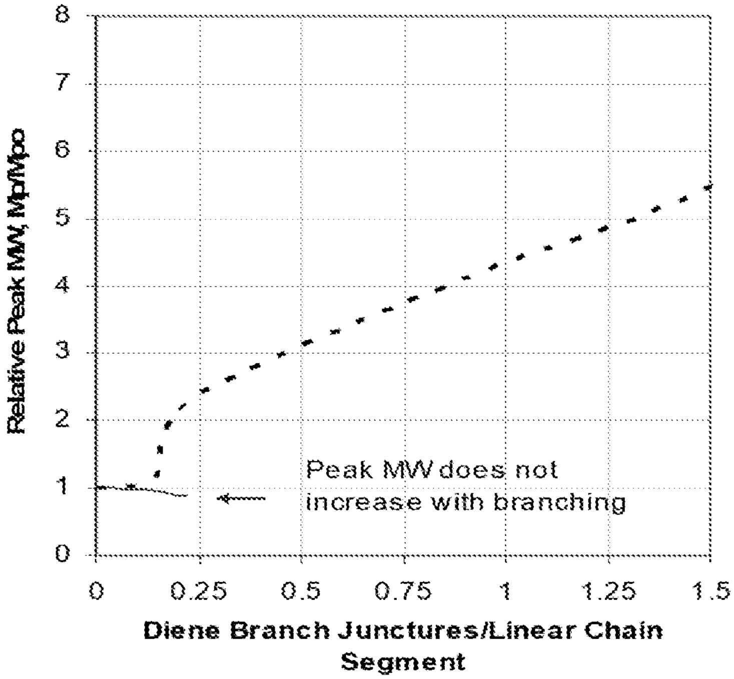
FIG. 8 is a graphical depiction of a model-predicted effect of branching on peak weight average molecular weights ($M_p$) versus branches per linear chain segment of conventional diene branching (solid line) (vs. $B_c$) and the $M_p$ of “Ladder Branched” polymers (dashed line) (vs. $R_c$).
Figure 9:
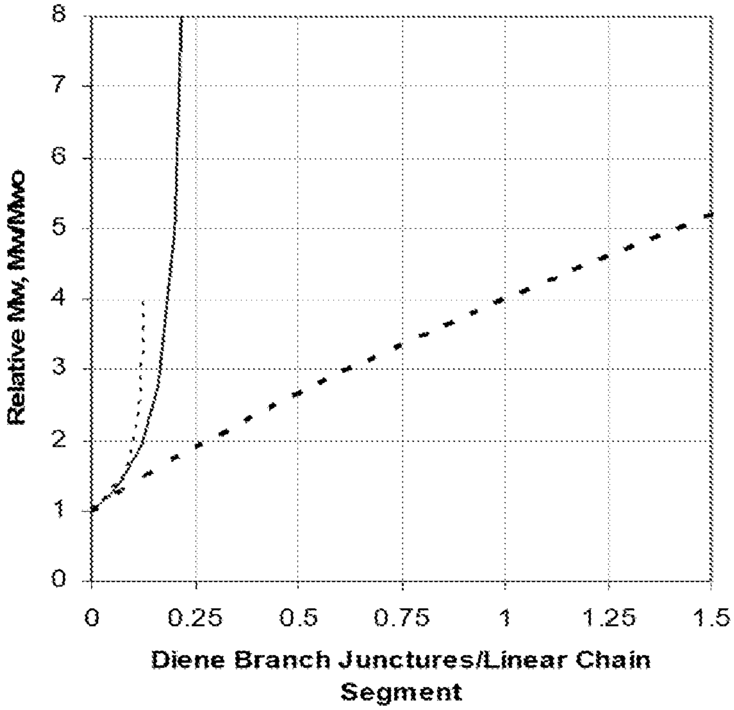
FIG. 9 is a graphical depiction of a model-predicted effect of branching weight average molecular weight ($M_w$) versus branches per linear chain segment for conventional diene branching (vs. $B_c$) (solid line) and “Ladder Branched” polymer (dashed line) (vs. $R_c$).

FIG. 7 and FIG. 8 show the differences in the MWD curves expected from conventionally branched and "Ladder Branched" polymers. A series of metrics describing MWD characteristics has been developed from a study of MWD data and comparison to MWD models. Each of the MWD descriptive metrics presented here is independent of average MW and is focused on the high MW portion of the MWD. The MWD metrics are derived from a scaled MWD curve (dW/d log M) with the primary or highest peak of the MWD defined as having a value of unity. If more than one peak have the same height, the highest MW peak is the primary peak. The independent variable in the MWD curve is Log(M), which is the logarithm of M to base 10. The metrics will be defined and presented as a function of $M_w/M_{wo}$ and $M_p/M_{po}$ which can be translated to branches per molecule or segment using FIG. 6, FIG. 7, FIG. 8, and FIG. 9. One skilled in the art of GPC data interpretation would understand these metrics and would be able to calculate them from GPC data.

Figure 10:
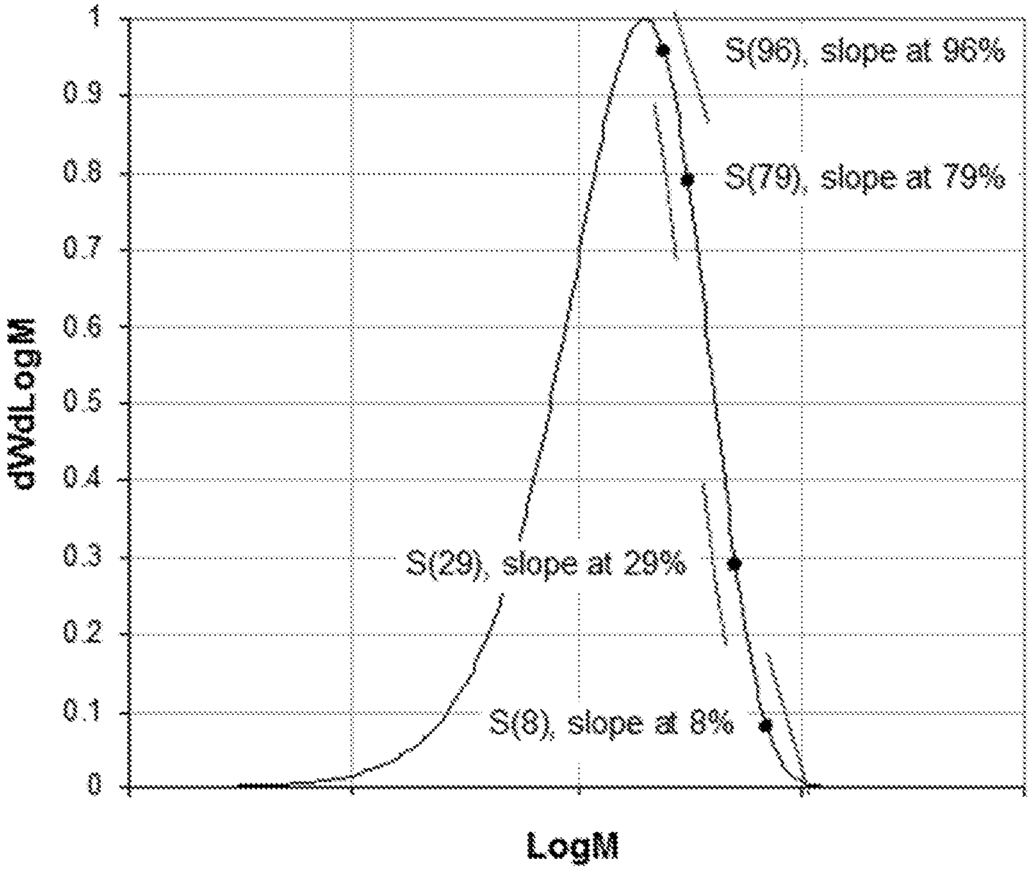
FIG. 10 is a graphical depiction of MWD slopes used to calculate shape metrics G(79/29) and G(96/08) where S(X) is the slope at X % of the MWD height. G(A/B)=(S(A)−S(B))/S(A).
Figure 11:
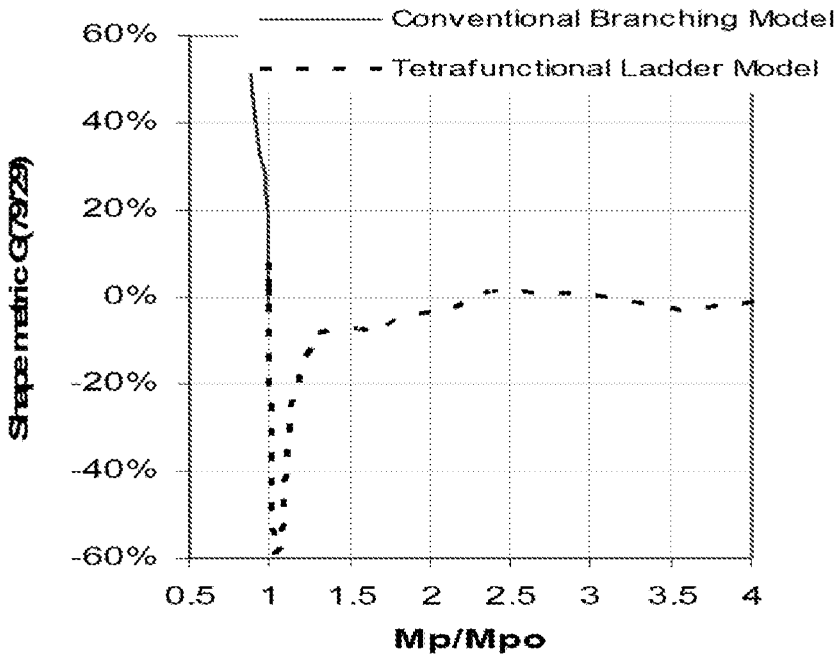
FIG. 11 is a graphical depiction of a model predicted molecular weight distribution (MWD) shape metric G(79/29) compared for conventional and “Ladder Branching” as a function of branching level as depicted by relative peak MW($M_p/M_{po}$).
Figure 12:
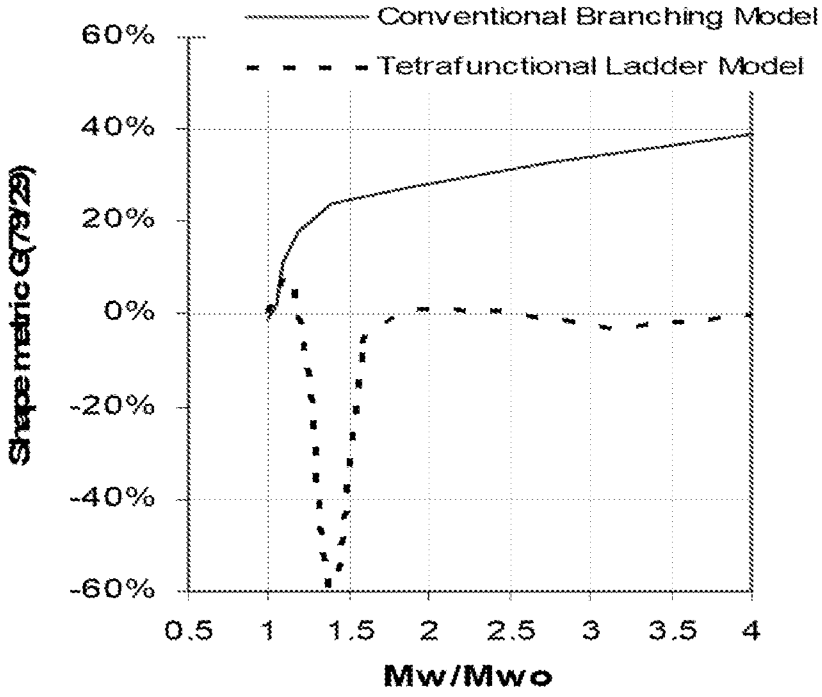
FIG. 12 is a graphical depiction of a model predicted MWD shape metric G(79/29) compared for conventional and “Ladder Branching” as a function of branching level as depicted by relative weight average MW ($M_w/M_{wo}$).
Figure 13:
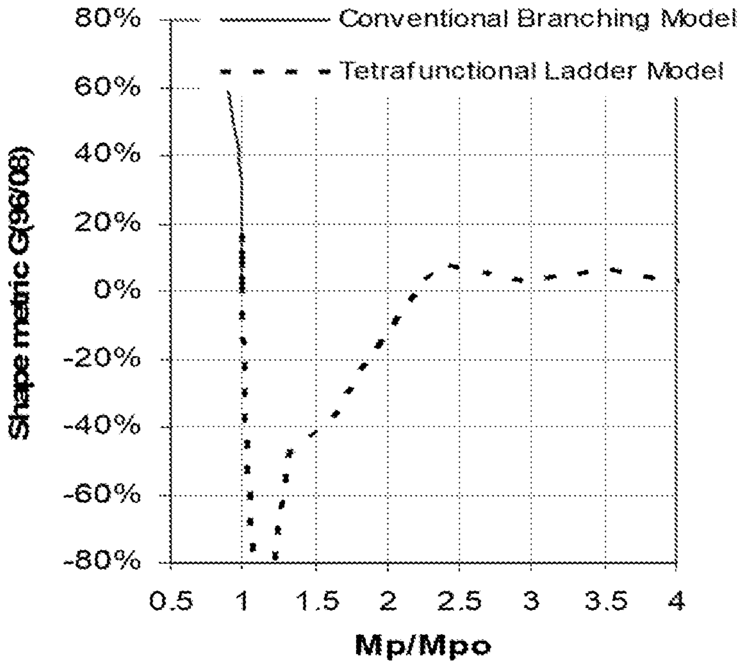
FIG. 13 is a graphical depiction of a model predicted MWD shape metric G(98/08) compared for conventional and “Ladder Branching” as a function of branching level as depicted by relative peak MW ($M_p/M_{po}$).
Figure 14:
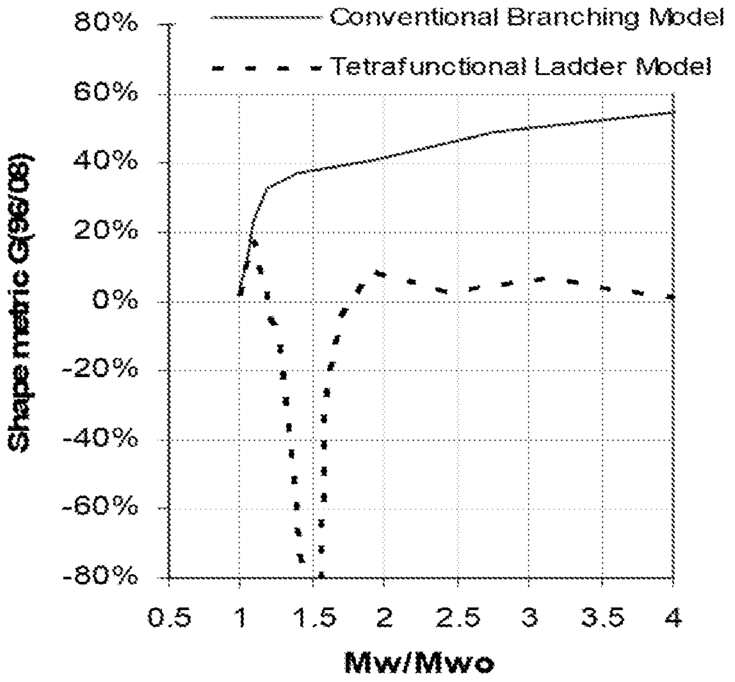
FIG. 14 is a graphical depiction of a model predicted MWD shape metric G(98/08) compared for conventional and "Ladder Branching" as a function of branching level as depicted by relative weight average MW ($M_w/M_{wo}$).

A family of GPC shape metrics, G(A/B), are calculated from the slopes at defined points on the right hand side of the MWD curve, where S(A) and S(B) are the first occurrences of these slopes to the right of the primary peak at A % and B % of the height of the primary peak. The points A and B are selected as pairs that would have nearly the same slope if the MWD were "most probable". A depiction of these points and their slope is shown in the graph of FIG. 10 for a most probable MWD. These slope pairs S(A) and S(B) are used together to calculate a function G(A/B) resembling a second derivative, which will be shown to be a useful metric to differentiate "Ladder Branched" MWDs from conventionally or randomly branched MWDs. Values of G(79/29) and G(96/08) describe the change in slope of the right hand side (RHS) of the MWD and are defined below from the high MW slopes:

$$G(79/29)=(S(79)-S(29))/S(79) \tag{48}$$

$$G(96/08)=(S(96)-S(8))/S(96) \tag{49}$$

The shape metrics G(79/29) and G(96/08) are tested on the MWD models for tetra-functional "Ladder Branching" and conventional dienes branching with the results plotted in FIG. 11, FIG. 12, FIG. 13, FIG. 14. The figures indicate that conventional branching gives G(79/29) and G(96/08) values that increase steadily as MW responds to branching. However, when applied to "Ladder Branching", these shape metrics fall precipitously at low levels of branching (low $M_w/M_{wo}$) then approach zero at moderate to high levels of branching. That is not surprising, since the high MW portion of a "Ladder Branched" MWD resembles a most probable MWD.

FIG. 11, FIG. 12, FIG. 13, and FIG. 14 depict a similar response of G(79/29) and G(96/08) metrics to branching, however, the G(96/08) metric is expected to be more sensitive to high MW tailing that would result from conventional dienes branching. The term "high MW tailing" or "high molecular weight tail" refers to the high molecular weight fraction as shown by the conventional GPC and the absolute GPC. Depending on catalyst-diene pairing and experimental conditions, one might expect a "Ladder Branched" system to have some conventional branching thereby raising the shape metric value above that expected for pure "Ladder Branching".

MWD Area Metrics

Figure 16:
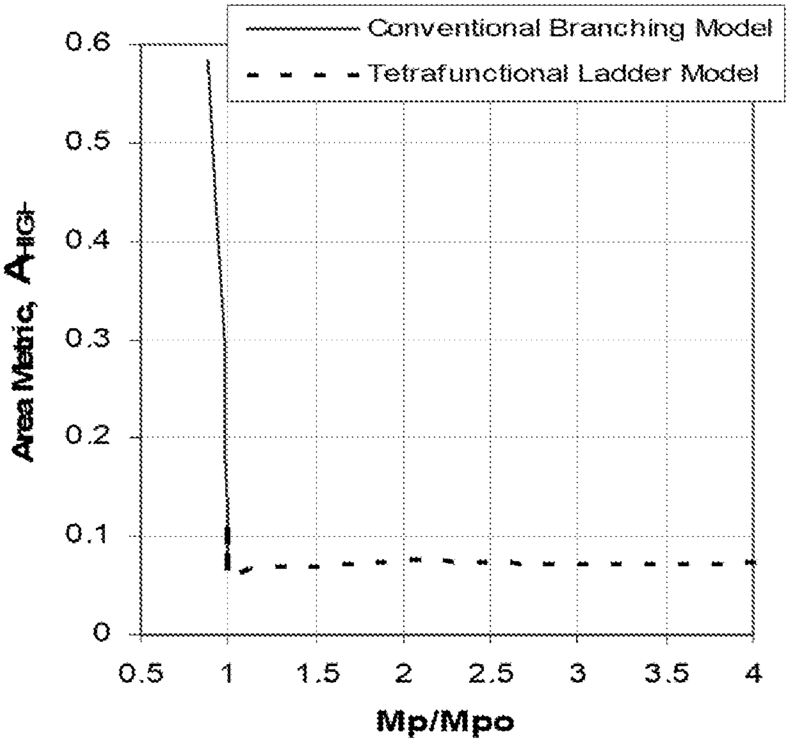
FIG. 16 is a model predicted MWD area metric, $A_{HIGH}$, compared for conventional and "Ladder Branching" as a function of branching level as depicted by relative weight average molecular weight ($M_p/M_{po}$).
Figure 17:
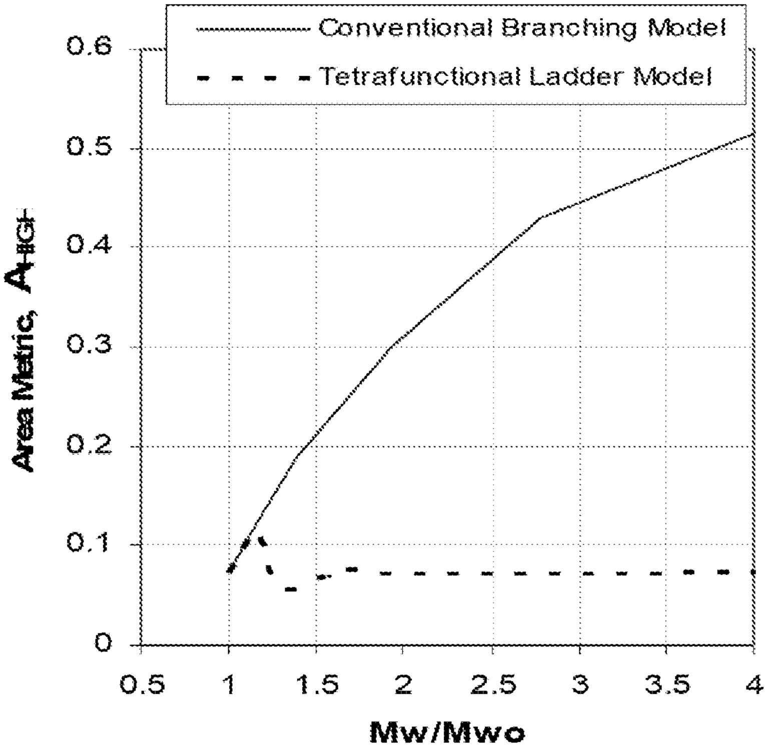
FIG. 17 is a model predicted MWD area metric, $A_{HIGH}$, compared for conventional and "Ladder Branching" as a function of branching level as depicted by relative peak molecular weight ($M_w/M_{wo}$).
Figure 18:
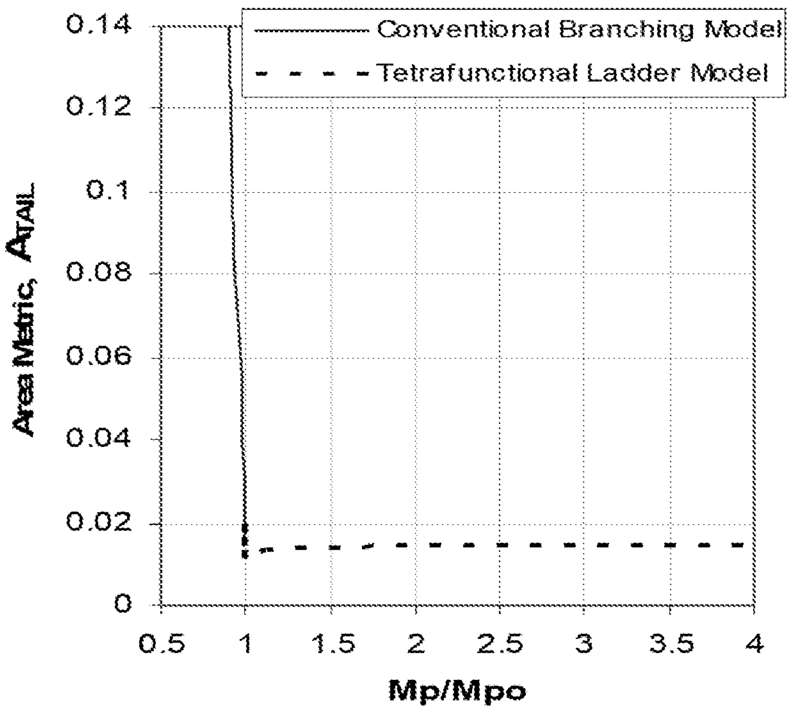
FIG. 18 is a model predicted MWD area metric, $A_{TAIL}$, compared for conventional and "Ladder Branching" as a function of branching level as depicted by relative peak molecular weight ($M_p/M_{po}$).
Figure 19:
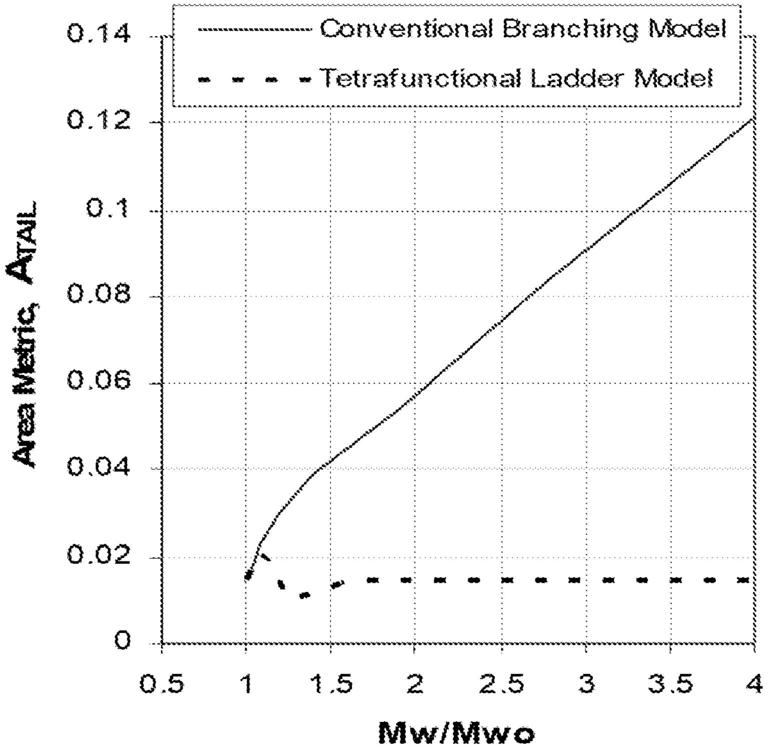
FIG. 19 is a model predicted MWD area metric, $A_{TAIL}$, compared for conventional and "Ladder Branching" as a function of branching level as depicted by relative weight average molecular weight ($M_w/M_{wo}$).

Visual inspections of the "Ladder Branched" MWD show that there is a characteristic lack of a high MW tail normally seen for branched polymers. FIG. 16 and FIG. 17 demonstrate how the model predicts a lack of tailing for "Ladder Branched" polymers. The "Ladder Branching" MWD data shows the characteristic lack of tail for many experiments but also indicates some tail formation is possible depending on polymerization conditions and diene/catalyst pairing.

Polydispersity indices ($M_w/M_n$, $M_z/M_w$, etc) are known metrics for tailing, but are not preferred due to their sensitivity to low MWD artifacts. Therefore, a more focused version of the polydispersity indices is used to develop a standard for which the integrals are performed only on the high MW portion of the MWD. The $M_w/M_n$ and $M_z/M_w$ metrics are successful in differentiating dienes "Ladder Branching" from conventional branching and are very sensitive to high MW baseline selection and baseline noise.

Figure 15:
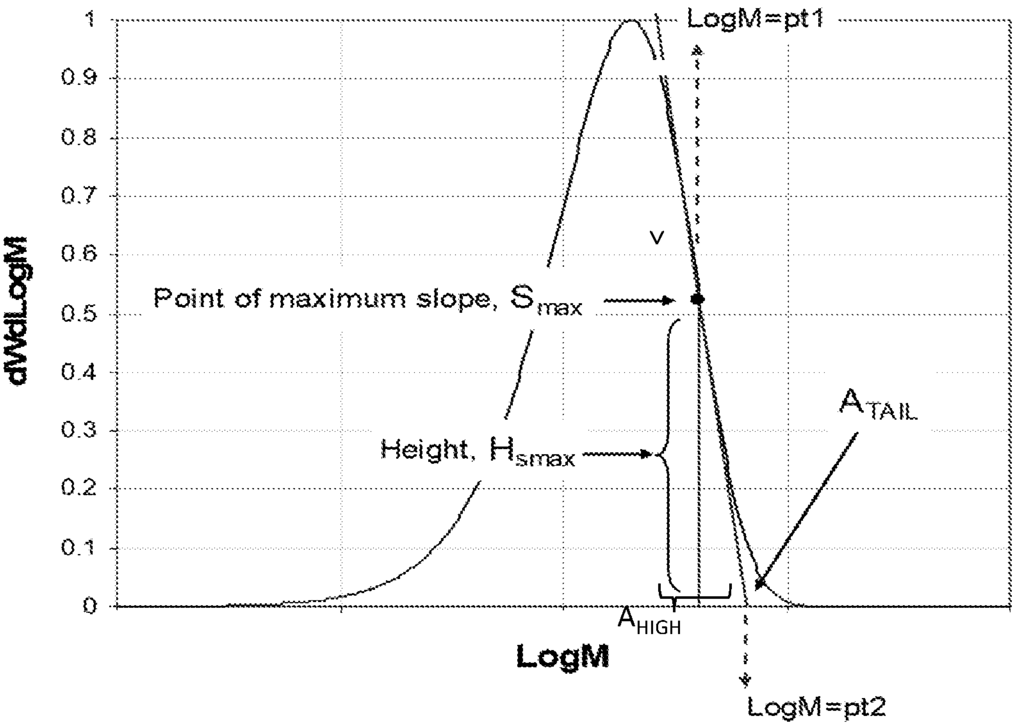
FIG. 15 is a graphical depiction of the MWD curve illustrating how the high MWD tail area metrics are defined using the point of maximum slope.

The area under the MWD curve is relatively insensitive to baseline issues as compared to the higher moments required to calculate MWD dispersity indices ($M_w/M_n$, $M_z/M_w$, etc). Therefore, it was decided that metrics be developed which entail the non-weighted integration of the MWD. These MWD area metrics, $A_{HIGH}$ and $A_{TAIL}$, are calculated from the GPC curve areas for defined regions on the right hand side of the MWD curve. The MWD area metrics ($A_{HIGH}$ and $A_{TAIL}$) are derived from a scaled MWD curve (dW/log M) with the primary or highest peak of the MWD defined as having a value of unity. If more than one peak have the same height, the highest MW peak is the primary peak. The independent variable in the MWD curve is Log(M), which is the logarithm of M to base 10. Both of the MWD area metrics depend on the point of maximum slope of the high MW portion of the MWD. The quantities and limits necessary for evaluating the area metrics are listed below, and demonstrated in FIG. 15 for a most probable MWD.

$S_{max}$=first instance of a maximum downward slope on the RHS (higher MW side) of the primary peak (absolute value of the slope) of the scaled MWD $H_{smax}$=height of the scaled MWD at the point of maximum slope pt1=Log M value of $S_{max}$ pt2=Log M value where the $S_{max}$ tangent crosses the x-axis The MWD area metrics are defined below, where $A_{HIGH}$ is merely the area of the MWD region falling after the point of maximum slope. The second area metric, $A_{TAIL}$, is the small high MW area depicted in FIG. 15, and is evaluated by subtracting a triangular area from $A_{HIGH}$.

$$A_{HIGH} = \int_{pt1}^{\infty} MWD d\text{Log}M \tag{50}$$

$$A_{TAIL} = A_{HIGH} - 1/2(H_{smax})^2 / S_{max} \tag{51}$$

The area metrics $A_{HIGH}$ and $A_{TAL}$ have been tested on the MWD models for "Ladder Branching" and conventional dienes branching with the results plotted in FIG. 16, FIG. 17, FIG. 18, and FIG. 19. The plots show that the high MW area, as defined by $A_{HIGH}$ or $A_{TAIL}$, increases dramatically as the conventional branching level is increased. However, the "Ladder Branching" model predicts that the high MW area metrics ($A_{HIGH}$ or $A_{TAIL}$) are almost unaffected by "Ladder Branching" level. The values of $A_{HIGH}$ and $A_{TAIL}$ for a most probable MWD are about 0.07 and 0.015, respectively. Example MWD data will demonstrate that the dienes-free linear polymers tend to have slightly higher values of $A_{HIGH}$ and $A_{TAIL}$ due to non-ideal aspects of the polymerization. Example data also show a variety of highly branched "Ladder Branched" polymers with essentially no high MW tail beyond what is expected from a most probable MWD. The high MW area metrics also are diagnostic of slight levels of high MW tail formation that "Ladder Branched" polymer can exhibit when accompanied by a degree of conventional branching. The metric $A_{TAIL}$ is less influenced by linear MWD non-ideality than $A_{HIGH}$. However, in theory $A_{HIGH}$ and $A_{TAIL}$ metrics are equally indicative of high MW tail formation.

Tetra-Functional Long-Chain Branched Polyolefin

Polymers produced from the "Ladder Branching", as described in Scheme 4, are included in this disclosure.

In embodiments, the ethylene-based polymers of this disclosure include a melt viscosity ratio or rheology ratio ($V_{0.1}/V_{100}$) at 190° C. of at least 10, where $V_{0.1}$ is the viscosity of the ethylene-based polymer at 190° C. at an angular frequency of 0.1 radians/second, and $V_{100}$ is the viscosity of the ethylene-based polymer at 190° C. at an angular frequency of 100 radians/second. In one or more embodiments, the melt viscosity ratio is at least 14, at least 20, at least 25, or at least 30. In some embodiments, the melt viscosity ratio is greater than 50, at least 60, or greater than 100. In some embodiments, the melt viscosity ratio is of from 14 to 200.

The "rheology ratio" and "melt viscosity ratio" are defined by $V_{0.1}/V_{100}$ at 190° C., where $V_{0.1}$ is the viscosity of the ethylene-based polymer at 190° C. at an angular frequency of 0.1 radians/second, and $V_{100}$ is the viscosity of the ethylene-based polymer at 190° C. at an angular frequency of 100 radians/second.

In one or more embodiments, the ethylene-based polymers of this disclosure have an Average g' less than 0.86, where the Average g' is an intrinsic viscosity ratio determined by gel permeation chromatography using a triple detector. In some embodiments, the ethylene-based polymers of this disclosure have an Average g' from 0.64 to 0.86. All individual values and subranges encompassed by "from 0.64 to 0.86" are disclosed herein as separate embodiments; for example, the Average g' of the ethylene-based polymer may range from 0.64 to 0.75, from 0.68 to 0.79, or from 0.65 to 0.83. In one or more embodiments, the Average g' is from 0.65 to 0.84, from 0.66 to 0.82, or from 0.66 to 0.80.

In some embodiments, the ethylene-based polymers have a G(79/29) value of less than or equal to 0.035 as determined from a gel permeation chromatography curve having a peak height, a slope M79 at 79% of the peak height, and a slope M29 at 29% of the peak height, wherein the G(79/29) value equals (M79−M29)/M79. All individual values and subranges encompassed by "of less than or equal to 0.035" are disclosed herein as separate embodiments; for example, "of less than or equal to 0.035" includes from greater than 0.0 to 0.035, from 0.010 to 0.034, and includes negative values. In one or more embodiments, the ethylene-based polymer of this disclosure may have a G(79/29) value of less than or equal to 0.030 as determined from a gel permeation chromatography curve.

In one or more embodiments, the melt viscosity ratio of the ethylene-based polymer of this disclosure may be greater than ten times the elasticity factor where the melt viscosity ratio ($V_{0.1}/V_{100}$) is determined by $V_{0.1}$, the viscosity of the ethylene-based polymer at 190° C. at an angular frequency of 0.1 radians/second, and $V_{100}$, the viscosity of the ethylene-based polymer at 190° C. at an angular frequency of 100 radians/second, and the elasticity factor m is $[((\tan(\delta_{0.1})-\tan(\delta_{100}))*1000)/(0.1-100))]$, wherein $\tan(\delta_{0.1})$ is the tangent of the phase angle at 0.1 radians/second, and $\tan(\delta_{100})$ is the tangent of the phase angle at 100 radians/second.

In one or more embodiments, the ethylene-based polymer may have an elasticity factor m at 190° C. that is less than or equal to 8 seconds/radian, where m is $[((\tan(\delta_{0.1})-\tan(\delta_{100}))*1000)/(0.1-100))]$. In other embodiments, the ethylene-based polymer may have an elasticity factor m at 190° C. that is less than or equal to 4 seconds/radian.

In various embodiments, the melt strength of the ethylene-based polymer of this disclosure may be greater than 6 cN (Rheotens device, 190° C., 2.4 mm/s$^2$, 120 mm from the die exit to the center of the wheels, extrusion rate of 38.2 s$^{-1}$, capillary die of 30 mm length, 2 mm diameter and 1800 entrance angle). In some embodiments, the melt strength of the ethylene-based polymer may be greater than 10 cN.

In embodiments, the ethylene-based polymer may have a molecular weight tail quantified by an MWD area metric $A_{TAIL}$, and $A_{TAIL}$ is less than or equal to 0.04. All individual values and subranges encompassed by "less than or equal to 0.04" are disclosed herein as separate embodiments. For example, in some embodiments, the $A_{TAIL}$ of the ethylene-based polymer of this disclosure is greater than 0 and less than or equal to 0.03 as determined by gel permeation chromatography using a triple detector.

In embodiments, the $M_w$ of ethylene-based polymer may be less than or equal to 800,000 Daltons, as determined by gel permeation chromatography using a triple detector. In one or more embodiments, the $M_w$ of the ethylene-based polymer may be less than or equal to 400,000 Daltons.

In various embodiments, the ethylene-based polymer may have an $M_p/M_{p0}$ greater than 1.20, where $M_p$ is the peak molecular weight of the ethylene-based polymer as determined from conventional gel permeation chromatography, and $M_{p0}$ is the initial peak molecular weight of the ethylene-based polymer without polyene comonomer.

In embodiments, the ethylene-based polymer has a $M_w/M_{w0}$ of greater than 1.20, in which $M_w$ is the weight average molecular weight of the ethylene-based polymer as determined from a GPC curve of the ethylene-based polymer acquired by gel permeation chromatography. $M_{w0}$ is the initial weight average molecular weight of a comparative ethylene-based polymer by gel permeation chromatography. The comparative ethylene-based polymer is a reaction product of polymerizing ethylene monomer and all $C_3$ to $C_{14}$ comonomers present in the ethylene-based polymer, if any, without the at least one polyene comonomer, under the defined polymerization reaction conditions.

Each $M_{w0}$ and the $M_{p0}$ is a metric of polymer resins without the addition of diene into the reactor during polymerization, as previously discussed. Each subsequent addition of diene produces a polymer resin from which the metric $M_w$ or $M_p$ may be determined. The amount of diene incorporated into the reactor is small in comparison to the other reactants in the reactor. Therefore, the addition of diene does not affect the total amount of comonomer, ethylene, and solvent in the reactor.

In various embodiments, the ethylene-based polymer has a gpcBR branching index of from 0.1 to 3.0. All individual values and subranges encompassed by "from 0.10 to 3.00" are disclosed herein as separate embodiments; for example, the ethylene-based polymers, may include a gpcBR branching index of from 0.10 to 2.00, from 0.10 to 1.00, from 0.15 to 0.65, from 0.20 to 0.75, or 0.10 to 0.95.

The long-chain branching polymerization processes described in the preceding paragraphs are utilized in the polymerization of olefins, primarily ethylene and propylene. In some embodiments, there is only a single type of olefin or α-olefin in the polymerization scheme, creating what is essentially a homopolymer with small amounts of incorporated diene comonomer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, and ethylidene norbornene. For example, the one or more α-olefin co-monomers may be selected from the group consisting of propylene, 1-butene, 1-hexene, and 1-octene; or in the alternative, from the group consisting of 1-hexene and 1-octene.

The long-chain branched polymer, for example homopolymers and/or interpolymers (including copolymers) of ethylene and optionally one or more co-monomers such as α-olefins, may comprise at least 50 percent by weight of units derived from ethylene. All individual values and subranges encompassed by "from at least 50 weight percent" are disclosed herein as separate embodiments; for example, the ethylene-based polymers, homopolymers and/or interpolymers (including copolymers) of ethylene and optionally one or more co-monomers such as α-olefins may comprise at least 60 percent by weight of units derived from ethylene; at least 70 percent by weight of units derived from ethylene; at least 80 percent by weight of units derived from ethylene; or from 50 to 100 percent by weight of units derived from ethylene; or from 80 to 100 percent by weight of units derived from ethylene.

In some embodiments of the ethylene-based polymers, the ethylene-based polymer includes additional α-olefin. The amount of additional α-olefin in the ethylene-based polymer is less than or equal to 50 mole percent (mol %); other embodiments the amount of additional α-olefin includes at least 0.01 mol % to 25 mol %; and in further embodiments the amount of additional α-olefin includes at least 0.1 mol % to 10 mol %. In some embodiments, the additional (α-olefin is 1-octene.

In some embodiments, the long-chain branched polymers may comprise at least 50 percent by moles of units derived from ethylene. All individual values and subranges from at least 90 mole percent are included herein and disclosed herein as separate embodiments. For example, the ethylene based polymers may comprise at least 93 percent by moles of units derived from ethylene; at least 96 percent by moles of units; at least 97 percent by moles of units derived from ethylene; or in the alternative, from 90 to 100 percent by moles of units derived from ethylene; from 90 to 99.5 percent by moles of units derived from ethylene; or from 97 to 99.5 percent by moles of units derived from ethylene.

In some embodiments of the long-chain branched polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional (α-olefin is 1-octene.

Any conventional polymerization processes may be employed to produce the long-chain branched polymer. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a single loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the long-chain branched polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs. In some embodiments, the long-chain branching polymerization process for producing the long-chain branched polymer includes polymerizing ethylene and at least one additional α-olefin in the presence of a catalyst system.

The long-chain branched polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The long-chain branched polymers may contain from about 0 to about 20 weight percent fillers such as, for example, calcium carbonate, talc, or $Mg(OH)_2$, based on the combined weight of the ethylene based polymers and all additives or fillers. The ethylene-based polymers may further be blended with one or more polymers to form a blend.

In some embodiments, the long-chain polymerization process for producing long-chain branched polymers may include polymerizing ethylene and at least one additional α-olefin in the presence of a catalyst having two polymer producing sites. The long-chain branched polymer resulting from such the catalyst having two polymer producing sites may have a density according to ASTM D792 (incorporated herein by reference in its entirety) from 0.850 g/cm$^3$ to 0.960 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the long-chain branched polymer resulting from the long-chain polymerization process may have a melt flow ratio ($I_{10}/I_2$) from 5 to 100, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 50, in others, the melt flow ratio is from 5 to 25, in others, the melt flow ratio is from 5 to 9.

In some embodiments, the long-chain branched polymer resulting from the long-chain polymerization process may have a molecular-weight distribution (MWD) from 1 to 20, where MWD is defined as $M_w/M_n$ with $M_w$ being a weight average molecular weight and $M_n$ being a number average molecular weight. In other embodiments, the polymers resulting from the catalyst system have a MWD from 1 to 10. Another embodiment includes a MWD from 1 to 3; and other embodiments include MWD from 1.5 to 2.5.

Parallel Polymerization Reactor (PPR)

The small scale solution polymerization examples are performed in 15 mL vials using a total liquid volume of 5 mL, a constant ethylene pressure of 150 psig, and a polymerization temperature of 120° C. The 5 mL liquid volume consists of a 0.84 mL comonomer mixture containing 500 nmol MMAO-3A, catalyst and activator solution in toluene, with sufficient Isopar-E added to achieve a 5 mL liquid volume. Hydrogen ($H_2$) was added to the reaction mixture by simultaneously pre-pressurizing the empty reaction vials with 20±3 psig $H_2$ at 80° C., such that experiments for any given diene are performed with the same $H_2$ load. All liquid volumes were dispensed at room temperature and added volumetrically in relation to the 5 mL total volume. The catalyst was added last to the reaction mixture as a 5 mM solution in toluene which was separately activated by 1.5 equivalents of Co-Catalyst A (methyldi(tetradecyl)ammonium tetrakis(pentafluorophenyl)borate). The comonomer solution was composed predominantly of 1-octene with a minor (0-6%) volume fraction of a diene species. The polymerizations were run for times not exceeding about 30 minutes and were quenched by CO addition followed by vial de-pressurization.

Gel Permeation Chromatography (GPC) (Conventional GPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 1600 Celsius and the column compartment was set at 1500 Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 52 (as described in Williams and Ward, J. Polym. Sci., Polym. Let., 6, 621 (1968)).:

$$M_{polyethylene}=A\times(M_{polystyrene})^B \qquad (52)$$

where M is the molecular weight, A has a value of 0.4315 and B is equal to 1.0.

A polynomial between $3^{rd}$ and $5^{rd}$ order was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation). The plate count (Equation 53) and symmetry (Equation 54) were measured on a 200 microliter injection according to the following equations:

$$\text{Plate Count} = 5.54 * \left( \frac{(RV_{PeakMax}}{\text{Peak Width at } \frac{1}{2} \text{ height}} \right)^2 \qquad (53)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{onetenthheight} - RV_{Peakmax})}{(RV_{Peakmax} - \text{Front Peak } RV_{onetenthheight})} \qquad (54)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 55-57, using PolymerChar GPCOne™ software, the baseline-subtracted IR chromatogram at each equally-spaced data collection point (i), and the polyethylene equivalent molecular weight obtained from the narrow standard calibration curve for the point (i).

$$M_{n(GPC)} = \frac{\sum^{i} IR_i}{\sum^{i}\left(\frac{IR_i}{M_{polyethylene_i}}\right)} \quad (55)$$

$$M_{w(GPC)} = \frac{\sum^{i}\left(IR_i * M_{polyethylene_i}\right)}{\sum^{i} IR_i} \quad (56)$$

$$M_{z(GPC)} = \frac{\sum^{i}\left(IR_i * M^2_{polyethylene_i}\right)}{\sum^{i}\left(IR_i * M_{polyethylene_i}\right)} \quad (57)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 58. Processing of the flow marker peak was done via the PolymerChar GPCOne™ Software. Acceptable flowrate correction is such that the effective flowrate should be within +/−2% of the nominal flowrate.

Flowrate(effective)=Flowrate(nominal)*(RV(FM Calibrated)/RV(FM Sample)) (58)

Triple Detector GPC (TDGPC) (Absolute GPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard ($M_w/M_n>3$) to the narrow standard column calibration results from the narrow standards calibration curve using PolymerChar GPCOne™ Software.

The absolute molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, is obtained from the mass detector area and the mass detector constant, derived from a suitable linear polyethylene homopolymer, or one of the polyethylene standards of known weight average molecular weight. The calculated molecular weights (using GPCOne™) are obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) may be determined from a linear standard with a molecular weight in excess of about 50,000 g/mole. The viscometer calibration (determined using GPCOne™) may be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($M_{w(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $M_{n(Abs)}$ and $M_{z(Abs)}$ are be calculated according to equations 59-60 as follows:

$$M_{n(\mathrm{Abs})} = \frac{\sum^{i} IR_i}{\sum^{i}\left(\frac{IR_i}{M_{Absolute_i}}\right)} \quad (59)$$

$$M_{z(\mathrm{Abs})} = \frac{\sum^{i}\left(IR_i * M^2_{Absolute_i}\right)}{\sum^{i}\left(IR_i * M_{Absolute_i}\right)} \quad (60)$$

$g'_{ave}$ Values g' is defined as the viscosity of a branched polymer divided by the viscosity of a linear polymer at the same MW:

$$g' = \frac{[\eta]_{branched}}{[\eta]_{linear}}\Big|_{sameM} \quad (61)$$

$g'_{ave}$ or average g' is the weight-averaged value of g' (B. H. Zimm, W. H. Stockmayer, *J. Chem. Phys.* 1949, 17, 1301).

Dynamic Mechanical Spectrum (or Small Angle Oscillatory Shear)

The complex viscosity (η*), moduli (G', G"), tan delta, and phase angle (δ) are obtained by dynamic oscillatory frequency sweep test in a frequency range from 0.1 to 100 rad/s, at 190° C. The level of strain is set within the linear viscoelastic regime as identify by a strain sweep test at 100 rad/s at 190° C. Tests are performed with stainless steel parallel plates of 25 mm diameter on a strain controlled rheometer ARES-G2 by TA Instruments. Samples of 3.3 mm thickness are squeezed and then trimmed in two steps prior to the actual test. In the first step, the sample are allowed to melt for 2.5 min, squeezed to 3 mm gap and trimmed. After an additional 2.5 min of soak time at 190° C., the sample are squeezed to 2 mm gap, and the excess of material trimmed. The method has an additional five minute delay built in to allow the system to reach thermal equilibrium. Tests are performed under nitrogen atmosphere.

gpcBR Branching Index by Triple Detector GPC (TDGPC)

The gpcBR branching index was determined by first calibrating the light scattering, viscosity, and concentration detectors as described previously. Baselines were then subtracted from the light scattering, viscometer, and concentration chromatograms. Integration windows were then set, to ensure integration of all of the low molecular weight retention volume range in the light scattering and viscometer chromatograms that indicate the presence of detectable polymer from the refractive index chromatogram. Linear polyethylene standards were then used to establish polyethylene and polystyrene Mark-Houwink constants. Upon obtaining the constants, the two values were used to construct two linear reference conventional calibrations for polyethylene molecular weight and polyethylene intrinsic viscosity as a function of elution volume, as shown in Equations (62) and (63):

$$M_{PE} = \left(\frac{K_{PS}}{K_{PE}}\right)^{1/\alpha_{PE}+1} \cdot M_{PS}^{\alpha_{PS}+1/\alpha_{PE}+1} \tag{62}$$

$$[\eta]_{PE} = K_{PE} \cdot M_{PS}^{\alpha+1} / M_{PE} \tag{63}$$

The gpcBR branching index is a robust method for the characterization of long chain branching as described in Yau, Wallace W., "Examples of Using 3D-GPC—TREF for Polyolefin Characterization," *Macromol. Symp.*, 2007, 257, 29-45. The index avoids the "slice-by-slice" TDGPC calculations traditionally used in the determination of g' values and branching frequency calculations, in favor of whole polymer detector areas. From TDGPC data, one can obtain the sample bulk absolute weight average molecular weight ($M_w$, abs) by the light scattering (LS) detector, using the peak area method. The method avoids the "slice-by-slice" ratio of light scattering detector signal over the concentration detector signal, as required in a traditional g' determination. With TDGPC, sample intrinsic viscosities were also obtained independently using Equation (64). The area calculation in this case offers more precision, because, as an overall sample area, it is much less sensitive to variation caused by detector noise and TDGPC settings on baseline and integration limits. More importantly, the peak area calculation was not affected by the detector volume offsets. Similarly, the high-precision, sample intrinsic viscosity (IV) was obtained by the area method in Equation (64):

$$IV = [\eta] = \sum_i w_i IV_i = \sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{\text{Conc. Area}}, \tag{64}$$

In Equation (64), DPi stands for the differential pressure signal monitored directly from the online viscometer. To determine the gpcBR branching index, the light scattering elution area for the sample polymer was used to determine the molecular weight of the sample. The viscosity detector elution area for the sample polymer was used to determine the intrinsic viscosity (IV or [η]) of the sample. Initially, the molecular weight and intrinsic viscosity for a linear polyethylene standard sample, such as SRM1475a or an equivalent, were determined using the conventional calibrations ("cc") for both molecular weight and intrinsic viscosity as a function of elution volume:

$$[\eta]_{CC} = \sum_i \left(\frac{C_i}{\sum_i C_i}\right) IV_i = \sum_i w_i IV_{cc,i}. \tag{65}$$

Equation (66) was used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \tag{66}$$

wherein [η] is the measured intrinsic viscosity, $[\eta]_{cc}$ is the intrinsic viscosity from the conventional calibration (or conv GPC), Mw is the measured weight average molecular weight, and $M_{w,cc}$ is the weight average molecular weight of the conventional calibration. The weight average molecular weight by light scattering (LS) is commonly referred to as "absolute weight average molecular weight" or "$M_w$(abs)." The $M_{w,cc}$ from using conventional GPC molecular weight calibration curve ("conventional calibration") is often referred to as "polymer chain backbone molecular weight," "conventional weight average molecular weight" and "$M_w$ (conv)."

All statistical values with the "cc or conv" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.355, respectively, for polyethylene, and 0.722 and −3.993, respectively, for polystyrene. Once the K and α values have been determined using the procedure discussed.

Previously, the procedure was repeated using the branched samples. The branched samples were analyzed using the final Mark-Houwink constants as the best "cc" calibration values.

The interpretation of gpcBR is straight forward. For linear polymers, gpcBR will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight. For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low TDGPC detector response at high molecular weight from the concentration detector. Errors in detector volume alignment also do not affect the precision of the gpcBR index determination.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter (Micro Motion). For some experiments, the standard conditions at 150° C. are 13 g ethylene, 15 g 1-octene, 240 psi hydrogen in 585 g of IsoparE, and the standard conditions at 150° C. are 15 g ethylene, 45 g 1-octene, 200 psi hydrogen in 555 g of IsoparE.

The procatalyst and activators are mixed with the appropriate amount of purified toluene to achieve a desired molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Tetra-Functional Branching in the Presence of Various Multi-Chain Catalysts and Various Dienes The results of the small scale polymerizations are summarized in Table 3 through Table 7 (experimental is in the parallel polymerization reactors, PPR). The polymer results recorded in Table 3 through Table 7 were produced by polymerizing ethylene, octene, and a diene species in the presence of multi-chain catalysts and single chain catalyst controls. The polymer results in each table of the Table 3 through Table 7 were the product of various catalysts and diene species. The results in Table 3 are based on the polymer products of 3-methyl-1,4-pentadiene, ethylene, and octene in the presence of Comparative Catalyst C1 ("Comp. Cat. C1"), Catalyst 1 ("Cat. 1"), and Catalyst 2 ("Cat. 2"). The results in Table 4 are based on the polymer products of 1,4-pentadiene, ethylene, and octene in the presence of Cat. 2 and Catalyst 4 ("Cat. 4"). The results in Table 5 are based on the polymer products of 1,5-hexadiene, ethylene, and octene in the presence of Comp. Cat. C1, Catalyst 3 ("Cat. 3"), Catalyst 5 ("Cat. 5"), and Catalyst 6 ("Cat. 6"). The results in Table 6 are based on the polymer products of 1,7-octadiene, ethylene, and octene in the presence of Comp. Cat. C1, Cat. 6, Cat. 2, and Cat. 4. The results in Table 7 are based on the polymer products of 1,9-decadiene, ethylene, and octene in the presence of Cat. 3, Cat. 5, Cat. 6, and Cat. 2. (Figueroa, R.; Froese, R. D.; He, Y.; Klosin, J.; Theriault, C. N.; Abboud, K. A. *Organometallics* 2011, 30, 1695-1709, Froese, R. D.; Jazdzewski, B. A.; Klosin, J.; Kuhlman, R. L.; Theriault, C. N.; Welsh, D. M; Abboud, K. A. *Organometallics* 2011, 30, 251-262)

Catalyst 1

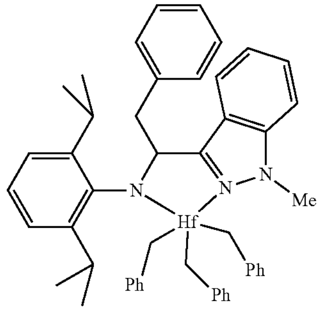

Catalyst 2

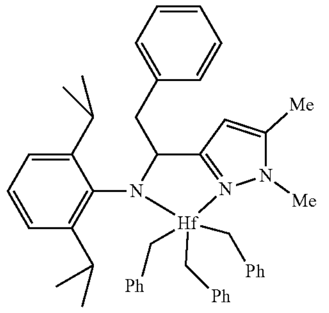

-continued

Catalyst 3

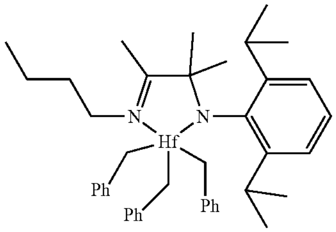

Catalyst 4

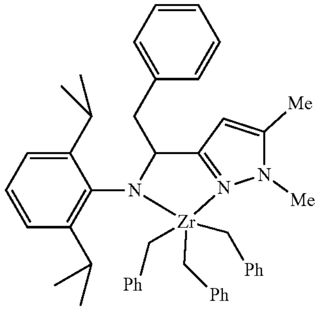

Catalyst 5

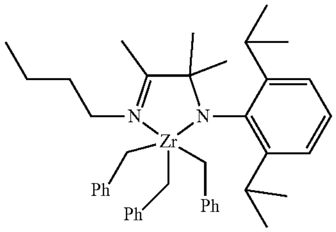

Catalyst 6

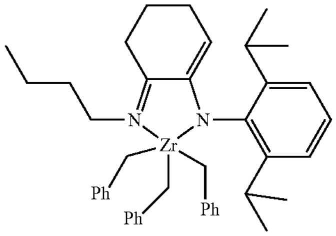

Catalyst 7

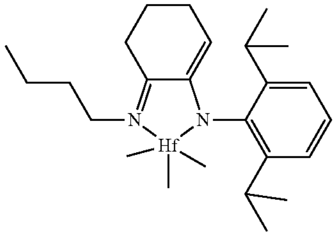

Catalyst 8

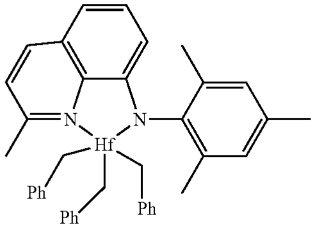

-continued

Comparative Catalyst C1

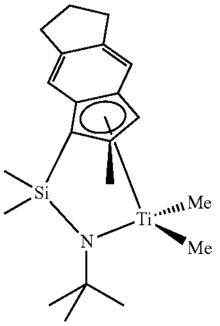

Comparative Catalyst C2

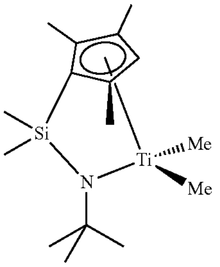

The single chain catalyst in Series 3.C (Comp. Cat. C1) incorporated increased amount of α-olefin as indicated by the two-fold and higher octene level in the polymer when compared to the other catalysts. When using the single chain catalyst in Series 3.C ((Comp. Cat. C1) the various levels of added diene had no significant effect on the polymer MWD. However, adding the diene to the dual chain catalysts in Table 3 through Table 7 resulted in higher values of $M_w$ and $M_p$ as diene level was increased, and often there was no evidence of a high molecular weight tail forming.

In each example contain diene, the amount of diene incorporated into the reactor was small in comparison to the other reactants in the reactor. Therefore, the addition of diene did not affect the amount of comonomer, ethylene, and solvent added into the reactor.

Example 1—Tetra-Functional Branching with 3-methyl-1,4-pentadiene

TABLE 3

Small scale polymerizations (PPR) with 3-methyl-1,4-pentadiene as the diene species.

| Ex. | Cat | Cat Added µmol | Diene in Octene (vol %) | Octene in Poly (mol %) | Poly Yield (g) | Time (s) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|---|
| 3.C.1 | Comp. | 0.020 | 0 | 37.4 | 0.13 | 1801 | 3,049 | 7,138 | 6,607 | 1.00 | 1.00 | 0.072 | 0.021 |
| 3.C.2 | Cat C1 | | 4 | 35.7 | 0.14 | 1801 | 3,282 | 7,515 | 7,079 | 1.05 | 1.07 | 0.057 | 0.021 |
| 3.C.3 | | | 6 | 31.5 | 0.18 | 116 | 3,030 | 6,883 | 6,457 | 0.96 | 0.98 | 0.063 | 0.020 |
| 3.1.1 | Cat. 1 | 0.025 | 0 | 16.6 | 0.28 | 37 | 6,471 | 35,214 | 14,454 | 1.00 | 1.00 | 0.41 | 0.12 |
| 3.1.2 | | | 2 | 15.3 | 0.24 | 37 | 6,608 | 41,256 | 15,849 | 1.17 | 1.10 | 0.055 | 0.069 |
| 3.1.3 | | | 4 | 13.4 | 0.18 | 43 | 7,797 | 53,276 | 21,878 | 1.51 | 1.51 | 0.12 | 0.034 |
| 3.1.4 | | | 6 | 13.1 | 0.18 | 42 | 9,310 | 55,406 | 25,119 | 1.57 | 1.74 | 0.26 | 0.059 |
| 3.4.1 | Cat. 2 | 0.025 | 0 | 15.2 | 0.20 | 28 | 5,293 | 27,847 | 11,749 | 1.00 | 1.00 | 0.203 | 0.083 |
| 3.4.2 | | | 2 | 12.5 | 0.18 | 32 | 6,921 | 41,491 | 17,783 | 1.49 | 1.51 | −0.29 | 0.016 |
| 3.4.3 | | | 4 | 11.6 | 0.16 | 45 | 8,142 | 46,098 | 22,388 | 1.66 | 1.91 | 0.083 | 0.028 |
| 3.4.4 | | | 6 | 12.0 | 0.17 | 38 | 8,333 | 44,892 | 21,878 | 1.61 | 1.86 | 0.15 | 0.037 |

Example 2—Tetra-Functional Branching with 1,4-pentadiene

TABLE 4

Small scale polymerizations (PPR) with 1,4-pentadiene as the diene species.

| Ex. | Cat | Cat Added µmol | Diene in Octene (vol %) | Octene in Poly (mol %) | Poly Yield (g) | Time (s) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|---|
| 4.3.1 | Cat. 2 | 0.015 | 0 | 12.9 | 0.17 | 30 | 7,330 | 29,587 | 16,596 | 1.00 | 1.00 | 0.13 | 0.033 |
| 4.3.2 | | | 1 | 12.6 | 0.16 | 40 | 9,251 | 46,581 | 28,184 | 1.57 | 1.70 | 0.39 | 0.063 |
| 4.3.3 | | | 2 | 11.3 | 0.15 | 47 | 12,460 | 68,277 | 45,710 | 2.31 | 2.75 | 0.31 | 0.06 |
| 4.3.4 | | | 3 | 9.8 | 0.15 | 39 | 15,999 | 82,060 | 53,705 | 2.77 | 3.24 | 0.13 | 0.057 |
| P2.4.1 | Cat. 4 | 0.020 | 0 | 6.3 | 0.08 | 112 | 5,613 | 18,813 | 13,804 | 1.00 | 1.00 | −0.10 | 0.02 |
| P2.4.2 | | | 1 | 5.9 | 0.08 | 202 | 6,726 | 22,032 | 16,218 | 1.17 | 1.17 | −0.089 | 0.024 |
| P2.4.3 | | | 2 | 5.6 | 0.07 | 254 | 6,983 | 24,003 | 17,783 | 1.28 | 1.29 | −0.063 | 0.023 |
| 4.4.4 | | | 3 | 5.5 | 0.07 | 263 | 7,815 | 26,562 | 20,893 | 1.41 | 1.51 | 0.055 | 0.031 |
| 4.4.1 | Cat. 4 | 0.020 | 0 | 6.3 | 0.08 | 112 | 5,383 | 18,505 | 11,220 | 1.00 | 1.00 | −0.31 | 0.026 |
| 4.4.2 | | | 1 | 5.9 | 0.08 | 202 | 5,752 | 22,399 | 15,488 | 1.21 | 1.38 | 0.14 | 0.035 |
| 4.4.3 | | | 2 | 5.6 | 0.07 | 254 | 6,785 | 26,508 | 20,418 | 1.43 | 1.82 | 0.23 | 0.043 |
| 4.4.4 | | | 3 | 5.5 | 0.07 | 263 | 6,444 | 27,369 | 26,916 | 1.48 | 2.40 | 0.22 | 0.036 |

Figure 20:
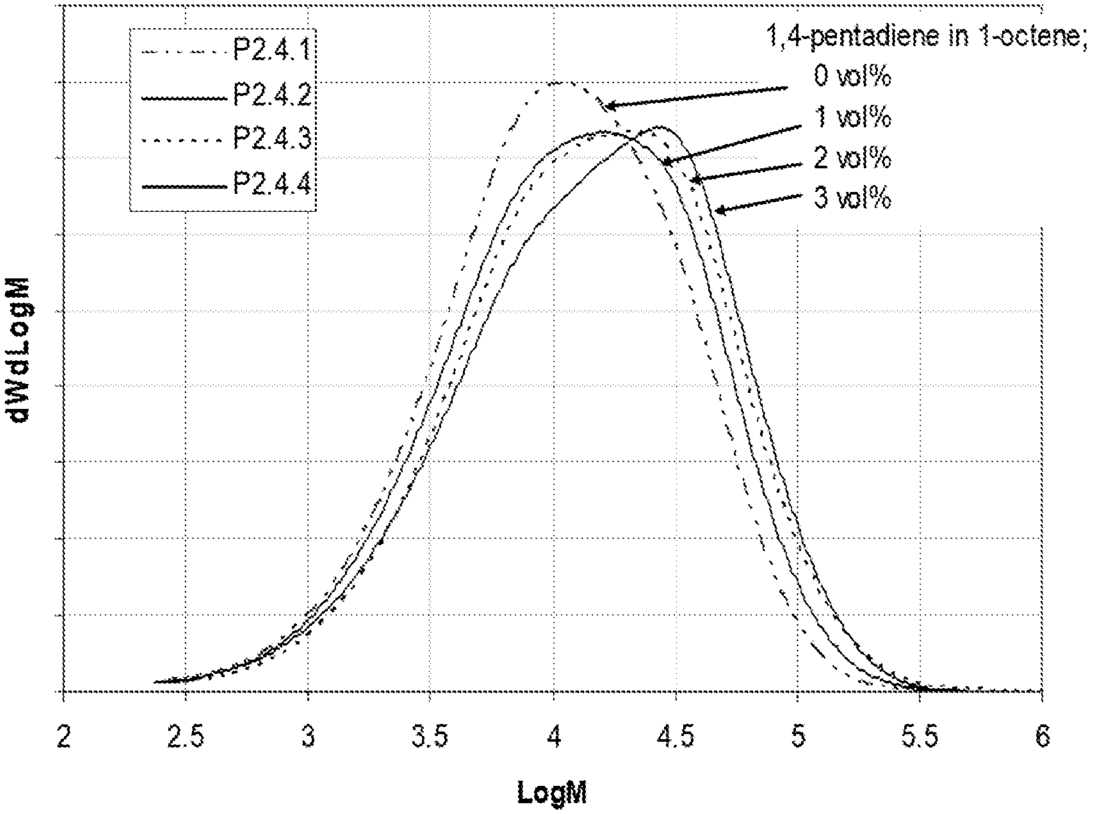
FIG. 20 is a graph of the absolute molecular weight distribution (MWD) curve as measured by GPC for Example Series 2.4 as recorded in Table 2.

FIG. 20 illustrates the shift in peak weight average molecular weight as the amount of diene is increased. In FIG. 20, the P2.4.1-P2.4.4 series, as recorded in Table 4, are plotted as dWd Log M as a function as Log M, which is a GPC plot. As the volume percent of diene increased, the peak in the GPC plot shifted right.

Example 3—Tetra-Functional Branching with 1,5-hexadiene

TABLE 5

Small scale polymerizations (PPR) with 1,5-hexadiene as the diene species.

| Ex. | Cat | Cat Added (µmole) | Diene in Octene (vol %) | Octene in Poly (mol %) | Poly Yield (g) | Time (s) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|---|
| 5.C.1 | Comp | 0.020 | 0 | 34.3 | 0.09 | 1801 | 3,394 | 7,576 | 6,761 | 1.00 | 1.00 | 0.01 | 0.018 |
| 5.C.2 | Cat. | | 1 | 34.4 | 0.11 | 1802 | 3,550 | 7,596 | 6,457 | 1.00 | 0.95 | −0.006 | 0.018 |
| 5.C.3 | C1 | | 2 | 35.5 | 0.10 | 1801 | 3,742 | 8,000 | 7,244 | 1.06 | 1.07 | 0.011 | 0.020 |
| 5.C.4 | | | 3 | 30.3 | 0.11 | 1800 | 3,509 | 8,059 | 7,244 | 1.06 | 1.07 | 0.001 | 0.021 |
| 5.1.1 | Cat. 3 | 0.012 | 0 | 7.5 | 0.09 | 104 | 19,503 | 42,284 | 38,020 | 1.00 | 1.00 | 0.095 | 0.025 |
| 5.1.2 | | | 1 | 6.3 | 0.05 | 1800 | 22,832 | 48,933 | 42,659 | 1.16 | 1.12 | 0.12 | 0.022 |
| 5.1.3 | | | 2 | 8.6 | 0.06 | 1801 | 23,497 | 51,097 | 45,710 | 1.21 | 1.20 | 0.11 | 0.024 |
| 5.2.4 | | | 3 | 6.4 | 0.03 | 1800 | 24,880 | 54,297 | 48,979 | 1.28 | 1.29 | 0.10 | 0.024 |
| 6.2.1 | Cat. 5 | 0.012 | 0 | 6.6 | 0.08 | 62 | 4,345 | 11,676 | 10,000 | 1.00 | 1.00 | 0.078 | 0.021 |
| 6.2.2 | | | 1 | 6.3 | 0.08 | 81 | 6,212 | 15,666 | 13,183 | 1.34 | 1.32 | 0.065 | 0.022 |
| 6.2.3 | | | 2 | 5.4 | 0.07 | 159 | 9,304 | 22,290 | 19,055 | 1.91 | 1.91 | 0.036 | 0.022 |
| 6.2.4 | | | 3 | 8.9 | 0.07 | 118 | 7,337 | 17,426 | 15,849 | 1.49 | 1.58 | −0.007 | 0.019 |
| 6.3.1 | Cat. 6 | 0.015 | 0 | 11.6 | 0.09 | 120 | 6,030 | 18,085 | 15,488 | 1.00 | 1.00 | 0.012 | 0.020 |

TABLE 5-continued

Small scale polymerizations (PPR) with 1,5-hexadiene as the diene species.

| | | Cat | Diene in | Octene | Poly | | Conventional GPC Data and Metrics | | | | | | |
|---|---|---|---|---|---|---|---|---|---|---|---|---|---|
| Ex. | Cat | Added (µmole) | Octene (vol %) | in Poly (mol %) | Yield (g) | Time (s) | Mn | Mw (g/mole) | Mp | Mw/Mwo | Mp/Mpo | $G_{(79/29)}$ | $A_{TAIL}$ |
| 6.3.2 | | | 1 | 11.5 | 0.09 | 117 | 6,801 | 18,582 | 16,596 | 1.03 | 1.07 | 0.043 | 0.022 |
| 6.3.3 | | | 2 | 9.3 | 0.07 | 1103 | 8,275 | 24,908 | 21,380 | 1.38 | 1.38 | −0.002 | 0.025 |
| 6.3.4 | | | 3 | 10.4 | 0.09 | 135 | 9,283 | 33,604 | 28,841 | 1.86 | 1.86 | 0.092 | 0.028 |

Example 4—Tetra-Functional Branching with 1,7-octadiene

TABLE 6

Small scale polymerizations (PPR) with 1,7-octadiene as the diene species.

| | | Cat | Diene in | Octene in | Poly | | Conventional GPC Data and Metrics | | | | | | |
|---|---|---|---|---|---|---|---|---|---|---|---|---|---|
| Ex. | Cat | Added (µmole) | Octene (vol %) | Poly (mol %) | Yield (g) | Time (s) | Mn | Mw (g/mole) | Mp | Mw/Mwo | Mp/Mpo | $G_{(79/29)}$ | $A_{TAIL}$ |
| 6.C.1 | Comp. | 0.020 | 0 | 37 | 0.24 | 48 | 1,127 | 2,230 | 1,862 | 1.00 | 1.00 | 0.039 | 0.019 |
| 6.C.2 | Cat. Cl | | 2 | 38 | 0.24 | 51 | 1,125 | 2,248 | 1,905 | 1.01 | 1.02 | 0.006 | 0.022 |
| 6.C.3 | | | 4 | 37 | 0.23 | 56 | 1,124 | 2,201 | 1,862 | 0.99 | 1.00 | 0.019 | 0.020 |
| 6.C.4 | | | 6 | 31 | 0.24 | 57 | 1,135 | 2,352 | 1,995 | 1.05 | 1.07 | 0.028 | 0.021 |
| 6.3.1 | Cat. 6 | 0.015 | 0 | 13 | 0.10 | 62 | 4,825 | 13,681 | 12,023 | 1.00 | 1.00 | 0.10 | 0.024 |
| 6.3.2 | | | 2 | 12 | 0.10 | 92 | 5,755 | 21,647 | 16,218 | 1.58 | 1.35 | −0.17 | 0.023 |
| 6.3.3 | | | 4 | 11 | 0.10 | 111 | 6,913 | 31,963 | 30,200 | 2.34 | 2.51 | 0.15 | 0.040 |
| 6.3.4 | | | 6 | 10 | 0.10 | 125 | 6,870 | 54,771 | 39,812 | 4.00 | 3.31 | 0.19 | 0.074 |
| 6.4.1 | Cat. 2 | 0.015 | 0 | 11 | 0.14 | 38 | 12,882 | 41,563 | 28,184 | 1.00 | 1.00 | 0.080 | 0.029 |
| 6.4.2 | | | 2 | 11 | 0.15 | 34 | 12,623 | 61,652 | 33,885 | 1.48 | 1.20 | 0.36 | 0.061 |
| 6.4.3 | | | 4 | 10 | 0.14 | 43 | 17,699 | 101,921 | 47,865 | 2.45 | 1.70 | 0.19 | 0.094 |
| 6.5.1 | Cat. 4 | 0.020 | 0 | 6 | 0.07 | 131 | 7,927 | 20,744 | 15,849 | 1.00 | 1.00 | −0.089 | 0.019 |
| 6.5.2 | | | 2 | 6 | 0.08 | 234 | 6,838 | 22,368 | 15,488 | 1.08 | 0.98 | −0.073 | 0.025 |
| 6.5.3 | | | 4 | 6 | 0.07 | 267 | 7,554 | 24,192 | 15,488 | 1.17 | 0.98 | −0.032 | 0.028 |
| 6.5.4 | | | 6 | 5 | 0.07 | 353 | 7,459 | 25,772 | 16,218 | 1.24 | 1.02 | −0.058 | 0.025 |

Example 5—Tetra-functional branching with 1,9-decadiene

TABLE 7

Small scale polymerizations (PPR) with 1,9-decadiene as the diene species.

| | | Cat | Diene in | Octene | Poly | | Conventional GPC Data and Metrics | | | | | | |
|---|---|---|---|---|---|---|---|---|---|---|---|---|---|
| Ex. | Cat | Added (µmol) | Octene (vol %) | in Poly (mol %) | Yield (g) | Time (s) | Mn | Mw (g/mole) | Mp | Mw/Mwo | Mp/Mpo | $G_{(79/29)}$ | $A_{TAIL}$ |
| 7.1.1 | Cat. 3 | 0.012 | 0 | 11 | 0.13 | 50 | 10,690 | 25,915 | 20,418 | 1.00 | 1.00 | 0.14 | 0.027 |
| 7.1.2 | | | 2 | 9 | 0.14 | 45 | 10,420 | 43,497 | 26,916 | 1.68 | 1.32 | 0.23 | 0.044 |
| 7.1.3 | | | 4 | 7 | 0.11 | 52 | 22,410 | 93,485 | 54,956 | 3.61 | 2.69 | 0.29 | 0.079 |
| 7.2.1 | Cat. 5 | 0.012 | 0 | — | 0.11 | 32 | 2,961 | 10,454 | 7,413 | 1.00 | 1.00 | −0.012 | 0.024 |
| 7.2.2 | | | 2 | 8 | 0.11 | 39 | 4,151 | 14,343 | 8,912 | 1.37 | 1.20 | 0.001 | 0.027 |
| 7.2.3 | | | 4 | 8 | 0.11 | 32 | 3,837 | 16,980 | 11,220 | 1.62 | 1.51 | −0.14 | 0.021 |
| 7.2.4 | | | 6 | 6 | 0.11 | 32 | 5,604 | 22,682 | 12,883 | 2.17 | 1.74 | −0.19 | 0.022 |
| 7.3.1 | Cat. 6 | 0.015 | 0 | 14 | 0.11 | 49 | 5,141 | 16,272 | 14,125 | 1.00 | 1.00 | 0.092 | 0.026 |
| 7.3.2 | | | 2 | 13 | 0.11 | 55 | 6,537 | 26,292 | 18,197 | 1.62 | 1.29 | −0.046 | 0.033 |
| 7.3.3 | | | 4 | 11 | 0.11 | 48 | 8,273 | 44,729 | 33,114 | 2.75 | 2.34 | 0.22 | 0.062 |
| 7.3.4 | | | 6 | 11 | 0.11 | 68 | 9,422 | 93,485 | 41,688 | 5.75 | 2.95 | 0.31 | 0.15 |
| 7.4.1 | Cat. 2 | 0.015 | 0 | 10 | 0.14 | 36 | 14,989 | 47,160 | 35,482 | 1.00 | 1.00 | 0.15 | 0.035 |
| 7.4.2 | | | 2 | 10 | 0.16 | 33 | 15,195 | 87,298 | 39,812 | 1.85 | 1.12 | 0.027 | 0.073 |
| 7.4.3 | | | 4 | 9 | 0.14 | 45 | 21,234 | 189,596 | 56,236 | 4.02 | 1.58 | −0.44 | 0.008 |
| 7.4.4 | | | 6 | 9 | 0.16 | 39 | 19,657 | 301,779 | 48,979 | 6.40 | 1.38 | −1.65 | 0.019 |
| 7.5.1 | Cat. 4 | 0.020 | 0 | 5 | 0.07 | 122 | 9,775 | 25,249 | 19,055 | 1.00 | 1.00 | −0.072 | 0.020 |
| 7.5.2 | | | 2 | 5 | 0.08 | 146 | 8,156 | 27,499 | 18,197 | 1.09 | 0.95 | −0.006 | 0.030 |
| 7.5.3 | | | 4 | 5 | 0.07 | 140 | 9,137 | 31,407 | 18,197 | 1.24 | 0.95 | −0.039 | 0.026 |
| 7.5.4 | | | 6 | 5 | 0.07 | 140 | 7,832 | 34,706 | 17,783 | 1.37 | 0.93 | 0.001 | 0.037 |

Branched Examples from Batch Reactor

The molecular weight distribution (MWD) curve and DSC of two branched examples were studied and compared to linear samples.

Batch Reactor Example 1

In Table 8 to Table 12, the polymer characteristic of a comparative linear polymer sample (1C) was compared to branched polymers from a batch reactor. Polymerizations reactions occurred at a temperature of 150° C., in 555 g of ISOPAR-E™ and a hydrogen pressure ($\Delta H_2$) of 200 psi. The ethylene pressure was held constant at 150 psi in the presences of 0.3 μmole of Catalyst 8, 0.36 μmole of Co-Catalyst A (methyldi(tetradecyl)ammonium tetrakis(pentafluorophenyl)borate), and 10 μmole MMAO-3A.

TABLE 8

Polymer Characteristics of the batch reactor polymer of Example 1 and the comparative.

| | | Diene | | | | Conventional GPC Data and Metrics | | | | |
|---|---|---|---|---|---|---|---|---|---|---|
| Ex. | Diene | Added (g) | Yield (g) | Octene (mol %) | $T_m$ (° C.) | Mn | Mw (g/mole) | Mp | $G_{(79/29)}$ | $A_{TAIL}$ |
| 8.C | none | 0.00 | 8.7 | 7.4 | 78.1 | 18,160 | 62,030 | 54,820 | 0.10 | 0.026 |
| 8.1 | 1.9-decadiene | 0.30 | 37.1 | 6.5 | 80.1 | 19,740 | 91,498 | 66,069 | −0.06 | 0.019 |

| | | Absolute GPC Data and Metrics | | | | | |
|---|---|---|---|---|---|---|---|
| Ex. | Diene | Mn | Mw (g/mole) | Mp | $G_{(79/29)}$ | $A_{TAIL}$ | gpcBR |
| 8.C | none | 21,385 | 69,811 | 61,662 | 0.04 | 0.022 | 0.34 |
| 8.1 | 1,9-decadiene | 23,947 | 116,322 | 79,436 | −0.05 | 0.021 | 0.56 |

Figure 21:
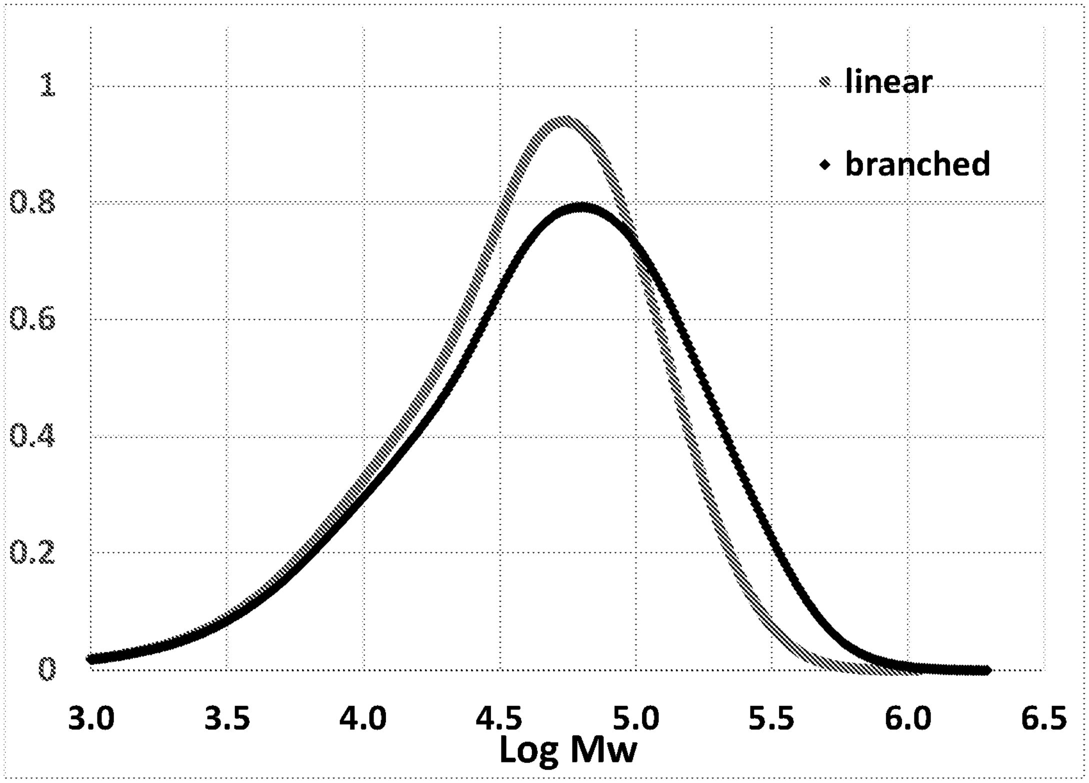
FIG. 21 is a conventional molecular weight distribution curve measured by conventional gel permeation chromatography (GPC).

FIG. 21 is a conventional molecular weight distribution curve of the polymer in series 8.C (linear) and 8.1 (branched), as determined by GPC. The shape of curve of the branched polymer, series 8.1, is altered in comparison to the linear polymer. Additionally, the peak of the molecular weight curve is shifted to the right.

Figure 22:
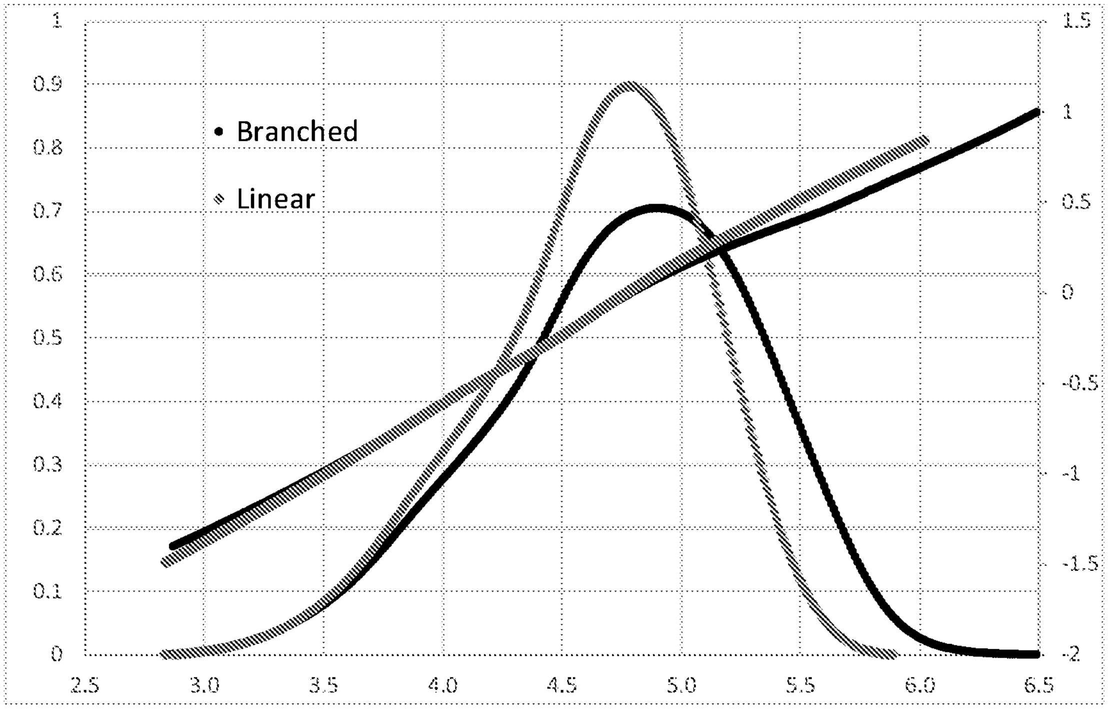
FIG. 22 is an absolute molecular weight distribution curve measured by GPC triple light scattering detector (also called Absolute GPC).

FIG. 22 is an absolute molecular weight distribution curve of the polymers in series 8.C (linear) and 8.1 (branched), as determined by GPC.

Figure 23:
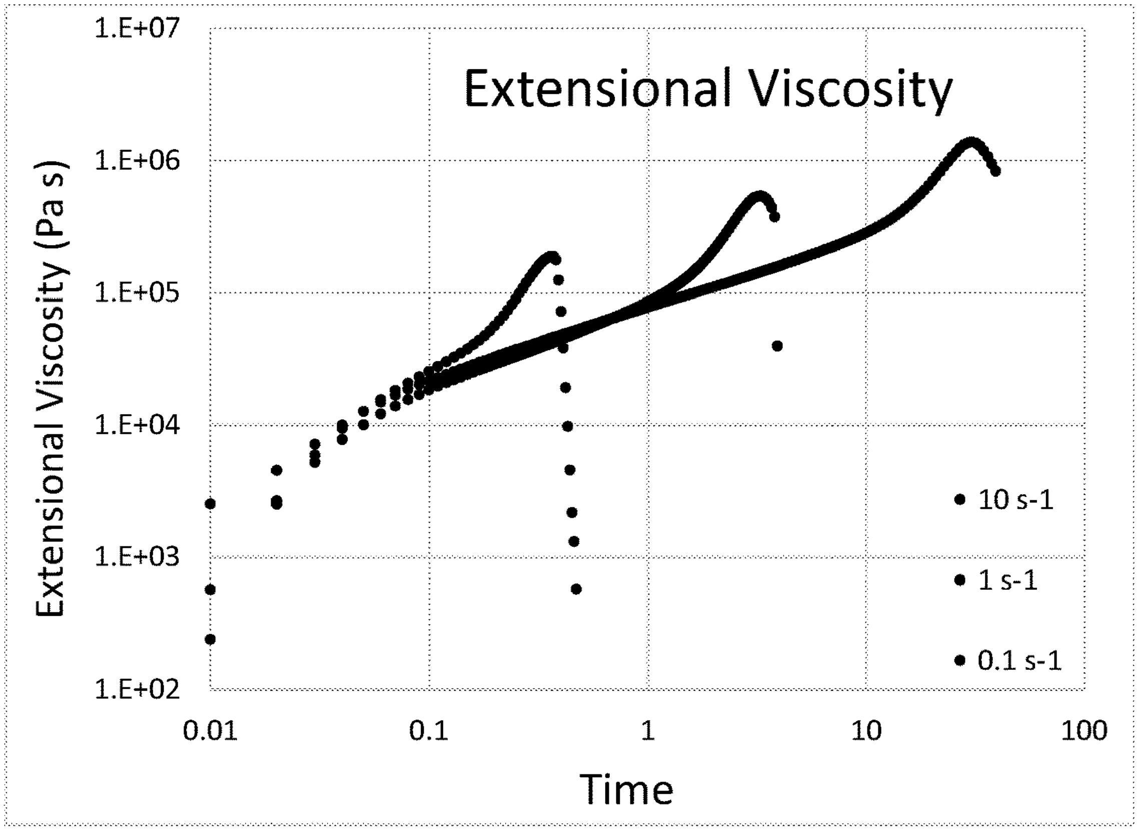
FIG. 23 is a graph of the extensional viscosity as measured as a function of time in seconds for a "Ladder Branched" polymer resin.

FIG. 23 is the extensional viscosity fixture of branched sample is series 8.1.

TABLE 9

Dynamic Mechanical Spectrum of branched sample 8.1 at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 1436 | 2340 | 27457 | 1.63 | 2746 | 58.5 |
| 0.16 | 2067 | 3057 | 23285 | 1.48 | 3690 | 55.9 |
| 0.25 | 2884 | 3932 | 19412 | 1.36 | 4876 | 53.7 |
| 0.40 | 3943 | 5000 | 15995 | 1.27 | 6368 | 51.7 |
| 0.63 | 5296 | 6296 | 13039 | 1.19 | 8227 | 49.9 |
| 1.00 | 6994 | 7865 | 10525 | 1.12 | 10525 | 48.4 |
| 1.58 | 9141 | 9784 | 8448 | 1.07 | 13390 | 46.9 |
| 2.51 | 11801 | 12140 | 6740 | 1.03 | 16931 | 45.8 |
| 3.98 | 15091 | 15014 | 5347 | 0.99 | 21287 | 44.9 |
| 6.31 | 19096 | 18527 | 4217 | 0.97 | 26606 | 44.1 |
| 10.00 | 24072 | 22867 | 3320 | 0.95 | 33202 | 43.5 |
| 15.85 | 30284 | 28233 | 2612 | 0.93 | 41403 | 43.0 |
| 25.12 | 38022 | 34775 | 2051 | 0.91 | 51526 | 42.4 |
| 39.81 | 47720 | 42681 | 1608 | 0.89 | 64022 | 41.8 |
| 63.10 | 59580 | 51766 | 1251 | 0.87 | 78927 | 41.0 |
| 100.00 | 74626 | 62604 | 974 | 0.84 | 97408 | 40.0 |

The Dynamic Mechanical Spectrum of the branched Example 8.1 was measured and the results recorded in Table 9. The viscosity at 0.1 radians/second was calculated to be 27,457 Pa s and the viscosity at 100 radians/second was measured to be 974 Pa s, providing a rheology ratio ($V_{0.1}/V_{100}$) of 28.2.

The elasticity factor m is $[((\tan(\delta_{0.1})-\tan(\delta_{100}))*1000)/(0.1-100))]$. The $\tan(\delta_{0.1})$ is the tangent of the phase angle at 0.1 rad/s and the $\tan(\delta_{100})$ is the tangent of the phase angle at 100 rad/s. The $\tan(\delta_{0.1})$ of the branched polymer in Example 8.1 was 1.6, and the $\tan(\delta_{100})$ of Example 1 was 0.8, which yields an elasticity factor of 7.9 at 190° C.

TABLE 10

Dynamic Mechanical Spectrum of the Comparative linear sample 8.C at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 2 | 89 | 892 | 53.30 | 89 | 88.9 |
| 0.16 | 3 | 141 | 888 | 48.95 | 141 | 88.8 |
| 0.25 | 5 | 222 | 883 | 46.32 | 222 | 88.8 |
| 0.40 | 9 | 350 | 880 | 40.88 | 350 | 88.6 |
| 0.63 | 16 | 552 | 875 | 33.93 | 552 | 88.3 |
| 1.00 | 33 | 869 | 870 | 26.21 | 870 | 87.8 |
| 1.58 | 71 | 1367 | 863 | 19.32 | 1368 | 87.0 |
| 2.51 | 150 | 2138 | 853 | 14.23 | 2143 | 86.0 |
| 3.98 | 316 | 3325 | 839 | 10.52 | 3340 | 84.6 |
| 6.31 | 649 | 5124 | 819 | 7.89 | 5165 | 82.8 |
| 10.00 | 1294 | 7798 | 790 | 6.02 | 7904 | 80.6 |
| 15.85 | 2502 | 11700 | 755 | 4.68 | 11964 | 77.9 |
| 25.12 | 4668 | 17251 | 711 | 3.70 | 17871 | 74.9 |
| 39.81 | 8351 | 24781 | 657 | 2.97 | 26151 | 71.4 |
| 63.10 | 14314 | 34669 | 594 | 2.42 | 37508 | 67.6 |
| 100.00 | 23447 | 47067 | 526 | 2.01 | 52584 | 63.5 |

The Dynamic Mechanical Spectrum of the comparative 8.C was measured and the results recorded in Table 10. The shear viscosity at 0.1 radians/second was calculated to be 892 Pa s and the shear viscosity at 100 radians/second was measured at 526 Pa s, providing a rheology ratio ($V_{0.1}/V_{100}$) of 1.7. The tan ($\delta_{0.1}$) of the Comparative linear polymer, 8.C, was 53.3, and the tan ($\delta_{100}$) was 2.0, which yields an elasticity factor of 513.4 at 190° C.

The rheology ratio of the linear comparative polymer resin was very low (1.7) when compared to the rheology ratio of branched Example, series 8.1. The increased rheology ratio and the low elasticity factor of the branched Example 1, series 8.1, are indicative of non-linear polymer behavior. Strong shear thinning and elastic behavior often exemplify entangled, long-chain branched polymers.

Figure 24:
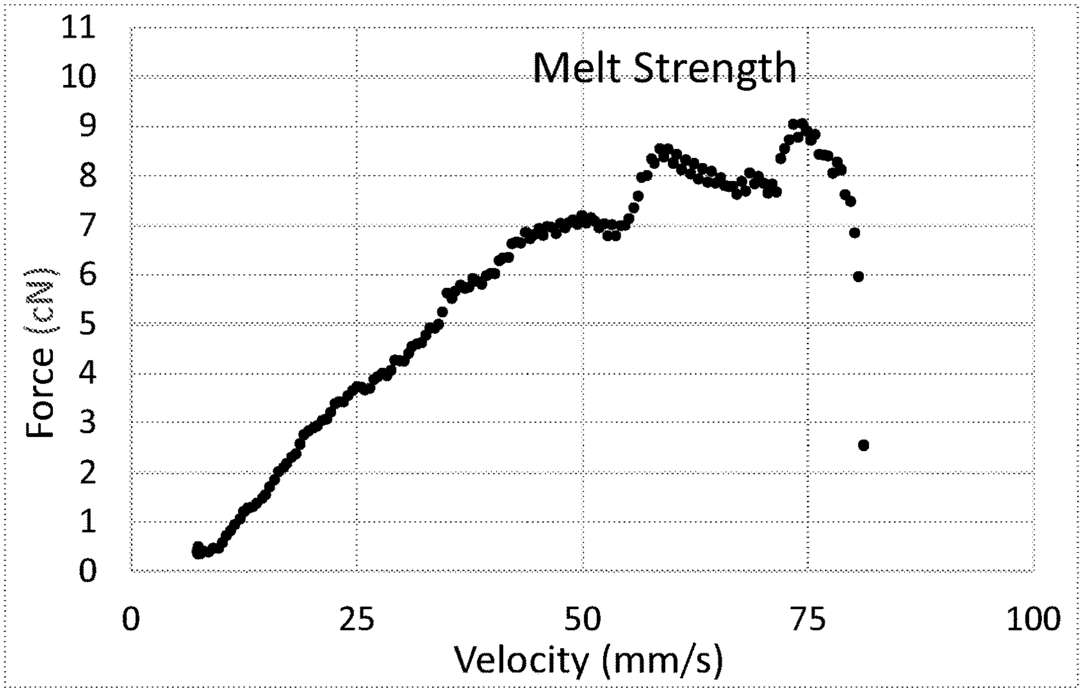
FIG. 24 is a graph of the melt strength (cN) as a function of velocity (mm/s) for a "Ladder Branched" polymer resins.

FIG. 24 is the melt strength obtained by means of a Rheotens device of the branched Example 1, series 8.1.

Branched Example 2

In Table 11, branched polyethylene was synthesized where the diene was 1,9-decadiene. The branched polymers were polymerized at a temperature of 150° C., in 555 g of IsoparE and a hydrogen pressure ($\Delta H_2$) of 200 psi. The ethylene pressure was held constant at 150 psi in the presences of 0.3 μmole of Catalyst 7, 0.36 μmole of Co-Catalyst A, and 10 μmole MMAO-3 Å.

TABLE 11

Polymer Characteristics of the branched polymer of Example 2 and the comparative.

| | Diene | | | | Conventional GPC Data and Metrics | | | | |
|---|---|---|---|---|---|---|---|---|---|
| Ex. | Amt (g) | Yield (g) | Oct. mol % | $T_m$ (° C.) | Mn | Mw (g/mole) | Mp | $G_{(79/29)}$ | $A_{TAIL}$ |
| 11.C | 0.00 | 2.7 | 7.2 | 81 | 23,148 | 61,069 | 51,286 | 0.10 | 0.026 |
| 11.1 | 0.25 | 52.3 | 6.8 | 82 | 26,464 | 86,818 | 48,978 | −0.04 | 0.025 |

| | Absolute GPC Data and Metrics | | | | | |
|---|---|---|---|---|---|---|
| Ex. | Mn | Mw (g/mole) | Mp | $G_{(79/29)}$ | $A_{TAIL}$ | gpcBR |
| 11.C | 24,297 | 70,601 | 58,886 | 0.02 | 0.022 | 0.33 |
| 11.1 | 32,257 | 110,354 | 63,098 | −0.08 | 0.023 | 0.55 |

Figure 25:
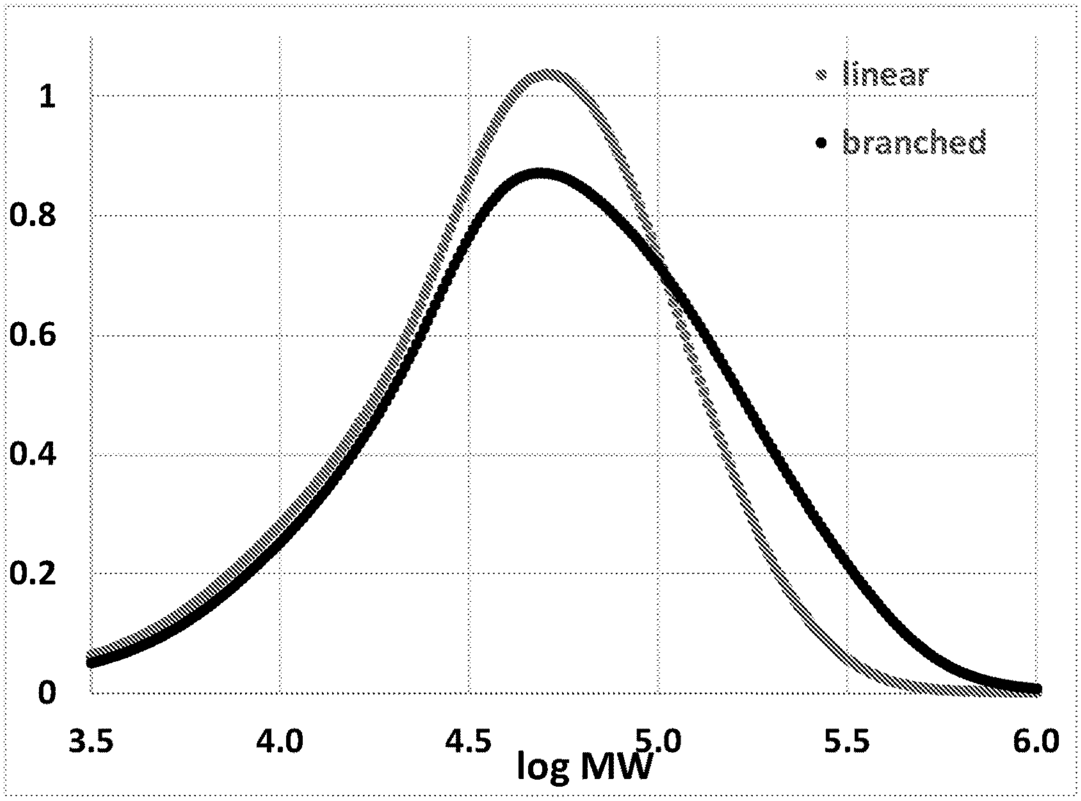
FIG. 25 is a conventional molecular weight distribution curve measured by GPC of an unbranched ethylene-based polymer and a "Ladder Branched" polymer resin.
Figure 26:
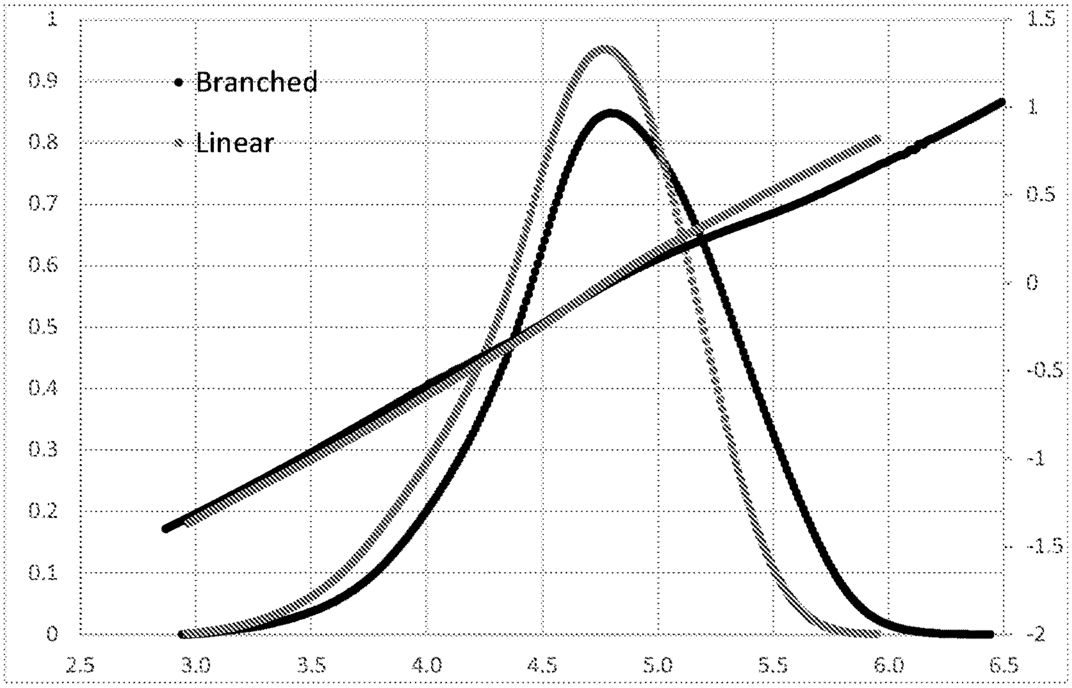
FIG. 26 is an absolute molecular weight distribution curve measure by a GPC triple light scattering detector of an unbranched ethylene-based polymer and a "Ladder Branched" polymer resin.

FIG. 25 is a conventional molecular weight distribution curve of the polymers in Branched Example 2 in series 11.C (linear) and 11.1 (branched), as determined by GPC. FIG. 26 is an absolute molecular weight distribution curve of the polymer in series 11.C (linear) and 11.1 (branched), as determined by light scattering triple light detector. The shape of curve of the branched polymer, series 11.1, is altered in comparison to the linear polymer.

Figure 27:
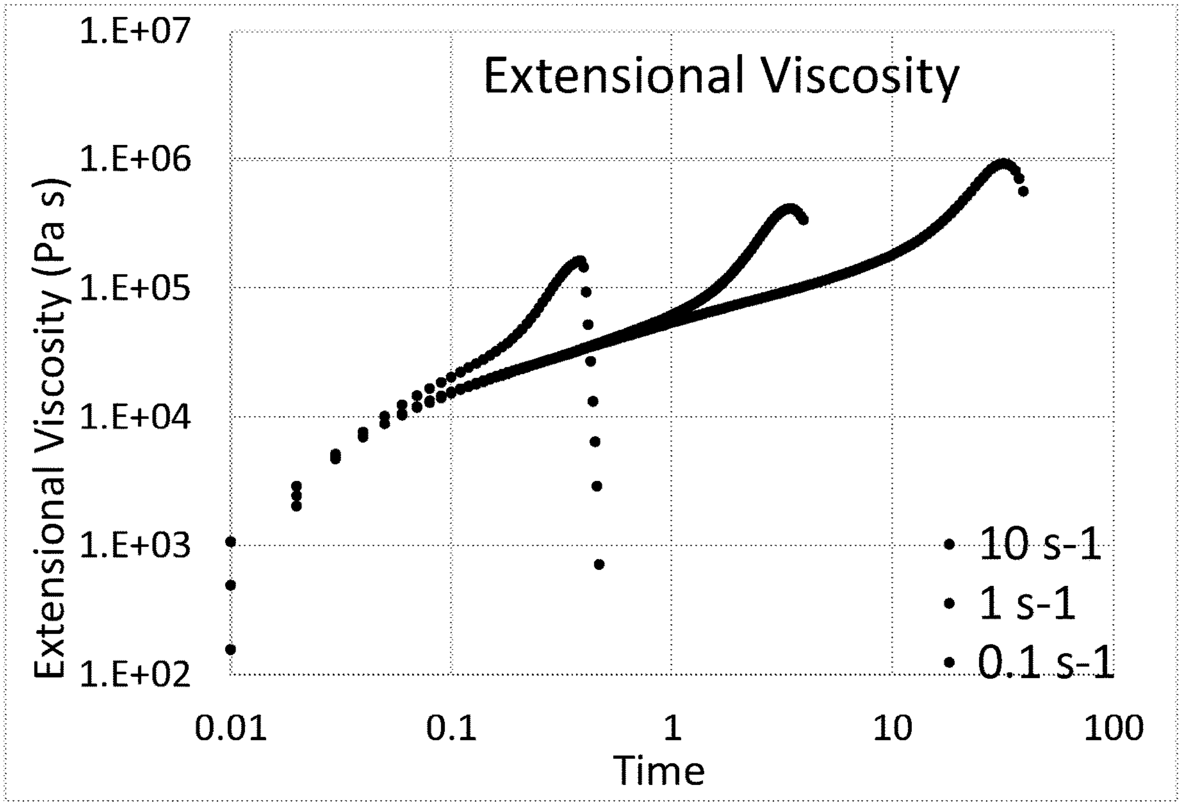
FIG. 27 is a graph of the extensional viscosity as measured as a function of time in seconds of a "Ladder Branched" polymer resin.

FIG. 27 is the extensional viscosity obtained by extensional viscosity fixture of the Branched Example 2 in series 11.1.

TABLE 12

Dynamic Mechanical Spectrum of branched Example 2, series 11.1 at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 792 | 1577 | 17643 | 1.99 | 1764 | 63.3 |
| 0.16 | 1185 | 2125 | 15351 | 1.79 | 2433 | 60.9 |
| 0.25 | 1718 | 2816 | 13133 | 1.64 | 3299 | 58.6 |
| 0.40 | 2437 | 3686 | 11101 | 1.51 | 4419 | 56.5 |
| 0.63 | 3391 | 4770 | 9275 | 1.41 | 5852 | 54.6 |
| 1.00 | 4638 | 6115 | 7675 | 1.32 | 7675 | 52.8 |
| 1.58 | 6251 | 7785 | 6299 | 1.25 | 9984 | 51.2 |
| 2.51 | 8298 | 9841 | 5125 | 1.19 | 12873 | 49.9 |
| 3.98 | 10907 | 12428 | 4153 | 1.14 | 16535 | 48.7 |
| 6.31 | 14149 | 15611 | 3339 | 1.10 | 21069 | 47.8 |
| 10.00 | 18216 | 19588 | 2675 | 1.08 | 26749 | 47.1 |
| 15.85 | 23370 | 24603 | 2141 | 1.05 | 33933 | 46.5 |
| 25.12 | 29874 | 30846 | 1710 | 1.03 | 42941 | 45.9 |
| 39.81 | 38172 | 38601 | 1364 | 1.01 | 54288 | 45.3 |
| 63.10 | 48558 | 47806 | 1080 | 0.98 | 68142 | 44.6 |
| 100.00 | 62045 | 59123 | 857 | 0.95 | 85704 | 43.6 |

The Dynamic Mechanical Spectrum of the comparative was measured and the results recorded in Table 12. The shear viscosity at 0.1 radians/second was calculated to be 17,643 Pa s and the shear viscosity at 100 radians/second was measured at 857 Pa s, providing a rheology ratio ($V_{0.1}/V_{100}$) of 20.6. The tan ($\delta_{0.1}$) of the branched polymer in Example 2, series 11.1, was 2.0, and the tan ($\delta_{100}$) was 1.0, which yields an elasticity factor of 10.4 at 190° C.

Figure 28:
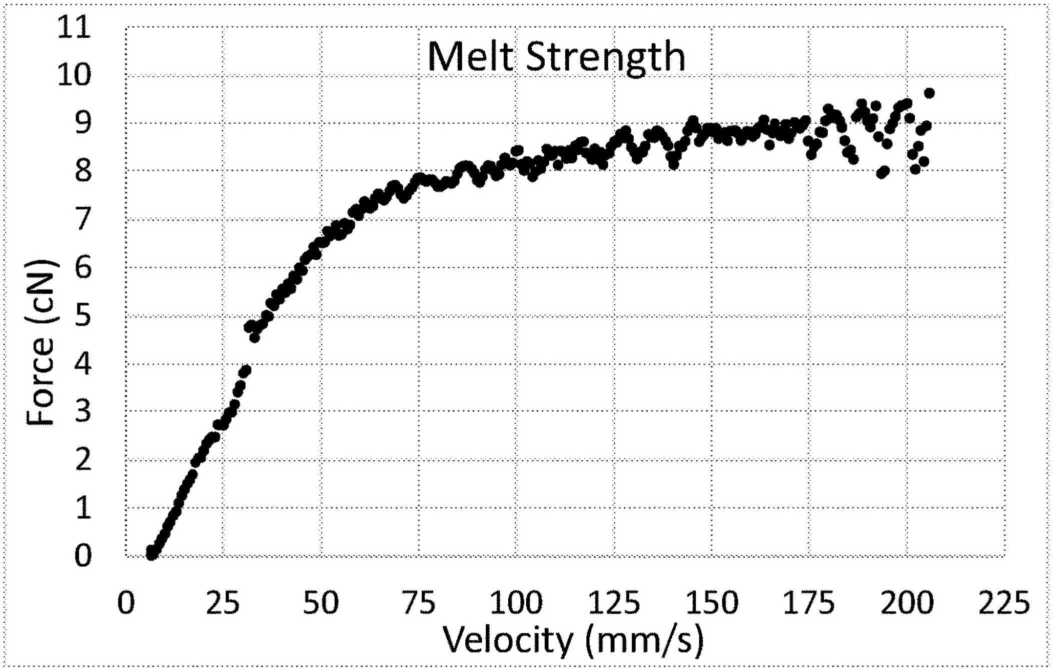
FIG. 28 is a graph of the melt strength (cN) as a function of velocity (mm/s) of a "Ladder Branched" polymer resin.

FIG. 28 is the melt strength obtained by a Rheotens device of the Branched Example 2, series 11.1.

Branching Study Under Various Conditions

The tetra-functional "Ladder Branching" was studied under various conditions, such as increased ethylene pressure, increased octene monomer, increased starting molecular weight, decreased starting molecular weight, various dienes, increased or decreased diene amounts, and various multi-chain catalysts.

Example 1: Various Dienes and Amounts of Dienes

The examples in Table 13 to Table 22 were prepared under identical conditions and polymerized in the presence of Catalyst 7 at a temperature of 150° C. The conditions included: 585 g IsoparE; 15 g 1-octene; hydrogen pressure of 240 psi; ethylene pressure of 150 psi; 0.3 μmole of Catalyst 7; 0.36 μmole Co-Catalyst A; and 10 μmole MMAO-3A.

TABLE 13

Various dienes tested under identical conditions with Catalyst 7

| Ex. | Diene | Diene Added (g) | Poly Yield (g) | Oct. Poly mol % | $T_m$ (° C.) | Conventional GPC Data and Metrics Mn | Mw (g/mole) | Mp | $Mw/Mw_o$ | $Mp/Mp_o$ | $G_{(79/29)}$ | $A_{TAIL}$ |
|---|---|---|---|---|---|---|---|---|---|---|---|---|
| 13C | none | 0.00 | 8.5 | 3.4% | 109.8 | 21,059 | 64,711 | 51,286 | 1.00 | 1.00 | 0.095 | 0.027 |
| 13.1 | 1,3-divinylcyclo pentane | 0.70 | 5.6 | 3.0% | 110.4 | 22,523 | 71,923 | 58,884 | 1.11 | 1.15 | 0.11 | 0.027 |
| 13.2 | 1,4-hexadiene | 0.35 | 7.8 | 2.9% | 112.2 | 22,400 | 72,446 | 52,481 | 1.12 | 1.02 | 0.088 | 0.027 |
| 13.3 | 1,4-hexadiene | 0.75 | 6.0 | 2.6% | 115.3 | 22,014 | 78,338 | 56,234 | 1.21 | 1.10 | 0.036 | 0.025 |
| 13.4 | 2-me-hexadiene | 0.50 | 4.1 | 3.2% | 109.6 | 26,792 | 83,247 | 69,183 | 1.29 | 1.35 | 0.11 | 0.026 |
| 13.5 | 2-me-pentadiene | 0.25 | 8.0 | 3.0% | 110.4 | 21,430 | 66,827 | 50,119 | 1.03 | 0.98 | 0.13 | 0.030 |
| 13.6 | 2-me-pentadiene | 0.45 | 10.5 | 3.1% | 110.8 | 22,180 | 65,274 | 51,286 | 1.01 | 1.00 | 0.14 | 0.030 |
| 13.7 | 2-me-pentadiene | 0.50 | 7.0 | 2.9% | 110.2 | 21,443 | 72,911 | 53,703 | 1.13 | 1.05 | 0.11 | 0.030 |
| 13.8 | 2-me-pentadiene | 1.00 | 4.7 | 2.8% | 111.6 | 20,601 | 75,340 | 56,234 | 1.16 | 1.10 | 0.077 | 0.027 |
| 13.9 | 3-me-pentadiene | 0.25 | 9.5 | 3.0% | 111.5 | 22,882 | 74,859 | 52,481 | 1.16 | 1.02 | 0.16 | 0.032 |
| 13.10 | 3-me-pentadiene | 0.50 | 9.8 | 3.2% | 111.3 | 22,261 | 77,008 | 50,119 | 1.19 | 0.98 | 0.078 | 0.027 |
| 13.11 | 1,9-decadiene | 0.20 | 7.4 | 2.8% | 111.2 | 27,008 | 100,136 | 52,481 | 1.55 | 1.02 | −0.10 | 0.023 |
| 13.12 | 1,9-decadiene | 0.25 | 7.7 | 2.6% | 115.4 | 27,458 | 124,092 | 63,096 | 1.92 | 1.23 | −0.27 | 0.023 |
| 13.13 | 1,9-decadiene | 0.30 | 8.0 | 2.7% | 112.9 | 28,140 | 125,235 | 58,884 | 1.94 | 1.15 | −0.13 | 0.029 |
| 13.14 | 1,9-decadiene | 0.50 | 11.3 | 3.0% | 114.2 | 22,091 | 174,694 | 134,896 | 2.70 | 2.63 | 0.031 | 0.055 |
| 13.15 | 1,5-hexadiene | 0.75 | 9.6 | 3.3% | 109.9 | 22,027 | 77,375 | 52,481 | 1.20 | 1.02 | 0.10 | 0.029 |
| 13.16 | 1,8-nonadiene | 0.10 | 7.9 | 3.2% | 110.2 | 25,803 | 91,031 | 57,544 | 1.41 | 1.12 | 0.007 | 0.024 |
| 13.17 | 1,8-nonadiene | 0.20 | 6.4 | 3.4% | 108.1 | 27,604 | 114,480 | 81,283 | 1.77 | 1.58 | −0.092 | 0.019 |
| 13.18 | 1,8-nonadiene | 0.30 | 3.5 | 2.9% | 104.8 | 31,057 | 147,084 | 120,226 | 2.27 | 2.34 | −0.14 | 0.031 |
| 13.19 | 1,7-octadiene | 0.16 | 9.0 | 2.9% | 111.2 | 26,018 | 86,041 | 52,481 | 1.33 | 1.02 | 0.14 | 0.033 |
| 13.20 | 1,7-octadiene | 0.24 | 9.1 | 2.7% | 112.6 | 26,711 | 96,007 | 53,703 | 1.48 | 1.05 | −0.002 | 0.026 |
| 13.21 | 1,7-octadiene | 0.30 | 7.3 | 2.6% | 113.3 | 28,484 | 104,803 | 57,544 | 1.62 | 1.12 | −0.14 | 0.018 |
| 13.22 | 1,7-octadiene | 0.35 | 8.9 | 2.8% | 112.8 | 24,548 | 110,395 | 58,884 | 1.71 | 1.15 | −0.15 | 0.019 |
| 13.23 | 1,4-pentadiene | 0.10 | 7.4 | 3.7% | 111.3 | 19,698 | 81,929 | 64,565 | 1.27 | 1.26 | 0.16 | 0.033 |
| 13.24 | 1,4-pentadiene | 0.20 | 1.9 | 3.0% | 105.1 | 31,887 | 101,861 | 67,608 | 1.57 | 1.32 | −0.11 | 0.013 |
| 13.25 | 1,4-pentadiene | 0.30 | 1.1 | 2.3% | 108.7 | 29,809 | 107,172 | 69,183 | 1.66 | 1.35 | −0.21 | 0.013 |

| Ex. | Absolute GPC Data and Metrics Mn | Mw (g/mole) | Mp | $Mw/Mw_o$ | $Mp/Mp_o$ | $G_{(79/29)}$ | $A_{TAIL}$ | $V_{0.1}/V_{100}$ | m | gpcBR |
|---|---|---|---|---|---|---|---|---|---|---|
| 13C | 25,552 | 67,491 | 60,258 | 1.00 | 1.00 | 0.021 | 0.020 | 1.5 | 768 | 0.18 |
| 13.12 | 36,181 | 159,527 | 67,611 | 2.36 | 1.12 | 0.018 | 0.041 | 121.4 | 0.412 | 0.56 |
| 13.16 | 31,935 | 105,263 | 67,611 | 1.56 | 1.12 | 0.082 | 0.032 | 28.2 | 6.338 | 0.35 |
| 13.17 | 38,628 | 143,672 | 97,728 | 2.13 | 1.62 | 0.066 | 0.027 | 110.4 | 1.025 | 0.51 |
| 13.18 | 42,764 | 198,061 | 128,832 | 2.93 | 2.14 | 0.043 | 0.041 | — | | 0.70 |
| 13.22 | 33,516 | 138,854 | 70,797 | 2.06 | 1.17 | 0.048 | 0.037 | 101.4 | 1.018 | 0.52 |

The results in Table 13 indicated that when diene was present in the polymerization reaction, molecular weight increased without a high molecular weight tail.

Example 2: Conditions that Yield High Molecular Weights

TABLE 14

Nonadiene tested under conditions giving a higher linear MW

| Ex. | Diene | Diene Amt (g) | Poly Yield (g) | Octene in Poly (mol %) | $T_m$ (° C.) | Conventional GPC Data and Metrics Mn | Mw (g/mole) | Mp | Mw/ $Mw_o$ | Mp/ $Mp_o$ | $G_{(79/29)}$ | $A_{TAIL}$ |
|---|---|---|---|---|---|---|---|---|---|---|---|---|
| 14.C | none | 0 | 12.4 | 3.2 | 109.5 | 31,796 | 93,455 | 70,795 | 1.00 | 1.00 | 0.13 | 0.027 |
| 14.1 | 1,8-nonadiene | 0.2 | 6.9 | 2.9 | 106.4 | 46,835 | 211,514 | 141,254 | 2.26 | 2.00 | 0.03 | 0.031 |
| 14.2 | 1,8-nonadiene | 0.5 | 3.5 | 2.8 | 107.1 | 52,396 | 387,644 | 288,403 | 4.15 | 4.07 | 0.59 | 0.110 |

T = 150° C., IsoparE: 585 g, 1-octene: 15 g; $\Delta H_2$: 140 psi, Ethylene: 150 psi, Catalyst 7: 0.3 μmole, Co-Catalyst A: 0.36 μmole, MMAO-3A: 10 μmole.

Utilizing those polymerization conditions to produce high molecular weight polymers resulted in tetra-functional "Ladder Branching", which occurred when the diene was incorporated into the polymerization reaction. The polymerization reaction yielded polymer resins with high molecular weights and tetra-functional "Ladder Branching".

Example 3: Conditions that Yield Branched Homopolymer

TABLE 15

High density polyethylene examples using decadiene and pentadiene

| Ex. | Diene | Diene Added (g) | Poly Yield (g) | $T_m$ (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|
| 15.C | 0 | 0.00 | 7.1 | 133.2 | 18,988 | 60,271 | 50,119 | 1.00 | 1.00 | 0.12 | 0.028 |
| 15.1 | 1,9-decadiene | 0.15 | 7.0 | 135.0 | 23,754 | 102,744 | 58,884 | 1.70 | 1.17 | 0.04 | 0.033 |
| 15.2 | 1,4-pentadiene | 0.1 | 2.3 | 133.9 | 22,525 | 104,216 | 70,795 | 1.73 | 1.41 | −0.06 | 0.013 |
| 15.3 | 1,4-pentadiene | 0.2 | 1.3 | 135.1 | 28,186 | 114,916 | 81,283 | 1.91 | 1.62 | −0.23 | 0.015 |

T = 160° C., IsoparE: 600 g, 1-octene: 0 g; $\Delta H_2$: 240 psi, Ethylene: 150 psi, Catalyst 7: 0.4 μmole, Co-Catalyst A: 0.48 μmole, MMAO-3A: 10 μmole.

Incorporating diene into the polymerization reaction used to make homopolymers (with a small amount of diene) resulted in an increase in molecular weight (tetra-functional "Ladder Branching"). The data recorded in Table 15 indicated that the examples of ethylene only resins increased in molecular weight when two different dienes where incorporated into the polymerization reaction.

TABLE 16

Lower density polyethylene examples using pentadiene with Catalyst 8

| Ex. | Diene | Diene Added (g) | Poly Yield (g) | Octene in Poly (mol %) | $T_m$ (° C.) | Conventional GPC Data and Metrics Mn | Mw (g/mole) | Mp | Mw/ $Mw_o$ | Mp/ $Mp_o$ | $G_{(79/29)}$ | $A_{TAIL}$ |
|---|---|---|---|---|---|---|---|---|---|---|---|---|
| 16.C | none | 0 | 3.4 | 7.0 | 79.5 | 21,739 | 65,347 | 53,703 | 1.00 | 1.00 | 0.12 | 0.028 |
| 16.1 | 1,4-pentadiene | 0.1 | 1.4 | 7.3 | 81.2 | 23,203 | 75,022 | 57,544 | 1.15 | 1.07 | 0.14 | 0.031 |
| 16.2 | 1,4-pentadiene | 0.2 | 1.9 | 7.0 | 81.2 | 25,701 | 84,942 | 60,256 | 1.30 | 1.12 | 0.06 | 0.024 |

T = 150° C., IsoparE: 555 g, 1-octene: 45 g; $\Delta H_2$: 220 psi, Ethylene: 150 psi, Catalyst 8: 0.4 μmole, Co-Catalyst A: 0.48 μmole, MMAO-3A: 10 μmole.

The results in Table 16 indicated that branching occurs with different catalysts and at different densities. The resins in Table 16 demonstrated branching with Catalyst 8 and enough octene for 7 mol % in the polymer.

TABLE 17

Lower density polyethylene examples using pentadiene and decadiene at higher linear MW with Catalyst 8

| Ex. | Diene | Diene Added (g) | Poly Yield (g) | Oct. mol % | $T_m$ (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|
| 17.C | none | 0.00 | 5.4 | — | 85.1 | 31,155 | 100,236 | 79,433 | 1.00 | 1.00 | 0.10 | 0.024 |
| 17.1 | 1,9-decadiene | 0.30 | 5.6 | — | 82.0 | 28,449 | 143,906 | 104,713 | 1.44 | 1.32 | −0.66 | 0.021 |
| 17.2 | 1,4-pentadiene | 0.20 | 2.0 | — | 84.5 | 33,901 | 141,038 | 100,000 | 1.41 | 1.26 | −0.76 | 0.014 |

T = 150° C., IsoparE: 555 g, 1-octene: 45 g; $\Delta H_2$: 140 psi, Ethylene: 150 psi, Catalyst 8: 0.3 μmole, Co-Catalyst A: 0.36 μmole, MMAO-3A: 10 μmole.

Based on the results in Table 17, molecular weight increased with addition of diene indicative of tetra-functional "Ladder Branching". These examples had higher linear molecular weights. In examples 5.1 and 5.2, Catalyst 8 produced polymer resins with a higher molecular weight when decadiene or pentadiene was present in the polymerization reactions.

TABLE 18

Hexene used as a comonomer in place of octene and comparing different catalysts with decadiene

| Ex. | Diene | Diene Added (g) | Poly Yield (g) | Hexene in Poly (mol %) | $T_m$ (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|
| 18.1.C* | none | 0 | 11.5 | 2.4 | 114.3 | 21,627 | 61,061 | 47,863 | 1.00 | 1.00 | 0.13 | 0.029 |
| 18.1.1* | 1,9-decadiene | 0.35 | 5.2 | 2.4 | 117.1 | 24,307 | 132,150 | 93,325 | 2.16 | 1.95 | −0.12 | 0.036 |
| 18.2.C** | none | 0 | 7.9 | 5.6 | 103.5 | 17,419 | 58,044 | 50,119 | 1.00 | 1.00 | 0.09 | 0.026 |
| 18.2.1** | 1,9-decadiene | 0.25 | 4.0 | 5.5 | 92.2 | 22,482 | 96,617 | 70,795 | 1.66 | 1.41 | −0.03 | 0.021 |

T = 150° C., Ethylene: 150 psi, MMAO-3A: 10 μmole,

*IsoparE: 585 g, 1-hexene: 15 g; $\Delta H_2$: 240 psi, Catalyst 7: 0.3 μmole, Co-Catalyst A: 0.36 μmole.

**IsoparE: 555 g, 1-hexene: 45 g; $\Delta H_2$: 200 psi, Catalyst 8: 0.3 μmole, Co-Catalyst A: 0.36 μmole.

The results in Table 18 indicated that increases in molecular weight (tetra-functional "Ladder Branching") occurred when a different α-olefin comonomer was used. The polymer resins in Table 18 were produced by two different catalysts and two different loadings of hexene.

TABLE 19

Lower density polyethylene examples using decadiene at higher linear MW with Catalyst 7

| Ex. | Diene | Diene Added (g) | Poly Yield (g) | Octene in Poly (mol %) | $T_m$ (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|
| 19.C | None | 0.00 | 8.5 | 7.1 | 78.1 | 37,359 | 102,362 | 77,625 | 1.00 | 1.00 | 0.12 | 0.026 |
| 19.1 | 1,9-decadiene | 0.15 | 4.9 | 5.0 | 84.2 | 30,255 | 159,937 | 87,096 | 1.56 | 1.12 | −1.44 | 0.017 |
| 19.2 | 1,9-decadiene | 0.30 | 9.0 | 6.9 | 80.4 | 45,031 | 194,779 | 109,648 | 1.90 | 1.41 | −0.26 | 0.031 |

T = 150° C., IsoparE: 555 g, 1-octene: 45 g; $\Delta H_2$: 60 psi, Ethylene: 150 psi, Catalyst 7: 0.3 μmole, Co-Catalyst A: 0.36 μmole, MMAO-3A: 10 μmole.

Based on the results in Table 19, increases in molecular weight with diene (tetra-functional "Ladder Branching") occurred with different levels of octene. The examples in Table 19 indicated that even with 7 mol % octene in the polymer, tetra-functional "Ladder Branching" occurred.

TABLE 20

Branching with different dienes such as pentadiene

| Ex. | Diene | Diene Added (g) | Poly Yield (g) | Octene in Poly (mol %) | Tm (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|
| 20.0 | none | 0.00 | 6.3 | 7.5 | 77.1 | 29,605 | 83,716 | 64,565 | 1.00 | 1.00 | 0.12 | 0.028 |
| 20.1 | 1,9-decadiene | 0.30 | 7.0 | 5.0 | 81.3 | 35,781 | 160,761 | 85,114 | 1.92 | 1.32 | −0.72 | 0.028 |
| 20.2 | 1,4-pentadiene | 0.20 | 2.3 | 4.8 | 85.3 | 24,397 | 132,720 | 87,096 | 1.59 | 1.35 | −0.54 | 0.012 |

T = 150° C., IsoparE: 555 g, 1-octene: 45 g; $\Delta H_2$: 100 psi, Ethylene: 150 psi, Catalyst 7: 0.3 μmole, Co-Catalyst A: 0.36 μmole, MMAO-3A: 10 μmole.

As evidenced in Table 20, tetra-functional "Ladder Branching" occurred with different levels of octene and higher starting molecular weights. The examples 8.1 and 8.2 indicated that a polymer resin with 7 mol % octene and starting $M_w$ of approximately 83,000 g/mol led to branching both with decadiene and pentadiene.

TABLE 21

Branching with high levels of octene and low linear molecular weights.

| Ex. | Diene | Diene Added (g) | Poly Yield (g) | Octene in Poly (mol %) | Tm (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|
| 21.0 | none | 0.00 | 12.8 | 9.6 | 69.6 | 15,073 | 43,074 | 38,019 | 1.00 | 1.00 | 0.15 | 0.028 |
| 21.1 | 1,9-decadiene | 0.45 | 4.2 | 9.0 | 74.1 | 18,788 | 82,682 | 50,119 | 1.92 | 1.32 | −0.03 | 0.029 |

T = 150° C., IsoparE: 542 g, 1-octene: 58 g; $\Delta H_2$: 200 psi, Ethylene: 150 psi, Catalyst 7: 0.3 μmole, Co-Catalyst A: 0.36 μmole, MMAO-3A: 10 μmole.

The results in Table 21 showed there was an increase in molecular weight (tetra-functional "Ladder Branching") at much lower density (high levels of octene in polymer) and lower starting molecular weight. In example 9.1, the polymer resin had greater than 9 mol % octene and starting $M_w$ of approximately 43,000 g/mol. When diene was incorporated into the polymerization reaction, molecular weight increased ("Ladder Branching" occurred).

TABLE 22

"Ladder Branching" with decadiene at lower linear molecular weights

| Ex. | Diene | Diene Added (g) | Poly Yield (g) | Octene in Poly (mol %) | Tm (° C.) | Conventional GPC Data and Metrics Mn | Mw (g/mole) | Mp | Mw/ Mwo | Mp/ Mpo | $G_{(79/29)}$ | $A_{TAIL}$ |
|---|---|---|---|---|---|---|---|---|---|---|---|---|
| 22.0 | none | 0.00 | 9.5 | 7.4 | 81.5 | 17,778 | 51,211 | 42,658 | 1.00 | 1.00 | 0.13 | 0.027 |
| 22.1 | 1,9-decadiene | 0.25 | 8.9 | 7.7 | 77.9 | 18,228 | 70,134 | 43,652 | 1.37 | 1.02 | −0.03 | 0.027 |

T = 150° C., IsoparE: 555 g, 1-octene: 45 g; $\Delta H_2$: 180 psi, Ethylene: 150 psi, Catalyst 7: 0.3 μmole, Co-Catalyst A: 0.36 μmole, MMAO-3A: 10 μmole.

The results in Table 22 indicated that molecular weight incased with diene (tetra-functional "Ladder Branching") with a different level of incorporated octene at a lower starting molecular weight. In example 22.1, the starting molecular weight of the polymer resin was approximately 51,000 g/mol, and when diene was incorporated into the polymerization reactions, the molecular weight increased to 70,000 g/mol (tetra-functional "Ladder Branching" occurred).

TABLE 23

Different ethylene pressure and octene added to the reactor

| Ex. | Diene | Diene Added (g) | Poly Yield (g) | Octene in Poly (mol %) | Tm (° C.) | Conventional GPC Data and Metrics Mn | Mw (g/mole) | Mp | Mw/Mwo | Mp/Mpo | $G_{(79/29)}$ | $A_{TAIL}$ |
|---|---|---|---|---|---|---|---|---|---|---|---|---|
| 23.0 | none | 0.00 | 10.0 | 6.6 | 83.4 | 28,232 | 82,570 | 66,069 | 1.00 | 1.00 | 0.10 | 0.026 |
| 23.1 | 1,9-decadiene | 0.38 | 9.5 | 6.6 | 83.1 | 30,603 | 119,347 | 70,795 | 1.45 | 1.07 | −0.20 | 0.014 |

T = 150° C., IsoparE: 533 g, 1-octene: 67 g; $\Delta H_2$: 240 psi, Ethylene: 233 psi, Catalyst 7: 0.3 μmole, Co-Catalyst A: 0.36 μmole, MMAO-3A: 10 μmole.

According to the data in Table 23 and Table 24, molecular weights increased (tetra-functional "Ladder Branching" occurred) when the ethylene pressure and amount of octene in the reactor was increased.

TABLE 24

Varied ethylene pressure and amount of octene added to the reactor.

| Ex. | Diene | Diene Added (g) | Poly Yield (g) | Octene in Poly (mol %) | Tm (° C.) | Conventional GPC Data and Metrics Mn | Mw (g/mole) | Mp | Mw/Mwo | Mp/Mpo | $G_{(79/29)}$ | $A_{TAIL}$ |
|---|---|---|---|---|---|---|---|---|---|---|---|---|
| 24.0 | none | 0.00 | 10.7 | 6.0 | 90.6 | 47,020 | 128,732 | 102,329 | 1.00 | 1.00 | −0.01 | 0.016 |
| 24.1 | 1,9-decadiene | 0.50 | 10.4 | 5.9 | 88.7 | 46,782 | 182,025 | 112,202 | 1.41 | 1.10 | −1.07 | 0.018 |

T = 150° C., IsoparE: 510 g, 1-octene: 90 g; $\Delta H_2$: 240 psi, Ethylene: 300 psi, Catalyst 7: 0.3 μmole, Co-Catalyst A: 0.36 μmole, MMAO-3A: 10 μmole.

Example 4: Catalyst 7 Catalyzed Decadiene-Homopolymer

TABLE 25

No octene added to the reactor.

| Ex. | Diene | Diene Added (g) | Poly Yield (g) | Tm (° C.) | Conventional GPC Data and Metrics Mn | Mw (g/mole) | Mp | $G_{(79/29)}$ | $A_{TAIL}$ |
|---|---|---|---|---|---|---|---|---|---|
| 25.C.1 | none | 0.00 | 8.1 | 133.1 | 24,817 | 71,529 | 63,096 | 0.07 | 0.023 |
| 25.C.2 | none | 0.00 | 8.4 | 134.9 | 23,596 | 68,706 | 60,256 | 0.06 | 0.022 |
| 25.1 | 1,9-decadiene | 0.03 | 8.3 | 138 | 27,636 | 84,420 | 63,096 | 0.11 | 0.027 |
| 25.2 | 1,9-decadiene | 0.06 | 8.5 | 137.7 | 26,305 | 94,520 | 67,608 | −0.01 | 0.023 |
| 25.3 | 1,9-decadiene | 0.10 | 8.6 | 138.5 | 27,549 | 106,799 | 75,858 | −0.06 | 0.019 |
| 25.4 | 1,9-decadiene | 0.20 | 8.2 | 138.7 | 31,246 | 149,195 | 120,226 | 0.03 | 0.038 |

| Ex. | Diene | Diene Added (g) | Absolute GPC Data and metrics Mn | Mw (g/mole) | Mp | $G_{(79/29)}$ | $A_{TAIL}$ | gpcBR |
|---|---|---|---|---|---|---|---|---|
| 25.C.1 | none | 0.00 | | | | | | |
| 25.C.2 | none | 0.00 | 18,771 | 60,641 | 47,865 | 0.06 | 0.027 | 0.07 |
| 25.1 | 1,9-decadiene | 0.03 | 21,119 | 81,512 | 52,483 | 0.12 | 0.035 | 0.17 |
| 25.2 | 1,9-decadiene | 0.06 | 26,147 | 97,809 | 51,288 | 0.07 | 0.035 | 0.25 |
| 25.3 | 1,9-decadiene | 0.10 | 20,182 | 116,859 | 66,072 | 0.04 | 0.031 | 0.34 |
| 25.4 | 1,9-decadiene | 0.20 | 29,735 | 242,736 | 109,653 | 0.14 | 0.075 | 0.92 |

T = 150° C., IsoparE: 600 g, 1-octene: 0 g; (except Entry 25.C.1 which has 0.2 g), $\Delta H_2$: 240 psi, Ethylene: 150 psi, Catalyst 7: 0.4 μmole, Co-Catalyst A: 0.48 μmole, MMAO-3A: 10 μmole.

Results summarized in Table 25 indicate that tetra-functional "Ladder Branching" occurs when octene is not present in the reactor. The molecular weight of each example in Table 25 increased as the amount of decadiene in the polymerization reaction increased.

TABLE 26

Carbon and proton NMR evaluation of methines, vinyls, and vinylenes (per 1000 carbon atoms) of the Examples recorded in Table 25.

| Example | Octene (g) | Decadiene (g) | methines per 1000 C | Vinyls per 1000 C | Vinylenes per 1000 C |
|---|---|---|---|---|---|
| 26.C.1 | 0.2 | 0.00 | 0.38 | 0.04 | 0 |
| 26.C.2 | 0.0 | 0.00 | 0 | 0.041 | 0 |
| 26.1 | 0.0 | 0.03 | 0.08 | 0.056 | 0 |
| 26.2 | 0.0 | 0.06 | 0.22 | 0.085 | 0.002 |
| 26.3 | 0.0 | 0.10 | 0.3 | 0.12 | 0.003 |
| 26.4 | 0.0 | 0.20 | 0.45 | 0.2 | 0.005 |

Figure 29:
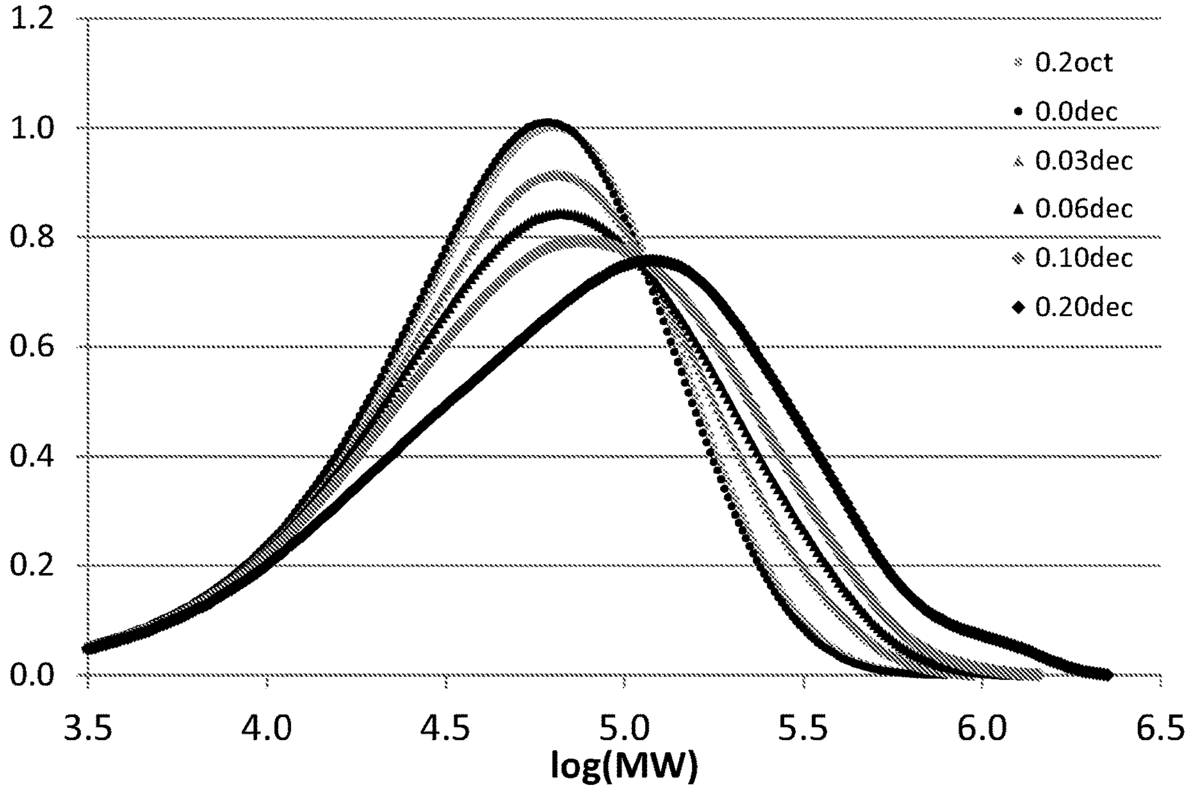
FIG. 29 is an absolute molecular weight distribution curve measured by a GPC triple light scattering detector for two comparative examples having no diene and four samples having a variable amount of diene.

Example 26.C.1 is the result of a polymerization reaction containing 0.2 octene. FIG. 29 is a graph of the Log(MW) of the Examples 26.C.1, 26.C.2, and 26.1-26.4. As the amount of decadiene increases, the molecular weight peak shifts right. Table 27 to Table 32 summarize the results of a Dynamic Mechanical Spectrum for Examples 26.C.1, 26.C.2, and 26.1-26.4. The results of each Table 27 to Table 32 indicate the elasticity factor, m, decreases as the amount of tetra-functional "Ladder Branching" increases. Additionally, the results of each Table 27 to Table 32 indicate the rheology ratio increases as the amount of tetra-functional "Ladder Branching" increases.

FIG. 29 is a conventional molecular weight distribution of curve of series 26.C.1, 26.C.2, and 26.1 to 26.4.

TABLE 27

Dynamic Mechanical Spectrum of Example 26.C.1, a linear short chain branched polymer, at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 0 | 76 | 762 | 192.81 | 76 | 89.7 |
| 0.16 | 1 | 121 | 761 | 145.80 | 121 | 89.6 |
| 0.25 | 1 | 191 | 760 | 131.04 | 191 | 89.6 |
| 0.40 | 4 | 302 | 758 | 74.41 | 302 | 89.2 |
| 0.63 | 9 | 477 | 755 | 55.57 | 477 | 89.0 |
| 1.00 | 18 | 753 | 753 | 42.51 | 753 | 88.7 |
| 1.58 | 38 | 1186 | 749 | 31.35 | 1187 | 88.2 |
| 2.51 | 81 | 1865 | 743 | 22.98 | 1866 | 87.5 |
| 3.98 | 170 | 2922 | 735 | 17.22 | 2927 | 86.7 |
| 6.31 | 351 | 4561 | 725 | 13.00 | 4575 | 85.6 |
| 10.00 | 718 | 7078 | 711 | 9.86 | 7115 | 84.2 |
| 15.85 | 1448 | 10894 | 693 | 7.52 | 10989 | 82.4 |
| 25.12 | 2865 | 16568 | 669 | 5.78 | 16814 | 80.2 |
| 39.81 | 5513 | 24807 | 638 | 4.50 | 25412 | 77.5 |
| 63.10 | 10265 | 36398 | 599 | 3.55 | 37818 | 74.3 |
| 100.00 | 18369 | 52036 | 552 | 2.83 | 55183 | 70.6 |

The Dynamic Mechanical Spectrum of the comparative was measured and the results recorded in Table 27. The shear viscosity at 0.1 radians/second was calculated to be 762 Pa s and the shear viscosity at 100 radians/second was measured at 552 Pa s, providing a rheology ratio ($V_{0.1}/V_{100}$) of 1.4. The tan ($\delta_{0.1}$) of the branched polymer in Example 26.C.1 was 192.8, and the tan ($\delta_{100}$) was 2.8, which yields an elasticity factor of 1901.6 at 190° C.

TABLE 28

Dynamic Mechanical Spectrum of Example 26.C.2, a linear polymer, at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 0 | 66 | 662 | 401.31 | 66 | 89.9 |
| 0.16 | 0 | 105 | 662 | 212.34 | 105 | 89.7 |
| 0.25 | 1 | 166 | 661 | 126.46 | 166 | 89.5 |
| 0.40 | 3 | 263 | 661 | 91.50 | 263 | 89.4 |
| 0.63 | 6 | 416 | 659 | 70.63 | 416 | 89.2 |
| 1.00 | 13 | 658 | 658 | 51.74 | 658 | 88.9 |
| 1.58 | 28 | 1038 | 655 | 37.74 | 1039 | 88.5 |
| 2.51 | 60 | 1635 | 651 | 27.25 | 1636 | 87.9 |
| 3.98 | 127 | 2567 | 646 | 20.19 | 2570 | 87.2 |
| 6.31 | 267 | 4018 | 638 | 15.07 | 4027 | 86.2 |
| 10.00 | 553 | 6256 | 628 | 11.31 | 6281 | 84.9 |
| 15.85 | 1131 | 9671 | 614 | 8.55 | 9737 | 83.3 |
| 25.12 | 2272 | 14793 | 596 | 6.51 | 14967 | 81.3 |
| 39.81 | 4439 | 22291 | 571 | 5.02 | 22729 | 78.7 |
| 63.10 | 8445 | 32969 | 539 | 3.90 | 34034 | 75.6 |
| 100.00 | 15436 | 47687 | 501 | 3.09 | 50123 | 72.1 |

The Dynamic Mechanical Spectrum of the comparative, Example 26.C.1, was measured and the results recorded in Table 28. The shear viscosity at 0.1 radians/second was calculated to be 662 Pa s and the shear viscosity at 100 radians/second was measured at 501 Pa s, providing a rheology ratio ($V_{0.1}/V_{100}$) of 1.3. The tan ($\delta_{0.1}$) of the linear polymer of Example 26.C.1 was 401.3, and the tan ($\delta_{100}$) was 3.1, which yields an elasticity factor of 3986.2 at 190° C.

TABLE 29

Dynamic Mechanical Spectrum of Example 26.1, a tetra-functional "Ladder Branching" polymer, at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 168 | 722 | 7410 | 4.29 | 741 | 76.9 |
| 0.16 | 293 | 1054 | 6900 | 3.60 | 1094 | 74.5 |
| 0.25 | 492 | 1514 | 6336 | 3.08 | 1591 | 72.0 |
| 0.40 | 797 | 2138 | 5731 | 2.68 | 2282 | 69.6 |
| 0.63 | 1250 | 2973 | 5112 | 2.38 | 3225 | 67.2 |
| 1.00 | 1900 | 4082 | 4502 | 2.15 | 4502 | 65.0 |
| 1.58 | 2810 | 5540 | 3919 | 1.97 | 6211 | 63.1 |
| 2.51 | 4059 | 7449 | 3377 | 1.84 | 8483 | 61.4 |
| 3.98 | 5741 | 9964 | 2888 | 1.74 | 11499 | 60.0 |
| 6.31 | 7995 | 13287 | 2458 | 1.66 | 15507 | 59.0 |
| 10.00 | 11019 | 17695 | 2085 | 1.61 | 20845 | 58.1 |
| 15.85 | 15100 | 23534 | 1764 | 1.56 | 27961 | 57.3 |
| 25.12 | 20749 | 31208 | 1492 | 1.50 | 37476 | 56.4 |
| 39.81 | 28424 | 41229 | 1258 | 1.45 | 50078 | 55.4 |
| 63.10 | 39014 | 54069 | 1057 | 1.39 | 66675 | 54.2 |
| 100.00 | 53608 | 70156 | 883 | 1.31 | 88294 | 52.6 |

The Dynamic Mechanical Spectrum of Example 26.1 was measured and the results recorded in Table 29. The shear viscosity at 0.1 radians/second was calculated to be 7,410 Pa s and the shear viscosity at 100 radians/second was measured at 883 Pa s, providing a rheology ratio ($V_{0.1}/V_{100}$) of 8.4. The tan ($\delta_{0.1}$) of the branched polymer in Example 13.1 was 4.3, and the tan ($\delta_{100}$) was 1.3, which yields an elasticity factor of 29.8 at 190° C.

TABLE 30

Dynamic Mechanical Spectrum of Example 26.2, a tetra-functional "Ladder Branching" polymer, at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 3624 | 4341 | 56549 | 1.20 | 5655 | 50.1 |
| 0.16 | 4876 | 5401 | 45910 | 1.11 | 7276 | 47.9 |
| 0.25 | 6427 | 6657 | 36837 | 1.04 | 9253 | 46.0 |
| 0.40 | 8332 | 8102 | 29193 | 0.97 | 11622 | 44.2 |
| 0.63 | 10654 | 9784 | 22926 | 0.92 | 14465 | 42.6 |
| 1.00 | 13448 | 11749 | 17858 | 0.87 | 17858 | 41.1 |
| 1.58 | 16769 | 14037 | 13798 | 0.84 | 21869 | 39.9 |
| 2.51 | 20720 | 16721 | 10600 | 0.81 | 26626 | 38.9 |
| 3.98 | 25363 | 19928 | 8102 | 0.79 | 32255 | 38.2 |
| 6.31 | 30848 | 23813 | 6176 | 0.77 | 38969 | 37.7 |
| 10.00 | 37319 | 28572 | 4700 | 0.77 | 47001 | 37.4 |
| 15.85 | 45028 | 34475 | 3578 | 0.77 | 56711 | 37.4 |
| 25.12 | 54324 | 41765 | 2728 | 0.77 | 68524 | 37.6 |
| 39.81 | 65674 | 50951 | 2088 | 0.78 | 83121 | 37.8 |
| 63.10 | 79710 | 62296 | 1603 | 0.78 | 101170 | 38.0 |
| 100.00 | 97327 | 76112 | 1236 | 0.78 | 123550 | 38.0 |

The Dynamic Mechanical Spectrum of Example 26.2 was measured and the results recorded in Table 30. The shear viscosity at 0.1 radians/second was calculated to be 56,549 Pa s and the shear viscosity at 100 radians/second was measured at 1,236 Pa s, providing a rheology ratio ($V_{0.1}/V_{100}$) of 45.8. The tan ($\delta_{0.1}$) of the branched polymer in Example 26.2 was 1.2, and the tan ($\delta_{100}$) was 0.8, which yields an elasticity factor of 4.2 at 190° C.

TABLE 31

Dynamic Mechanical Spectrum of Example 26.3, a tetra-functional "Ladder Branching" polymer, at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 17977 | 12228 | 217410 | 0.68 | 21741 | 34.2 |
| 0.16 | 21869 | 13969 | 163730 | 0.64 | 25950 | 32.6 |
| 0.25 | 26179 | 15829 | 121790 | 0.60 | 30592 | 31.2 |
| 0.40 | 31006 | 17912 | 89945 | 0.58 | 35808 | 30.0 |
| 0.63 | 36358 | 20148 | 65880 | 0.55 | 41567 | 29.0 |
| 1.00 | 42361 | 22662 | 48042 | 0.53 | 48042 | 28.1 |
| 1.58 | 49016 | 25437 | 34844 | 0.52 | 55223 | 27.4 |
| 2.51 | 56469 | 28527 | 25187 | 0.51 | 63266 | 26.8 |
| 3.98 | 64746 | 32041 | 18146 | 0.49 | 72241 | 26.3 |
| 6.31 | 73992 | 36161 | 13052 | 0.49 | 82355 | 26.0 |
| 10.00 | 84312 | 41035 | 9377 | 0.49 | 93767 | 26.0 |
| 15.85 | 95926 | 46900 | 6737 | 0.49 | 106780 | 26.1 |
| 25.12 | 109110 | 54015 | 4847 | 0.50 | 121750 | 26.3 |
| 39.81 | 124270 | 62740 | 3497 | 0.50 | 139210 | 26.8 |
| 63.10 | 142000 | 73445 | 2534 | 0.52 | 159870 | 27.3 |
| 100.00 | 163090 | 86354 | 1845 | 0.53 | 184540 | 27.9 |

The Dynamic Mechanical Spectrum Example 26.3 was measured and the results recorded in Table 31. The shear viscosity at 0.1 radians/second was calculated to be 56,549 Pa s and the shear viscosity at 100 radians/second was measured at 1,236 Pa s, providing a rheology ratio ($V_{0.1}/V_{100}$) of 117.8. The tan ($\delta_{0.1}$) of the branched polymer in Example 26.3 was 1.2, and the tan ($\delta_{100}$) was 0.8, which yields an elasticity factor of 4.2 at 190° C.

TABLE 32

Dynamic Mechanical Spectrum of Example 26.4, a tetra-functional "Ladder Branching" polymer, at 190° C.

| Ang freq rad/s | Storage modulus Pa | Loss modulus Pa | Complex viscosity Pa · s | Tan (delta) | Complex modulus Pa | Phase angle ° |
|---|---|---|---|---|---|---|
| 0.10 | 86332 | 28452 | 909000 | 0.33 | 90900 | 18.2 |
| 0.16 | 95178 | 30306 | 630240 | 0.32 | 99887 | 17.7 |
| 0.25 | 104510 | 32167 | 435310 | 0.31 | 109340 | 17.1 |
| 0.40 | 114280 | 34156 | 299610 | 0.30 | 119280 | 16.6 |
| 0.63 | 124490 | 36260 | 205500 | 0.29 | 129660 | 16.2 |
| 1.00 | 135390 | 38643 | 140790 | 0.29 | 140790 | 15.9 |
| 1.58 | 146880 | 41177 | 96245 | 0.28 | 152540 | 15.7 |
| 2.51 | 159050 | 43788 | 65676 | 0.28 | 164970 | 15.4 |
| 3.98 | 172020 | 46770 | 44777 | 0.27 | 178260 | 15.2 |
| 6.31 | 185770 | 50056 | 30493 | 0.27 | 192400 | 15.1 |
| 10.00 | 200450 | 53794 | 20754 | 0.27 | 207540 | 15.0 |
| 15.85 | 216100 | 58080 | 14119 | 0.27 | 223770 | 15.0 |
| 25.12 | 232940 | 63088 | 9607 | 0.27 | 241330 | 15.2 |
| 39.81 | 251110 | 69110 | 6542 | 0.28 | 260440 | 15.4 |
| 63.10 | 270990 | 76373 | 4462 | 0.28 | 281550 | 15.7 |
| 100.00 | 293290 | 85175 | 3054 | 0.29 | 305410 | 16.2 |

The Dynamic Mechanical Spectrum of Example 26.4 was measured and the results recorded in Table 32. The shear viscosity at 0.1 radians/second was calculated to be 909,000 Pa s and the shear viscosity at 100 radians/second was measured at 3,054 Pa s, providing a rheology ratio ($V_{0.1}/V_{100}$) of 297.6. The tan ($\delta_{0.1}$) of the branched polymer in Example 26.4 was 0.3, and the tan ($\delta_{100}$) was 0.3, which yields an elasticity factor of 0.4 at 190° C.

Guzman-2010 demonstrated and analyzed the MWD and physical properties resulting from conventional diene branching in a steady-state CSTR. A constrained geometry catalyst (CGC) was used to copolymerize ethylene, 1-octene, and 1,9-decadiene in a very well mixed one-gallon reactor system. The particular CGC catalyst, used by Guzman, was described in detail by U.S. Pat. No. 5,965,756 (structure IX) and U.S. Pat. No. 7,553,917 (Example 3). The Guzman-2010 catalyst was designed to grow a single chain from the catalyst center. Guzman's data were gathered at steady state while operating a CSTR at a pressure of 525 psig and a temperature of 155° C. over a range of diene feed concentrations. The various steady-state polymer samples collected by Guzman contained no measurable levels of gels or insoluble material. However, at the highest level of dienes feed some minor internal reactor fouling was observed, and it was anticipated that higher levels of dienes feed would result in gels formation or reactor MWD instability.

In Table 33, a selected series of data from Guzman was summarized for otherwise fixed reactor conditions over a spectrum of diene feed levels. Throughout the series, the ethylene and 1-octene feed concentrations were set at 13.8 wt % and 3.6 wt %, respectively. The catalyst feed rate was continuously adjusted to maintain a constant ethylene conversion of 79% throughout the series resulting in a fixed polymer production rate of 2.2 kg/hr. The polymer density, a measure of copolymer composition, was constant at about 0.922 g/cc.

TABLE 33

Comparative example of Guzman CS TR results using a single-chain constrained geometry catalyst and 1,9-decadiene.

| | 1,9-decadiene | | | | | Conventional GPC Data | | | Absolute GPC Data | | |
|---|---|---|---|---|---|---|---|---|---|---|---|
| Sample | Feed (ppm)[A] | Incorp. (ppm)[B] | vinyls/ 1000C | $I_2$ (dg/min) | $I_{10}/I_2$ | $M_n$ | $M_w$ (kg/mole) | $M_p$ | $M_n$ | $M_w$ (kg/mole) | $M_p$ |
| 33.C1 | 0 | 0 | 0.11 | 20 | 6.2 | 19.9 | 42.5 | 35.8 | 21.5 | 48.2 | 39.1 |
| 33.C2 | 523 | 2119 | 0.25 | 7.2 | 9.1 | 19.4 | 52.9 | 36.5 | 20.2 | 58.9 | 38.6 |
| 33.C3 | 704 | 2912 | 0.29 | 4.6 | 10.2 | 19.5 | 55.5 | 37.4 | 21.4 | 67.2 | 39.1 |
| 33.C4 | 794 | 3186 | 0.30 | 3.2 | 11.0 | 20.9 | 59.5 | 36.4 | 22.5 | 73.6 | 39.0 |
| 33.C5 | 837 | 3405 | 0.30 | 3.1 | 11.5 | 20.2 | 60.2 | 36.9 | 21.7 | 75.3 | 38.5 |
| 33.C6 | 881 | 3502 | 0.28 | 2.1 | 11.8 | 21.6 | 65.2 | 38.9 | 23.0 | 81.5 | 41.9 |
| 33.C7 | 923 | 3946 | 0.31 | 1.3 | 13.0 | 21.9 | 70.4 | 40.8 | 23.9 | 90.4 | 39.9 |

[A]1,9-decadiene feed level expressed as overall mass fraction, in units of ppm

[B]1,9-decadiene incorporation as expressed in polymer mass fraction, in units of ppm.

The data in Table 33 demonstrated how changes in conventional diene branching level affects average molecular weight and polydispersity as well as properties such as viscosity, as reflected by $I_2$ and $I_{10}$. The effect of conventional diene branching on molecular weight was shown in Table 33 for both absolute and conventional MWD measurement techniques. While absolute MWD measurement is the preferred method for branched polymers, it is not always available. Therefore, Table 33 also contains molecular weights measured by conventional techniques using a refractive index detector. The results in Table 33 demonstrated that, by either measurement technique, the weight average molecular weight ($M_w$) rises substantially as the diene feed is increased from zero to 923 ppm.

Figure 30A:
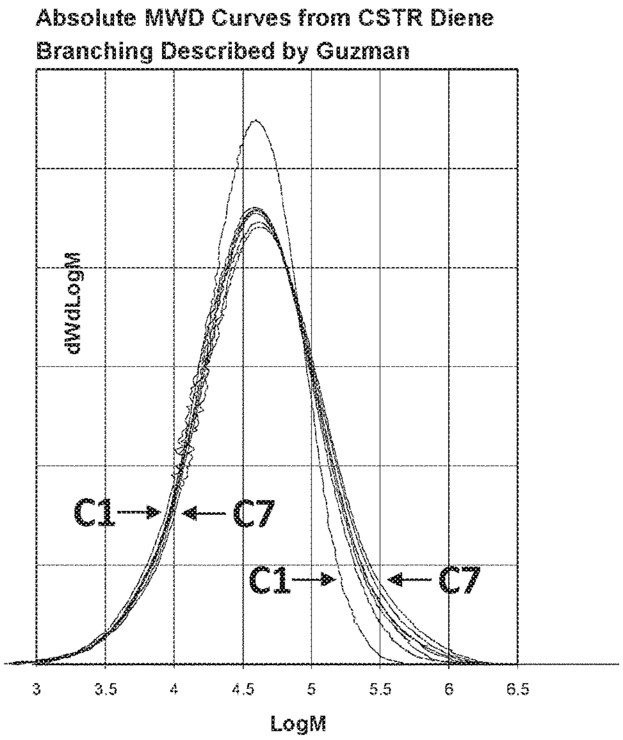
FIG. 30A is a graph of the absolute molecular weight distributions of comparative conventional branched polymer samples with varying amounts of diene.
Figure 30B:
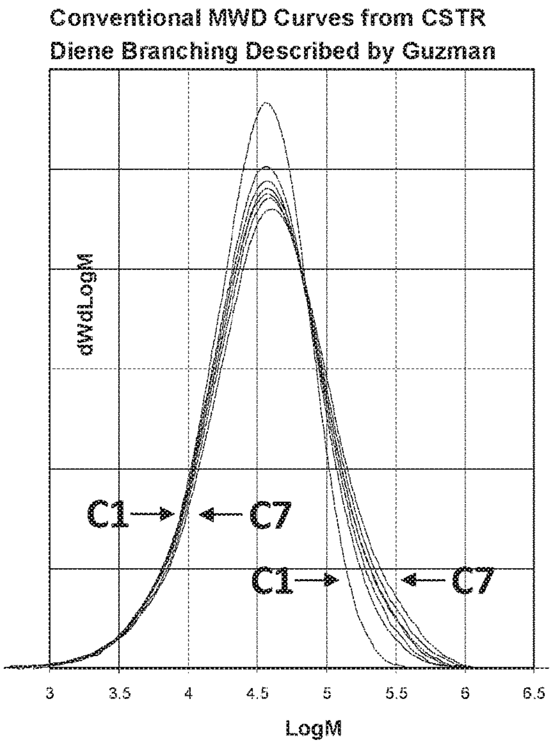
FIG. 30B is a graph of the conventional molecular weight distributions of comparative conventional branched polymer samples with varying amounts of diene.

Though not reported in Guzman, the MWD curves associated with Table 33 were found and plotted in FIGS. 30A and 30B for absolute and conventional GPC measurement techniques, respectively. The MWD curve data in FIGS. 30A and 30B demonstrated that the expected high $M_w$ tail formation resulting from conventional diene branching occurred. The lack of significant movement of the peak MW with increasing diene branching is also apparent from the MWD curves.

The molecular weight distributional data in FIGS. 30A and 30B were reduced to simple metrics describing the evolution of the MWD curve position and shape as more diene monomers were fed to the CSTR. The data in Table 34 showed these MWD metrics for both absolute and conventional MWD measurements of the Guzman's polymer samples. Absolute MWD measurement data in Table 34 showed up to an 87% increase in molecular weight as 1,9-decadiene feed ranged from 0 to 923 ppm. Peak molecular weight change, as indicated by $M_p$, does not vary significantly for either means of molecular weight measurement, which is inconsistent with "Ladder branched" polymer results. The shape factors are summarized in Table 34 and are inconsistent with "Ladder branched" polymers because the values for both $G_{79/29}$ and $A_{TAIL}$ increased as the diene feed level and $M_w$ increased.

TABLE 34

Molecular weight data and metrics associated with examples in Table 33.

| | | Diene | Conventional GPC Metrics | | | | Absolute GPC Metrics | | | |
|---|---|---|---|---|---|---|---|---|---|---|
| Ex. | Sample | Feed (ppm) | $M_w/M_{w0}$ | $M_p/M_{p0}$ | $G_{(79/29)}$ | $A_{TAIL}$ | $M_w/M_{w0}$ | $M_p/M_{p0}$ | $G_{(79/29)}$ | $A_{TAIL}$ |
| 33.C1 | 19 | 0 | 1.00 | 1.00 | 0.12 | 0.011 | 1.00 | 1.00 | 0.06 | 0.026 |
| 33.C2 | 20 | 523 | 1.24 | 1.02 | 0.22 | 0.043 | 1.22 | 0.99 | 0.18 | 0.062 |
| 33.C3 | 21 | 704 | 1.31 | 1.05 | 0.23 | 0.047 | 1.39 | 1.00 | 0.15 | 0.058 |
| 33.C4 | 22 | 794 | 1.40 | 1.02 | 0.27 | 0.051 | 1.53 | 1.00 | 0.13 | 0.062 |
| 33.C5 | 23 | 837 | 1.42 | 1.03 | 0.29 | 0.055 | 1.56 | 0.98 | 0.17 | 0.062 |
| 33.C6 | 24 | 881 | 1.53 | 1.09 | 0.26 | 0.061 | 1.69 | 1.07 | 0.20 | 0.066 |
| 33.C7 | 25 | 923 | 1.66 | 1.14 | 0.33 | 0.063 | 1.87 | 1.02 | 0.23 | 0.071 |

Some key parameters on commercial resins are tabulated in Table 35. Some of the basic parameters for materials were made in solution, gas phase, and high pressure reactors.

TABLE 35

Physical Characteristics of non-"Ladder Branching" Polymer Compositions

| Example | Source Data | Resin | c-PDI | Average g' | $V_{0.1}$ | $V_{100}$ | Rheology Ratio (RR) | $Tan\delta_{0.1}$ | $Tan\delta_{100}$ |
|---|---|---|---|---|---|---|---|---|---|
| 33.C1 | DOWLEX 2045G | LLDPE | 4.35 | 0.91 | 8,525 | 1,612 | 5.3 | 9.61 | 0.97 |
| 33.C2 | ASPUNE 6835A | LLDPE | 3.27 | 0.99 | 1,064 | 503 | 2.1 | 25.2 | 1.96 |
| 33.C3 | ATTANE 4201 | ULDPE | 4.59 | 0.86 | 9,643 | 1,686 | 5.7 | 8.16 | 0.93 |

TABLE 35-continued

Physical Characteristics of non-"Ladder Branching" Polymer Compositions

| Example | Source Data | Resin | c-PDI | Average g' | $V_{0.1}$ | $V_{100}$ | Rheology Ratio (RR) | $Tan\delta_{0.1}$ | $Tan\delta_{100}$ |
|---|---|---|---|---|---|---|---|---|---|
| 33.C4 | ELITE ™ 5800G | LDPE | | | 966 | 304 | 3 | | |
| 33.C5 | Affinity ™ PL 1880 | LDPE | | | 9,980 | 1,404 | 7.1 | | |
| 33.C6 | LDPE 722 | LDPE | 10.31 | 0.606 | 1987 | 254 | 7.8 | 6.01 | 1.01 |
| 33.C7 | LDPE 50041 | LDPE | 8.08 | 0.624 | 3420 | 335 | 10.2 | 4.73 | 0.922 |
| 33.C8 | LDPE 6621 | LDPE | 11.55 | 0.548 | 21,078 | 646 | 32.6 | 1.63 | 0.70 |
| 33.C9 | Exxon Resin 1* | LDPE | 4.43 | 0.63 | 28,266 | 913 | 31.0 | 2.09 | 0.65 |
| 33.C10 | Equistar Resin* | LDPE | 7.67 | 0.54 | 37,944 | 730 | 52.0 | 1.26 | 0.59 |
| 33.C11 | Exxon Resin 2* | LDPE | 4.69 | 0.57 | 16,153 | 751 | 21.5 | 2.86 | 0.73 |
| 33.C8 | U.S. Pat. No. 9,580,533 (Slurry) | Ethylene-diene | 14.15 | 0.979 | 9283 | 384.4 | 24.1 | — | — |
| 33.C12 | U.S. Pat. No. 9,580,533 (Solution) | Ethylene-diene | 7.45 | 0.513 | 20162 | 521.5 | 38.7 | — | — |
| 33.C13 | U.S. Pat. No. 9,580,533 (Solution) | Ethylene-diene | 3.68 | 0.880 | 173.8 | 134.2 | 1.3 | — | — |
| 33.C14 | U.S. Pat. No. 9,580,533 (Solution) | Ethylene-diene | 5.28 | 0.718 | 16847.5 | 842.8 | 20.0 | — | — |
| 33.C15 | U.S. Pat. No. 9,580,533 (Solution) | Ethylene-diene | 7.97 | 0.696 | 9893.2 | 569.6 | 17.4 | — | — |
| 33.C16 | U.S. Pat. No. 9,580,533 (Solution) | Ethylene-diene | 5.71 | 0.593 | 1214.2 | 352.6 | 3.4 | — | — |

™Trademark of The Dow Chemical Company

*Competitor resins were tested as comparisons. The Exxon Resins were obtained from ExxonMobil. Equistar Resin is a LyondellBasell Petrothene product.

Figure 31:
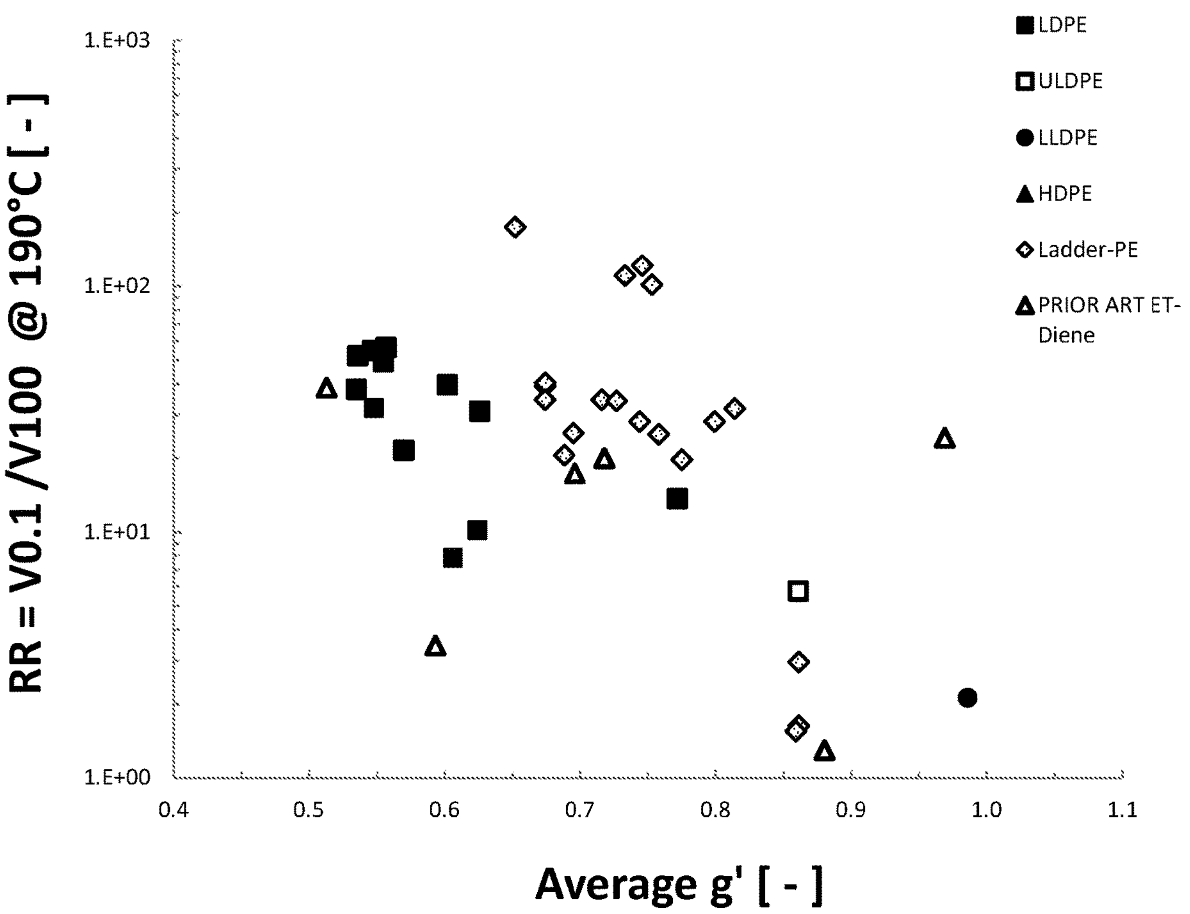
FIG. 31 is a graph of the rheology ratio as a function of average g' for various polymer resins and "Ladder Branched" polymer resins.
Figure 32:
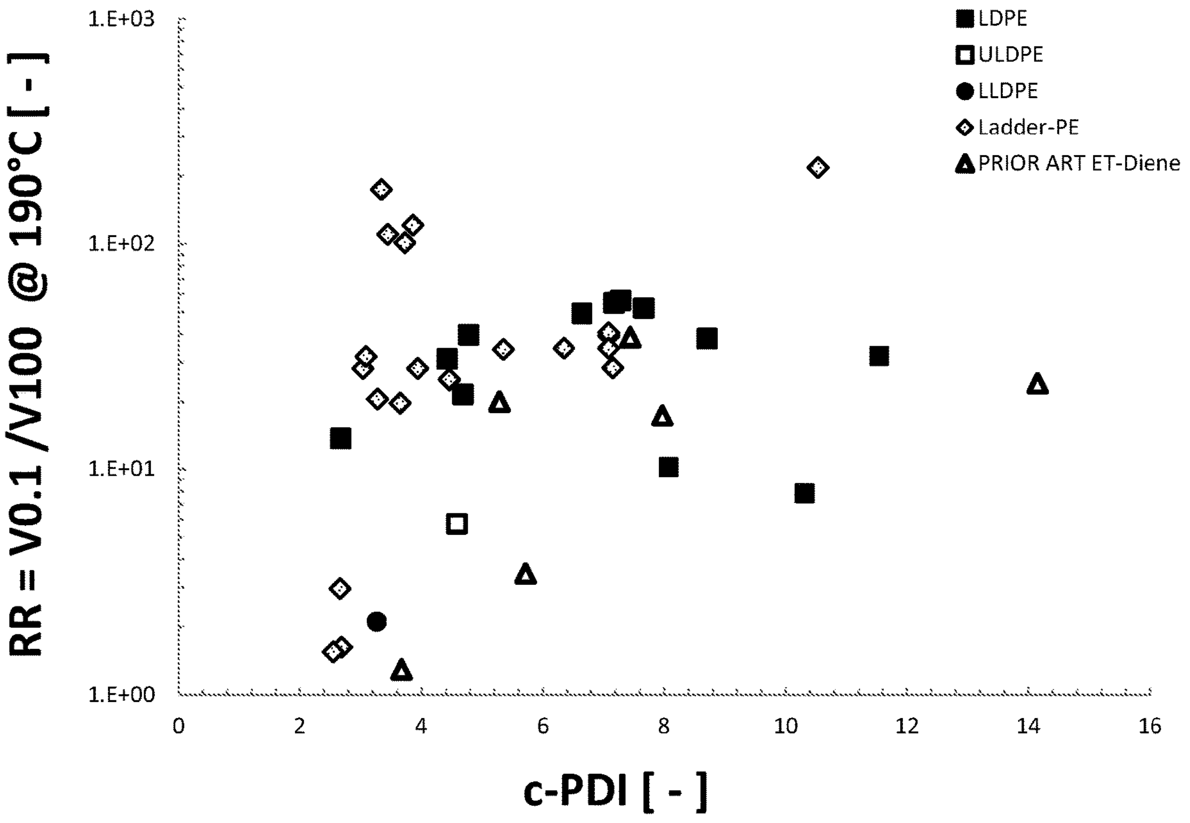
FIG. 32 is a graph of the rheology ratio as a function of polydispersity index (PDI) for various polymer resins and "Ladder Branched" polymer resins.

The data summarized in Table 35 are plotted in the graphs of FIG. 31 and FIG. 32. The data illustrates the difference in the "Ladder Branched" polymers in comparison to LDPE, LLDPE, ULDPE, and ethylene resins containing diene monomers. In FIG. 31 and FIG. 32, the "Ladder Branched" polymers (Ladder-PE in the legend of the graph) of this disclosure are clustered together, thus indicating that the "Ladder Branched" polymers have unique polymeric properties in comparison to other ethylene-based resins. As shown in the graph of FIG. 31, the "Ladder Branched" polymers have a rheology ratio at least 10, and an average g' less than 0.86. In FIG. 31, the LDPE resins plotted have an average g' of less than 0.65; the prior art ethylene-diene resins (listed as Prior Art ET-Diene in the legend) do not cluster together.

Figure 33:
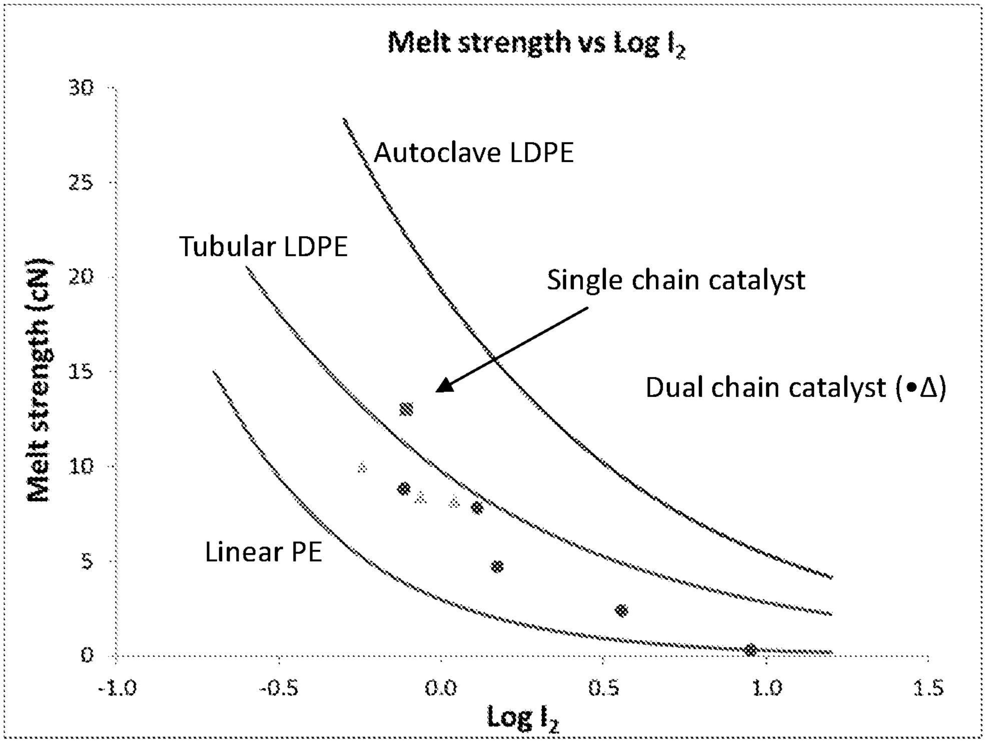
FIG. 33 is a graph of the melt strength (centiNewtons, cN) as a function of the melt index (Log $I_2$) of polymers produced with a single chain catalyst and a dual chain catalyst, with additional lines depicting linear polyethylene, tubular low density polyethylene and autoclave low density polyethylene.

In FIG. 33, the melt strength (centiNewtons, cN) was measured as a function of the melt index (Log $I_2$). The polymers produced from the dual chain catalyst, as indicated by the triangles and the circles, were compared to a polymer produced from a single chain catalyst, and literature based curves of autoclave LDPE, tubular LDPE, and linear polyethylene. The melt strengths of the polymers produced from the dual chain catalysts were less than the melt strength of the autoclave LDPE, tubular LDPE, and the polymer produced from the single chain catalysts, but significantly greater than the linear polyethylene. This would indicate that the polymers produced from the dual chain catalysts have entangled, long-chain branching.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. An ethylene-based polymer comprising:

a melt viscosity ratio ($V_{0.1}/V_{100}$) at 190° C. of at least 10, where $V_{0.1}$ is viscosity of the ethylene-based polymer at 190° C. at a shear rate of 0.1 radians/second, and $V_{100}$ is viscosity of the ethylene-based polymer at 190° C. at a shear rate of 100 radians/second; and a high molecular weight tail quantified by an MWD area metric, $A_{TAIL}$, and $A_{TAIL}$ is less than or equal to 0.04 as determined by gel permeation chromatography using a triple detector.

2. The ethylene-based polymer of claim 1, wherein the ethylene-based polymer further comprises an average g' from 0.64 to 0.86, where the average g' is an intrinsic viscosity ratio determined by gel permeation chromatography using a triple detector.

3. The ethylene-based polymer of claim 1, wherein the melt viscosity ratio ($V_{0.1}/V_{100}$) at 190° C. is at least 60, where $V_{0.1}$ is the viscosity of the ethylene-based polymer at 190° C. at a shear rate of 0.1 radians/second, and $V_{100}$ is the viscosity of the ethylene-based polymer at 190° C. at a shear rate of 100 radians/second.

4. The ethylene-based polymer of claim 1, wherein the ethylene-based polymer has a G(79/29) value of less than or equal to 0.04 as determined from a gel permeation chromatography curve using a triple detector having a peak height, a slope M79 at 79% of the peak height, and a slope M29 at 29% of the peak height, wherein the G(79/29) value equals (M79−M29)/M79.

5. The ethylene-based polymer of claim 1, wherein the ethylene-based polymer has a molecular weight tail quantified by an MWD area metric, $A_{TAIL}$, and $A_{TAIL}$ is less than or equal to 0.03 as determined by gel permeation chromatography using a triple detector.

6. The ethylene-based polymer of claim 1, wherein the ethylene-based polymer $M_w$ is less than or equal to 800,000 Daltons, as determined by gel permeation chromatography using a triple detector.

7. The ethylene-based polymer of claim 1, wherein the ethylene-based polymer $M_w$ is less than or equal to 400,000 Daltons, as determined by gel permeation chromatography using a triple detector.

8. The ethylene-based polymer of claim 1, wherein the ethylene-based polymer comprises units derived from ethylene, diene, and one or more $C_3$-$C_{12}$ α-olefin.

9. The ethylene-based polymer of claim 8, wherein the diene is linear.

10. The ethylene-based polymer of claim 8, wherein the diene comprises 2-methyl-1,4-pentadiene, 3-methyl-1,4-pentadiene, 1,3-divinylcyclopentane, 2-methyl-1,5-hexadiene, 1,4-pentadiene, 1,5-hexadiene, 1,7-octadiene, 1,8-nonadiene, 1,9-decadiene, 1,11-dodecadiene, or 1,15-hexadecadiene.

11. An ethylene-based polymer comprising:

a melt viscosity ratio ($V_{0.1}/V_{100}$) at 190° C. of greater than 50, where $V_{0.1}$ is viscosity of the ethylene-based polymer at 190° C. at a shear rate of 0.1 radians/second, and $V_{100}$ is the viscosity of the ethylene-based polymer at 190° C. at a shear rate of 100 radians/second; and an average g' from 0.64 to 0.86, where the average g' is an intrinsic viscosity ratio determined by gel permeation chromatography using a triple detector.

12. The ethylene-based polymer of claim 11, wherein the ethylene-based polymer has a high molecular weight tail quantified by an MWD area metric, $A_{TAIL}$, and $A_{TAIL}$ is less than or equal to 0.04 as determined by gel Currently Amended chromatography using a triple detector.

13. The ethylene-based polymer of claim 11, wherein the melt viscosity ratio ($V_{0.1}/V_{100}$) at 190° C. is at least 60, where $V_{0.1}$ is viscosity of the ethylene-based polymer at 190° C. at a shear rate of 0.1 radians/second, and $V_{100}$ is viscosity of the ethylene-based polymer at 190° C. at a shear rate of 100 radians/second.

14. The ethylene-based polymer of claim 11, wherein the ethylene-based polymer has a G(79/29) value of less than or equal to 0.04 as determined from a gel permeation chromatography curve using a triple detector having a peak height, a slope M79 at 79% of the peak height, and a slope M29 at 29% of the peak height, wherein the G(79/29) value equals (M79−M29)/M79.

15. The ethylene-based polymer of claim 1, wherein the ethylene-based polymer has a molecular weight tail quantified by an MWD area metric, $A_{TAIL}$, and $A_{TAIL}$ is less than or equal to 0.03 as determined by gel permeation chromatography using a triple detector.

16. The ethylene-based polymer of claim 1, wherein the melt strength is greater than 6 cN (190° C., 2.4 mm/$s^2$, 120 mm from die exit to center of wheels, extrusion rate of 38.2 $s^{-1}$, capillary die of 30 mm length, 2 mm diameter and 180° entrance angle).

* * * * *